United States Patent [19]
Tomooka et al.

[11] Patent Number: 5,555,477
[45] Date of Patent: Sep. 10, 1996

[54] OPTICAL TRANSMISSION SYSTEM CONSTRUCTING METHOD AND SYSTEM

[75] Inventors: Keiji Tomooka, Yokohama; Naohiro Sakakida, Kawasaki; Shin Nishimura, Yokohama; Yoshihiro Ashi, Yokohama; Hironari Matsuda, Yokohama; Satoshi Aoki, Chigasaki; Yukio Nakano, Zama; Masahiro Takatori, Hachiouji; Toru Kazawa, Kokubunji; Shinya Sasaki, Kodaira; Ryoji Takeyari, Koganei; Hiroyuki Nakano, Asaka, all of Japan

[73] Assignee: Hitachi, Ltd., Tokyo, Japan

[21] Appl. No.: 44,425

[22] Filed: Apr. 7, 1993

Related U.S. Application Data

[63] Continuation-in-part of Ser. No. 23,546, Feb. 26, 1993, Pat. No. 5,500,756.

[30] Foreign Application Priority Data

Apr. 8, 1992 [JP] Japan .................. 4-087247

[51] Int. Cl.⁶ .................. H04J 14/00; H04B 10/02
[52] U.S. Cl. .................. 359/115; 359/118; 359/173; 359/176; 359/179
[58] Field of Search .................. 359/110, 115, 359/118, 124, 125, 173, 174, 176, 179, 341, 344, 164

[56] References Cited

U.S. PATENT DOCUMENTS

| | | | |
|---|---|---|---|
| 4,680,776 | 7/1987 | Ikeuchi et al. | 375/40 |
| 4,979,234 | 12/1990 | Agrawa et al. | 359/173 |
| 5,043,976 | 8/1991 | Abiven et al. | 359/110 |
| 5,227,908 | 7/1993 | Henmi | 359/173 |
| 5,315,426 | 3/1994 | Aoki | 359/180 |
| 5,327,275 | 7/1994 | Yamane et al. | 359/173 |
| 5,339,187 | 8/1994 | Nelson | 359/173 |
| 5,343,464 | 8/1994 | Iino et al. | 370/16 |
| 5,396,360 | 3/1995 | Majima | 359/174 |

OTHER PUBLICATIONS

Saito, Prechirp Technique for Dispersion Compensation for high speed Long–Span transmission. IEEE (1991) vol. 3 No. 1.

*Primary Examiner*—Leo Boudreau
*Assistant Examiner*—Rafael Bacares
*Attorney, Agent, or Firm*—Kenyon & Kenyon

[57] ABSTRACT

An optical transmission system accomplishes optical transmission to a long distance by combining a multiplexing line terminal with optical amplifiers, linear repeaters, and regenerators with optical amplifiers combined together. The system also accomplishes the optical transmission to a short distance by directly connecting the linear terminals therebetween, with an electric-to-optic converter replaced by an electric-to-optic converter having a semiconductor amplifier, with an optic-to-electric converter by an optic-to-electric converter having an avalanche photodiode as light receiver, an with no use of any optical booster amplifier and optical preamplifier in the multiplexing line terminal. With these, the optical transmission system can be easily constructed depending on the transmission distance required.

5 Claims, 43 Drawing Sheets

1800(HEIGHT) x 800(WIDTH) x 600(DEPTH) mm

OPTICAL TRANSMISSION SYSTEM CONSTRUCTING METHOD AND SYSTEM

This application is a Continuation-in-Part of our U.S. patent application Ser. No. 023,546, filed Feb. 26, 1993 now U.S. Pat. No. 5,500,756.

BACKGROUND OF THE INVENTION

1. Field of the Invention

The present invention relates to an optical transmission method and system for carrying data transmission the use of optical fiber. More particularly, it concerns an optical transmission method and system preferable in high-speed data transmission over a long distance.

2. Description of the Related Art

Prior art related to the optical transmission system includes, for example, the technique disclosed in the Japanese Patent Application Laid-Open 3-296334.

However, it is demanded to accomplish an optical transmission system operating at further higher speed since development of the modern information society has increased long-distance communication traffic in recent years. Also, it is desired that the optical transmission system can transmit data even longer distances without repeaters to increase reliability and decrease cost of the system.

Further, the number of fields to which an optical transmission system is applied has been increased with the recent development of the information society. For this reason, it is needed to achieve an optical transmission system having a variety of functions and the capacity to satisfy various specific requirements.

SUMMARY OF THE INVENTION

In view of the foregoing, it is an object of the present invention to provide an optical transmission system constructing method capable of easily constructing an optical transmission method and system depending on required functions and capacities.

Briefly, the foregoing object is accomplished in accordance with aspects of the present invention by an optical transmission system. The optical transmission system is characterized in constructing a line terminal having multiplexing means for multiplexing signals and demultiplexing means for demultiplexing the multiplexed signal so that to serve as a transmitter, the line terminal is selectively capable of implementing either of two types of converters: a first combination of an electric-to-optic converter circuit for converting the electric signal multiplexed by the multiplexing means to a transmission light with an optical fiber amplifier for amplifying the transmitting light before feeding into an optical transmission medium; or an electric-to-optic converting means having a semiconductor optical amplifier for converting the electric signal multiplexed by the multiplexing means to a transmission light before feeding an optical transmission line. The optical transmission system also is characterized in constructing the line terminal so that to serve as a receiver, the line terminal is selectively capable of implementing either a second combination of an optical fiber amplifier for amplifying a receiving light from an optical transmission medium with an optic-to-electric converter circuit for converting the amplified receiving light to electric signal before feeding to the demultiplexing means; or an optic-to-electric converting means for converting the received light from the optical transmission medium to electric signal before feeding to the demultiplexing means with an avalanche photodiode used as a light receiver.

Also, the optical transmission system is characterized in constructing the optical transmission system for use as a long distance optical transmission system, a plurality of the line terminals having the first combination to serve as the transmitter and the second combination to serve as the receiver implemented therein each are connected to the optical transmission medium through a single or a plurality of repeaters inserted in the optical transmission medium for multiplying the optical light signal on the optical transmission medium.

Further, the optical transmission system is characterized in constructing the optical transmission system for use as a short distance optical transmission system, the plurality of the line terminals having the electric-to-optic converting means having a semiconductor optical amplifier therein to serve as the transmitter and the optic-to-electric converting means having the avalanche photodiode used as the light receiver to serve as the receiver implemented therein each are directly connected to the optical transmission line.

The optical transmission system constructing method of the present invention enables an easy construction of any of the long-distance and short-distance optical transmission systems only by selecting desired types of the transmitters and receivers to be implemented to change the combinations of the units. This is because the line terminal is constructed so that to serve as the transmitter, the line terminal is selectively capable of implementing either the first combination of an electric-to-optic converter circuit for converting the electric signal multiplexed by the multiplexing means to the transmission light with an optical fiber amplifier for amplifying the transmitting light before feeding into an optical transmission medium or electric-to-optic converting means having the semiconductor optical amplifier for converting the electric signal multiplexed by the multiplexing means to the transmission light before feeding an optical transmission line, and that to serve as the receiver, the line terminal is selectively capable of 10 implementing either the second combination of an optical fiber amplifier for amplifying the receiving light from an optical transmission medium with an optic-to-electric converter circuit for converting the amplified receiving light to electric signal before feeding to the demultiplexing means or an optic-to-electric converting means for converting the received light from the optical transmission medium to electric signal before feeding to the demultiplexing means with an avalanche photodiode used as light receiver.

The foregoing and other objects, advantages, manner of operation and novel features of the present invention will be understood from the following detailed description when read in connection with the accompanying drawings. BRIEF DESCRIPTION OF THE DRAWINGS FIG. 1 is a block diagram for a functional construction of an optical transmission system of an embodiment of the present invention.

Figure 32:
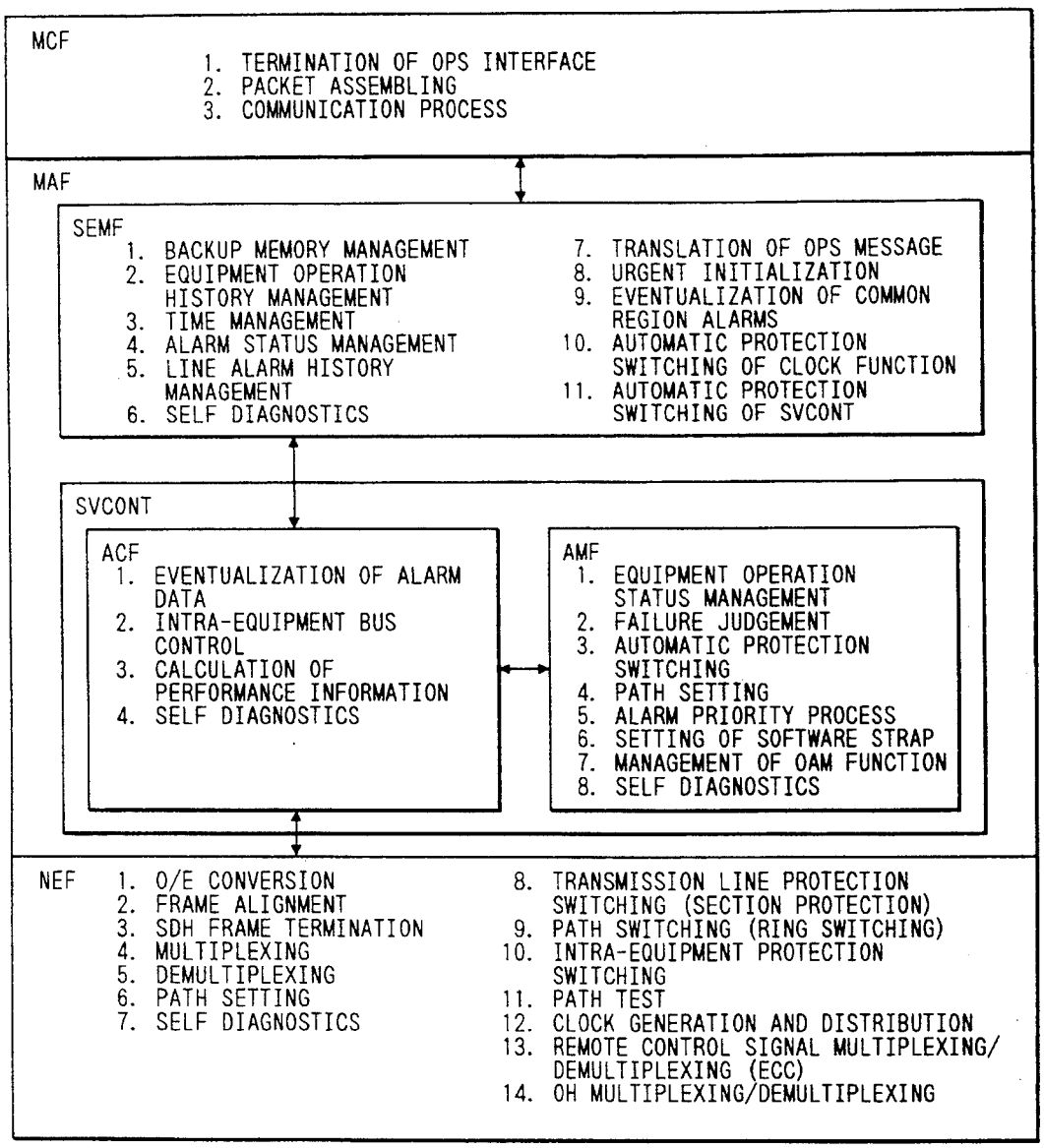

FIG. 32 lists features of the functional blocks of the surveillance and control system.

Figure 33:
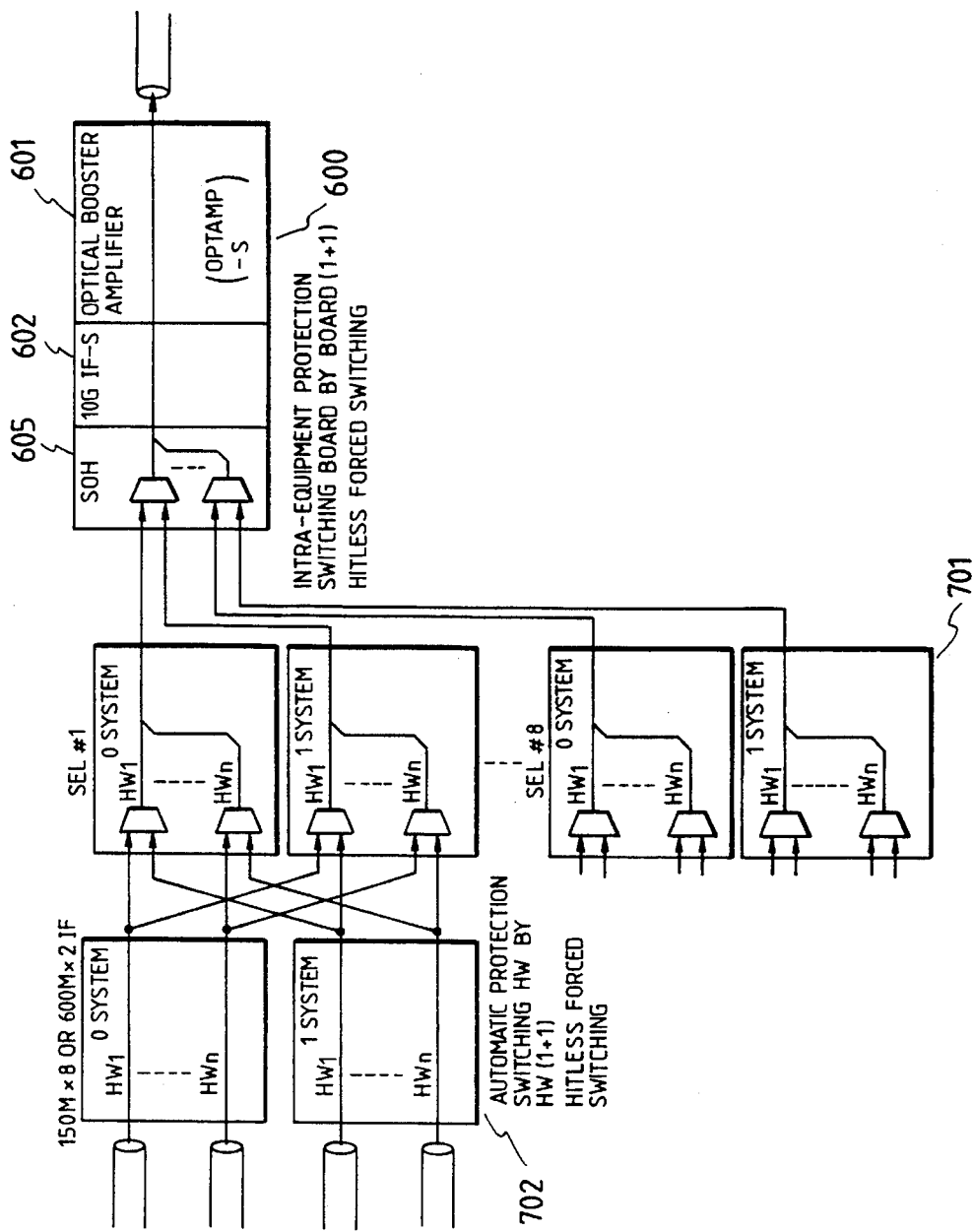

FIG. 33 is a block diagram for a redundancy configuration of a transmitting system in the LT-MUX.

Figure 34:
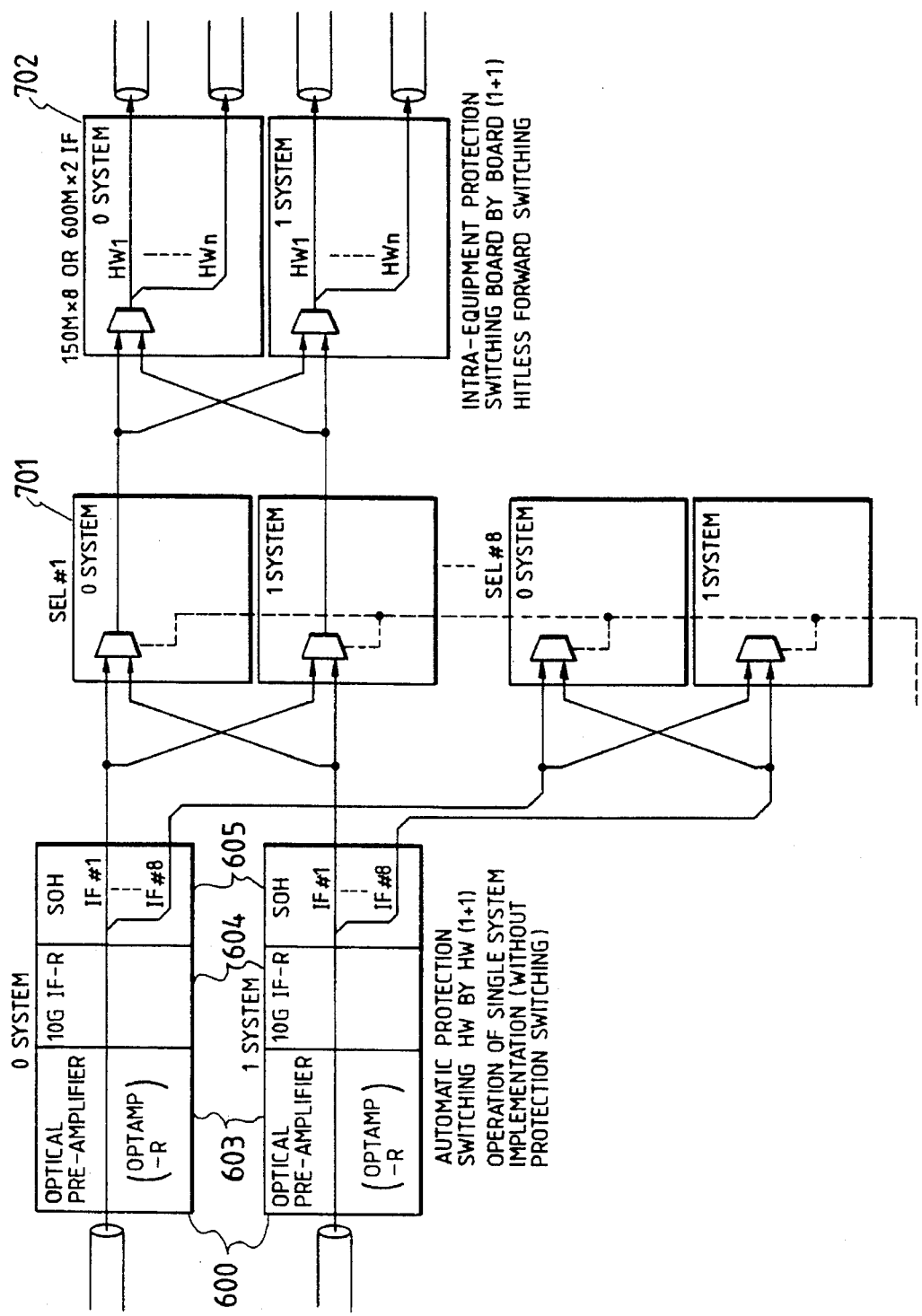

FIG. 34 is a block diagram for the redundancy configuration of a receiving system in the LT-MUX.

Figure 35:
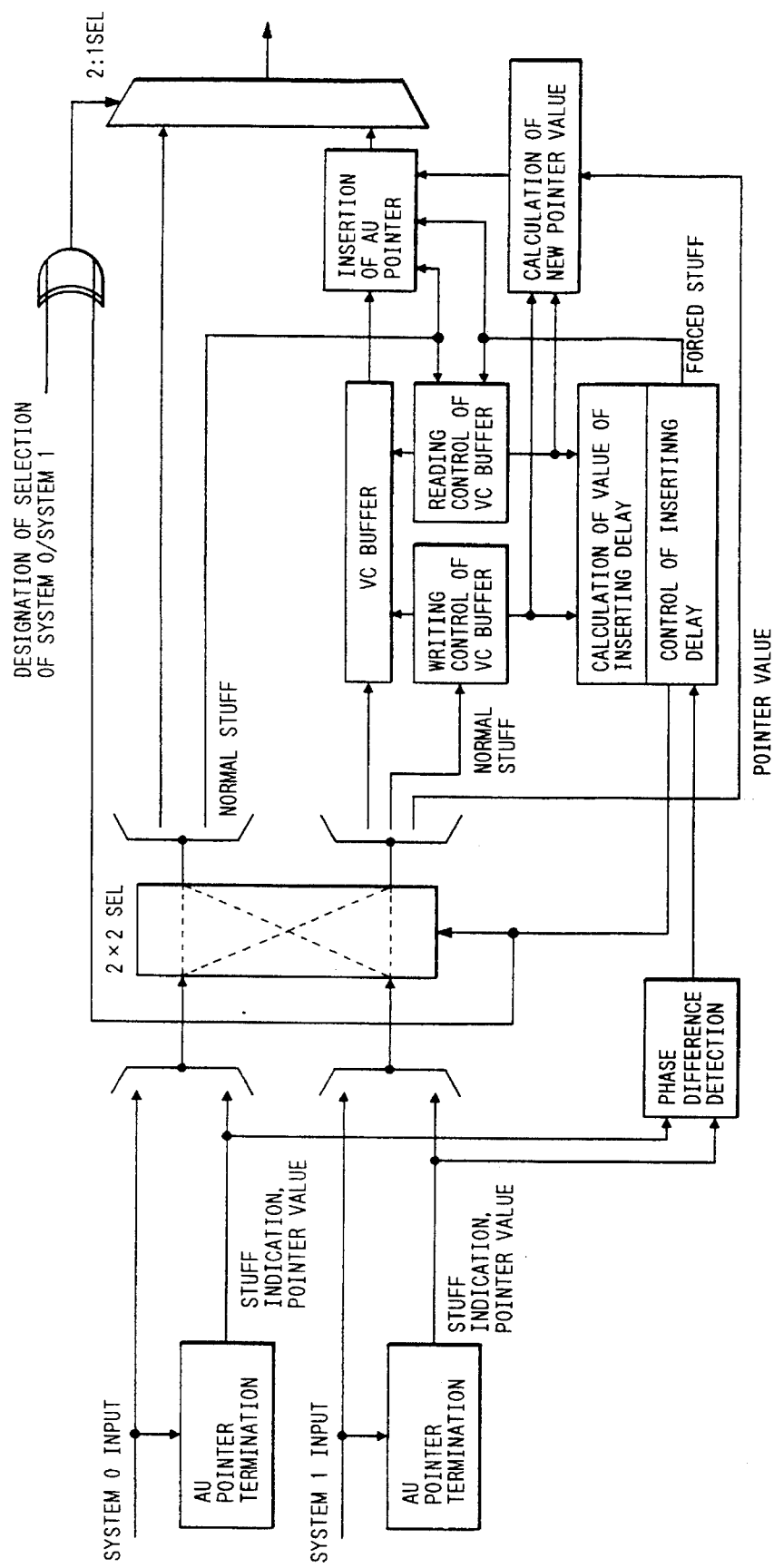

FIG. 35 is a block diagram for construction of a hitless switching process feature section for transmission line.

Figure 36:
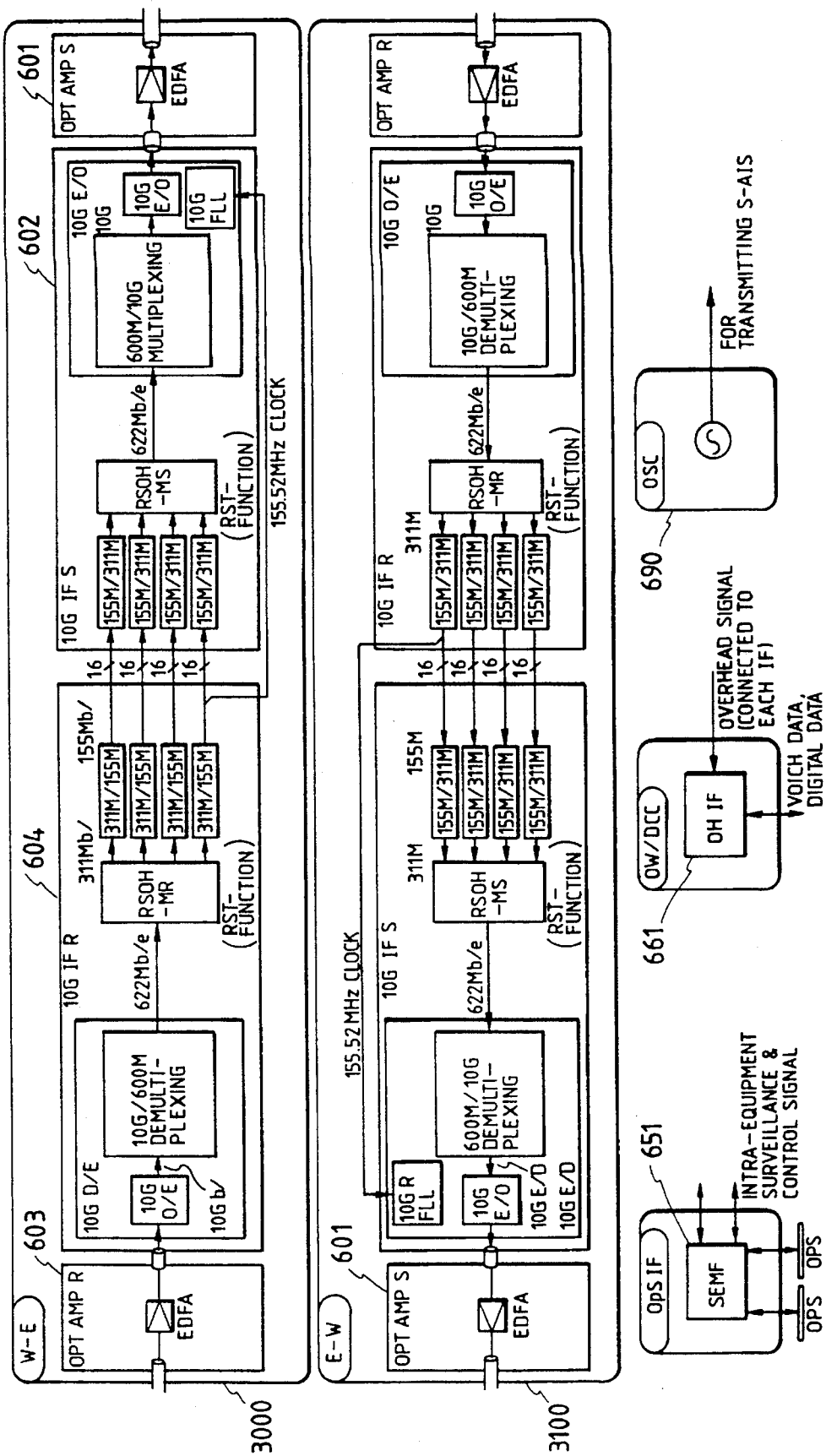

FIG. 36 is a block diagram for a construction of a 3R-REP.

Figure 37:
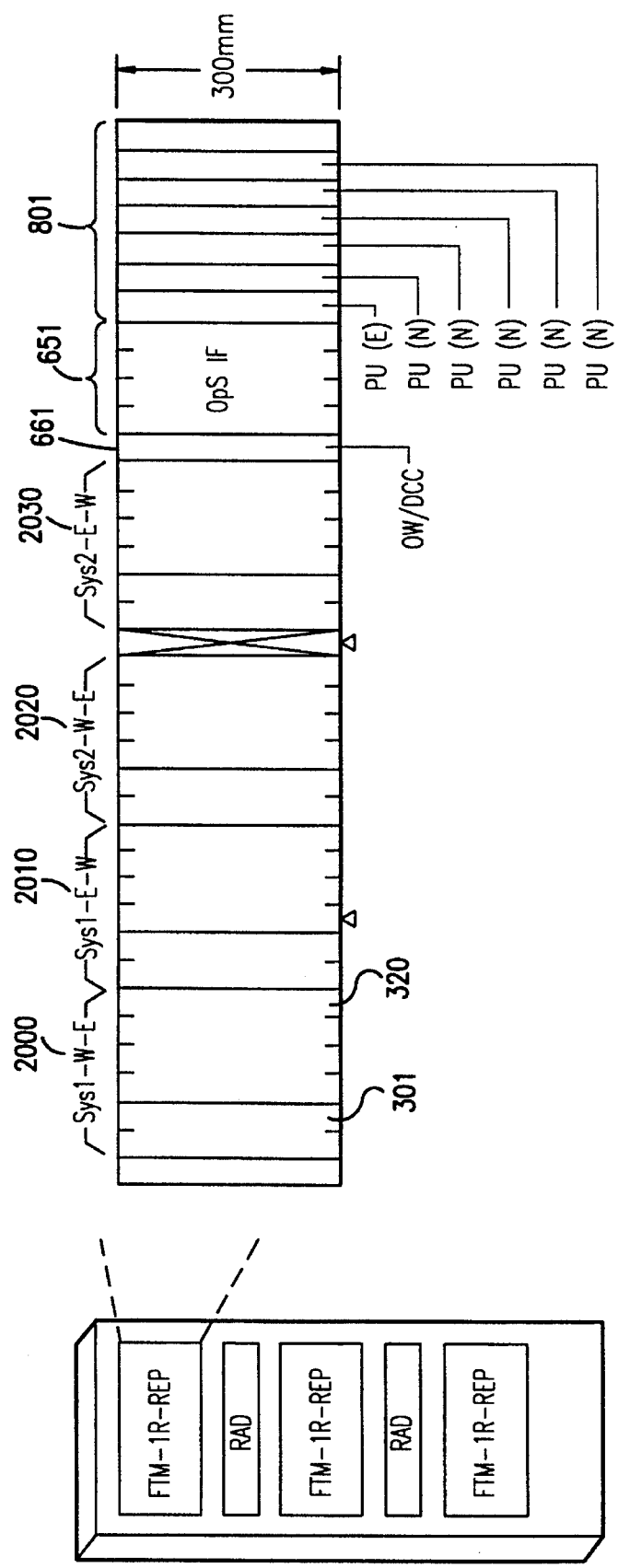

FIG. 37 is a front view for an implementation of the 1R-REP.

Figure 38:
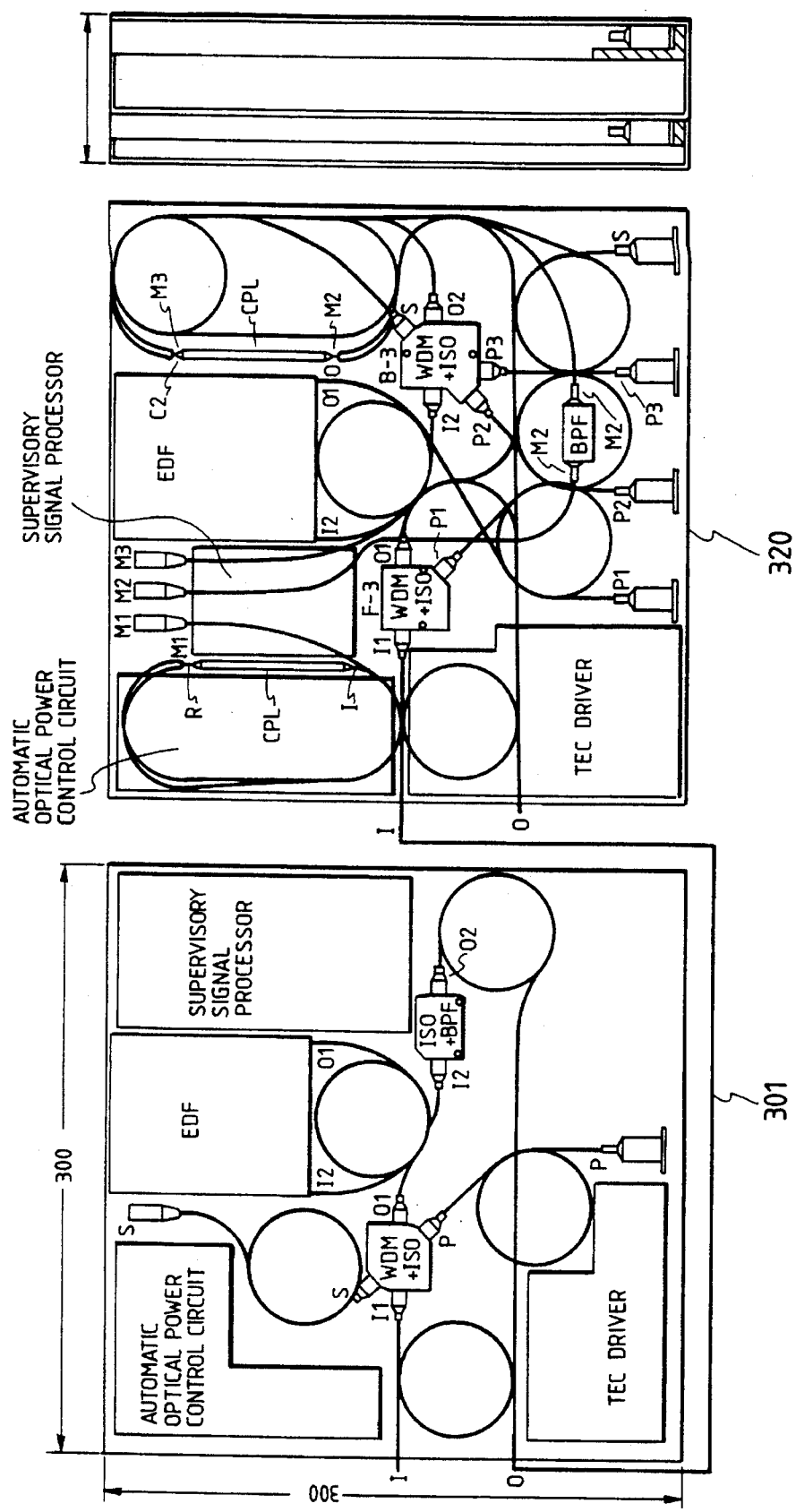

FIG. 38 is structures of a optical preamplifier and optical booster amplifier forming a single 1R-REP system.

Figure 39:
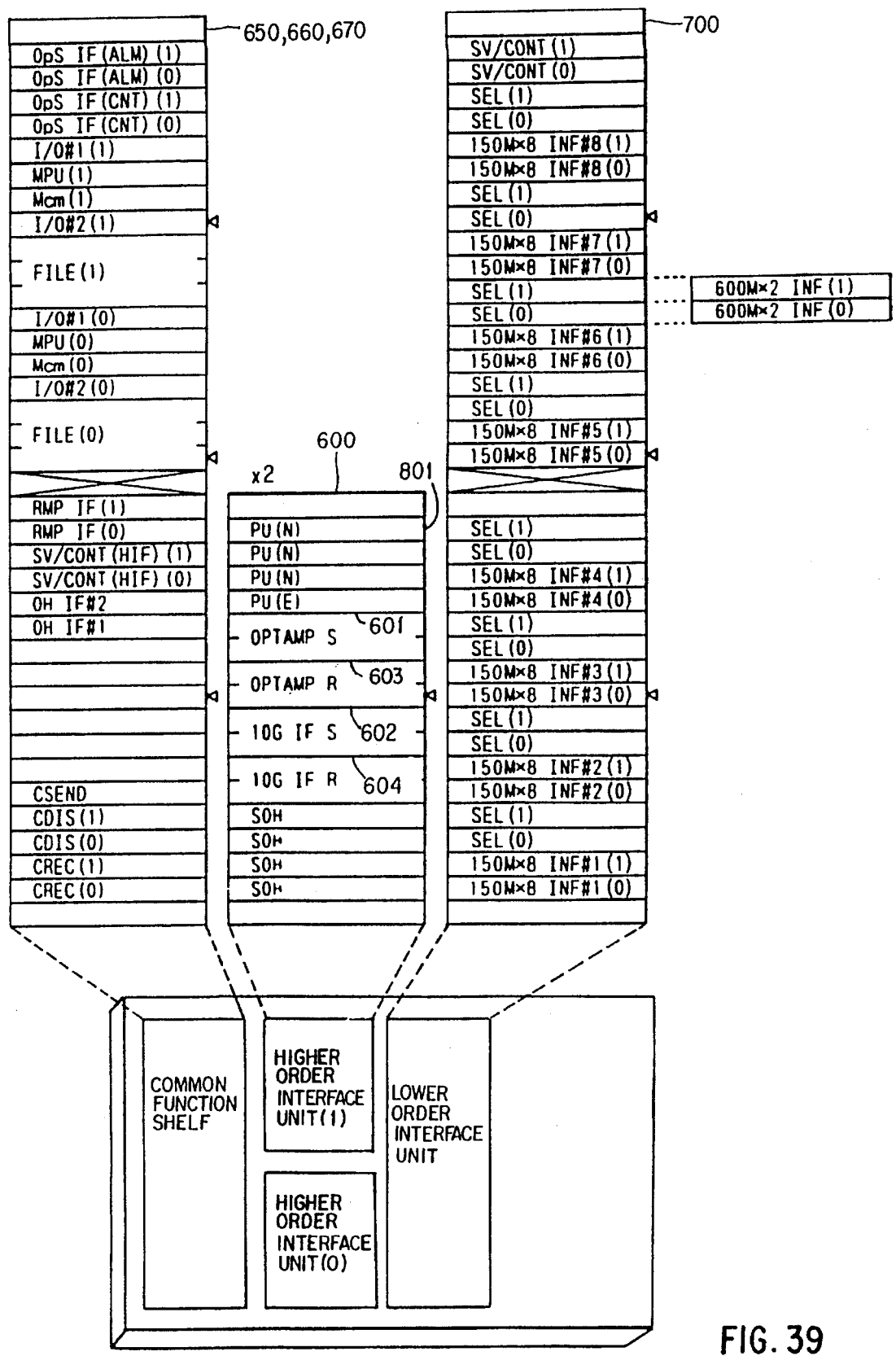

FIG. 39 is a front view for an implementation of the LT-MUX.

Figure 40:
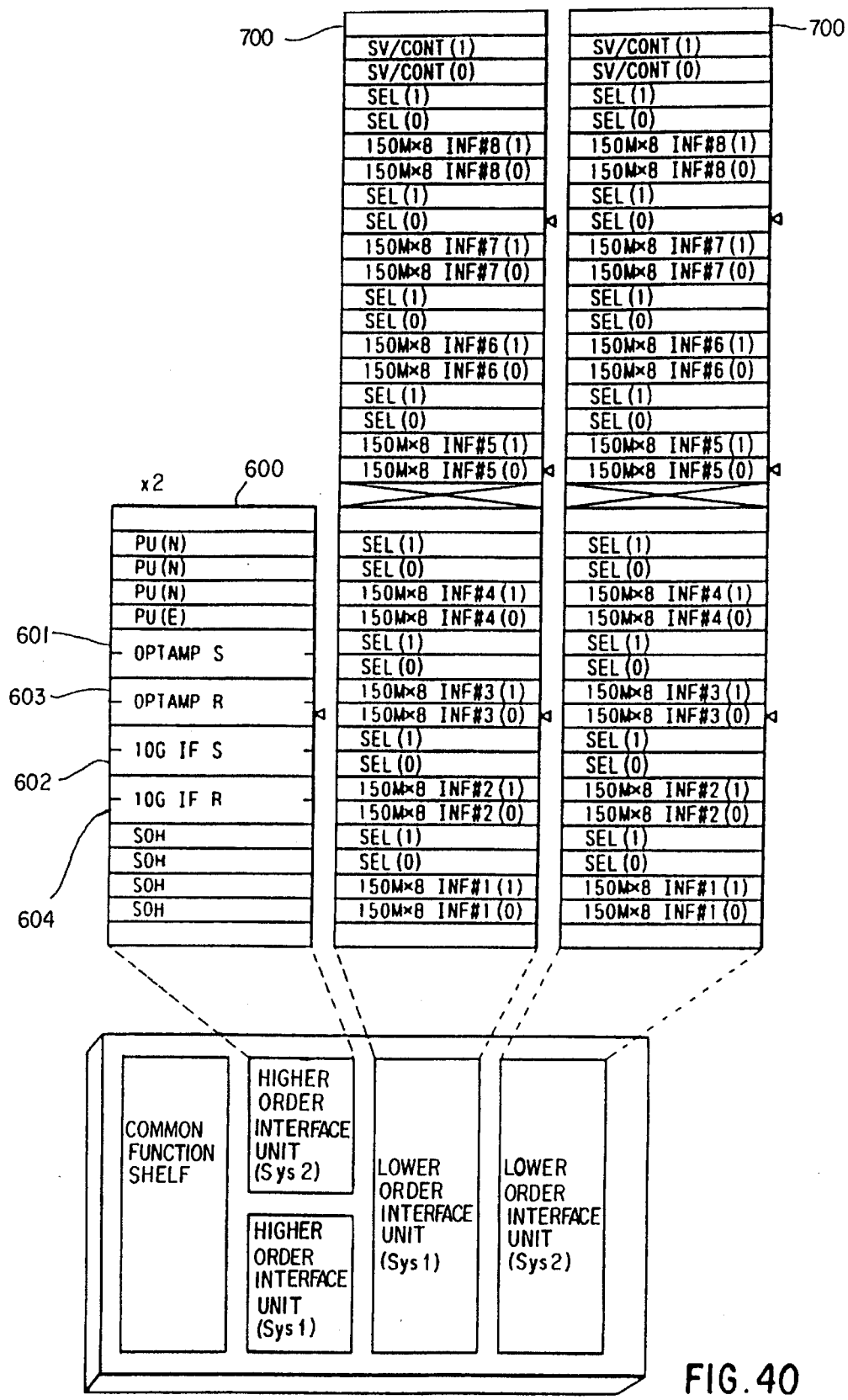

FIG. 40 is a front view for an implementation of two systems of the LT-MUX in a single rack without the line redundancy configuration.

Figure 6A:
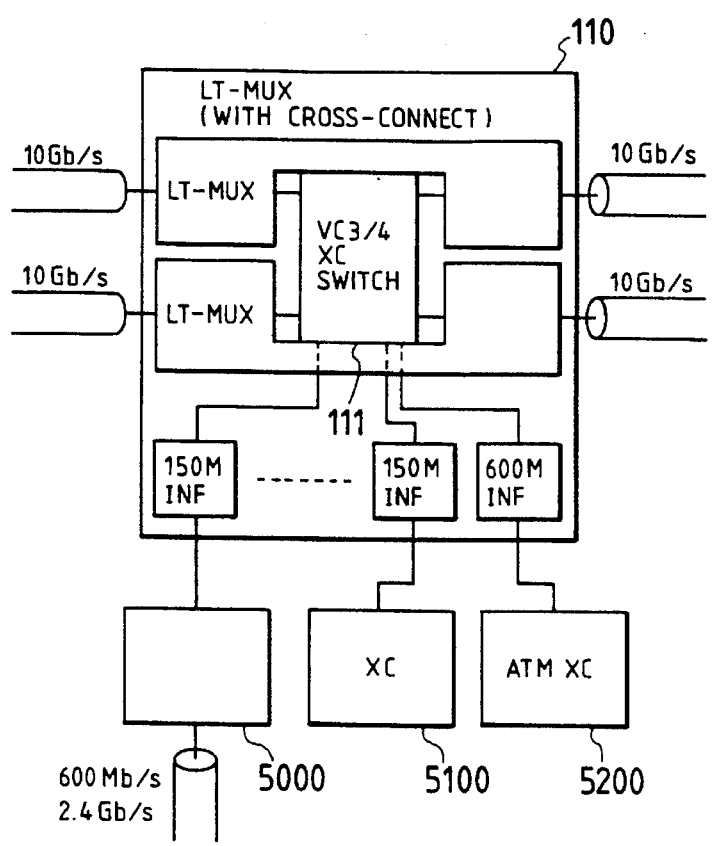
FIG. 6 is block diagrams for a functional construction of a node.
Figure 6B:
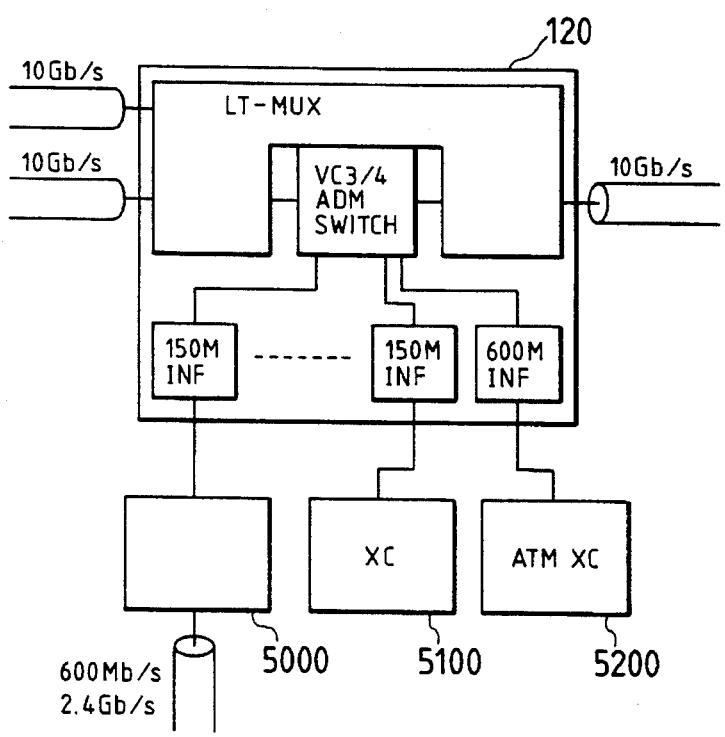
Figure 41:
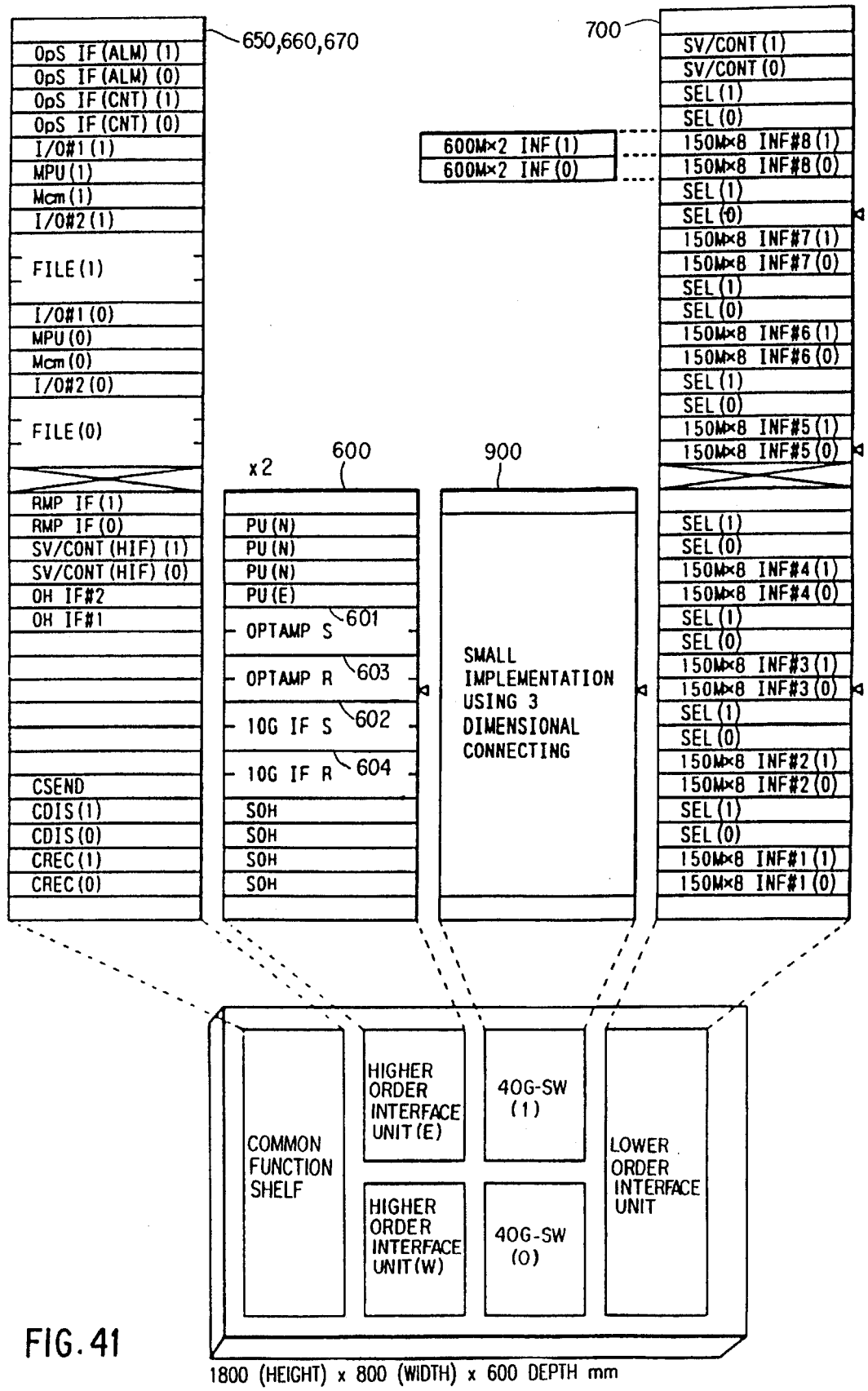

FIG. 41 is a front view for an implementation of the LT-MUX for constructing the small scale switching node with a 40G switch unit built in as shown in FIG. 6b.

Figure 42:
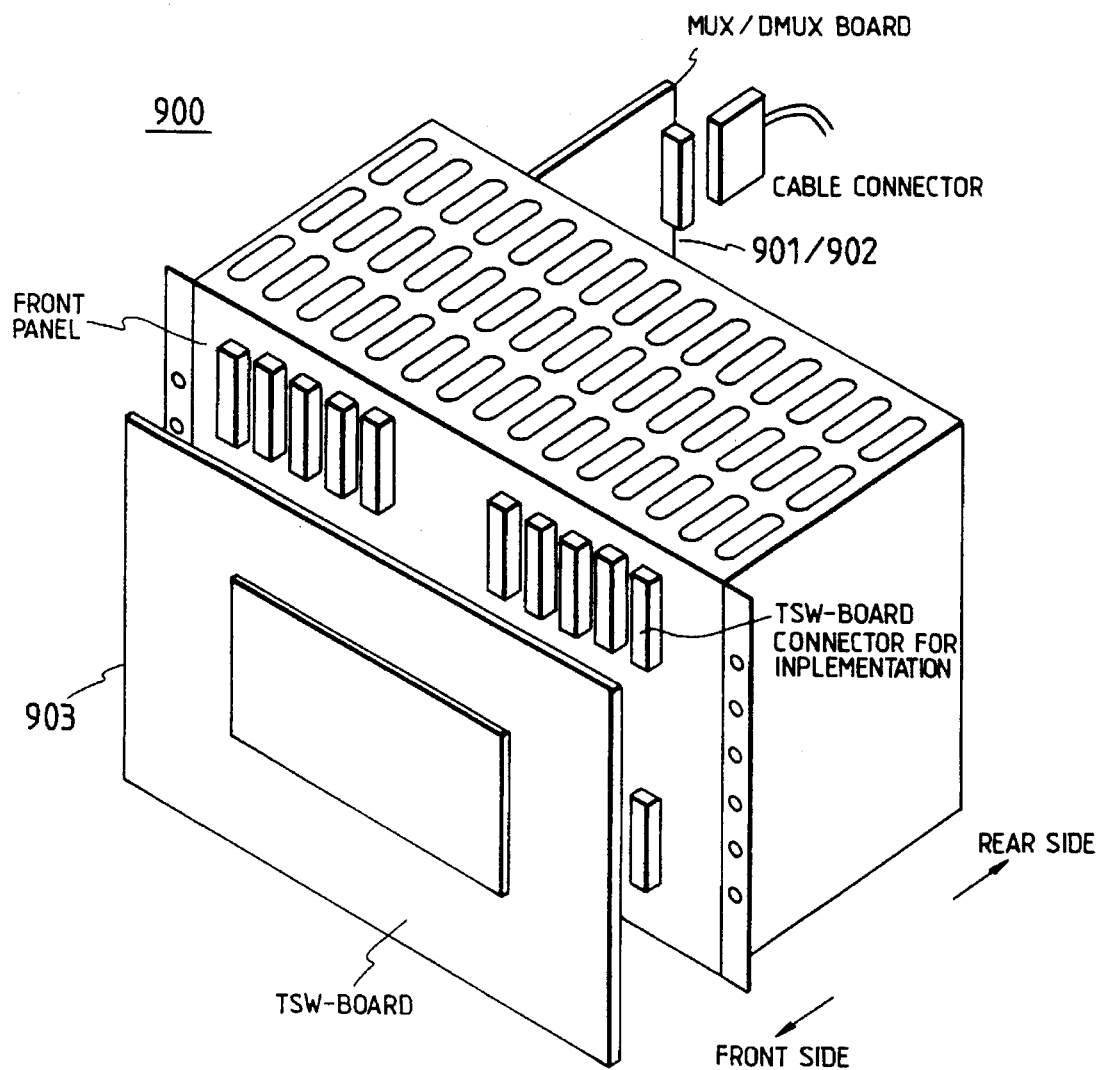

FIG. 42 is a structural view for a 40G switch.

Figure 43A:
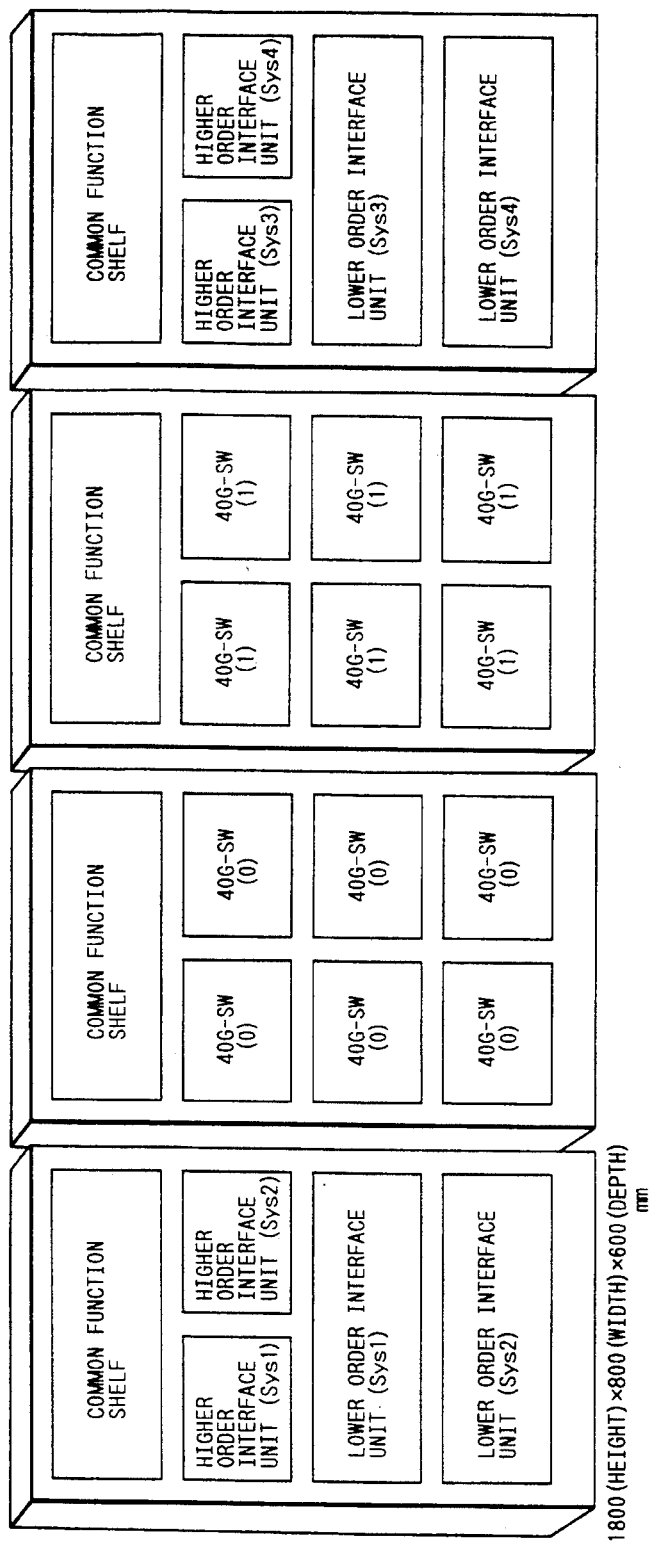
Figure 43B:
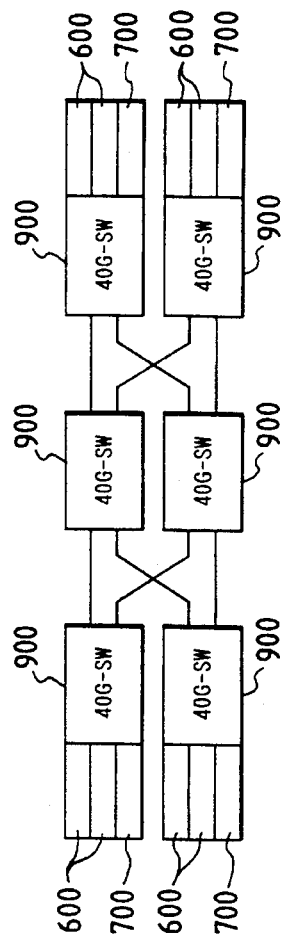

FIG. 43 is a front view of an implementation of the LT-MUX for constructing the large scale switching node.

Figure 44:
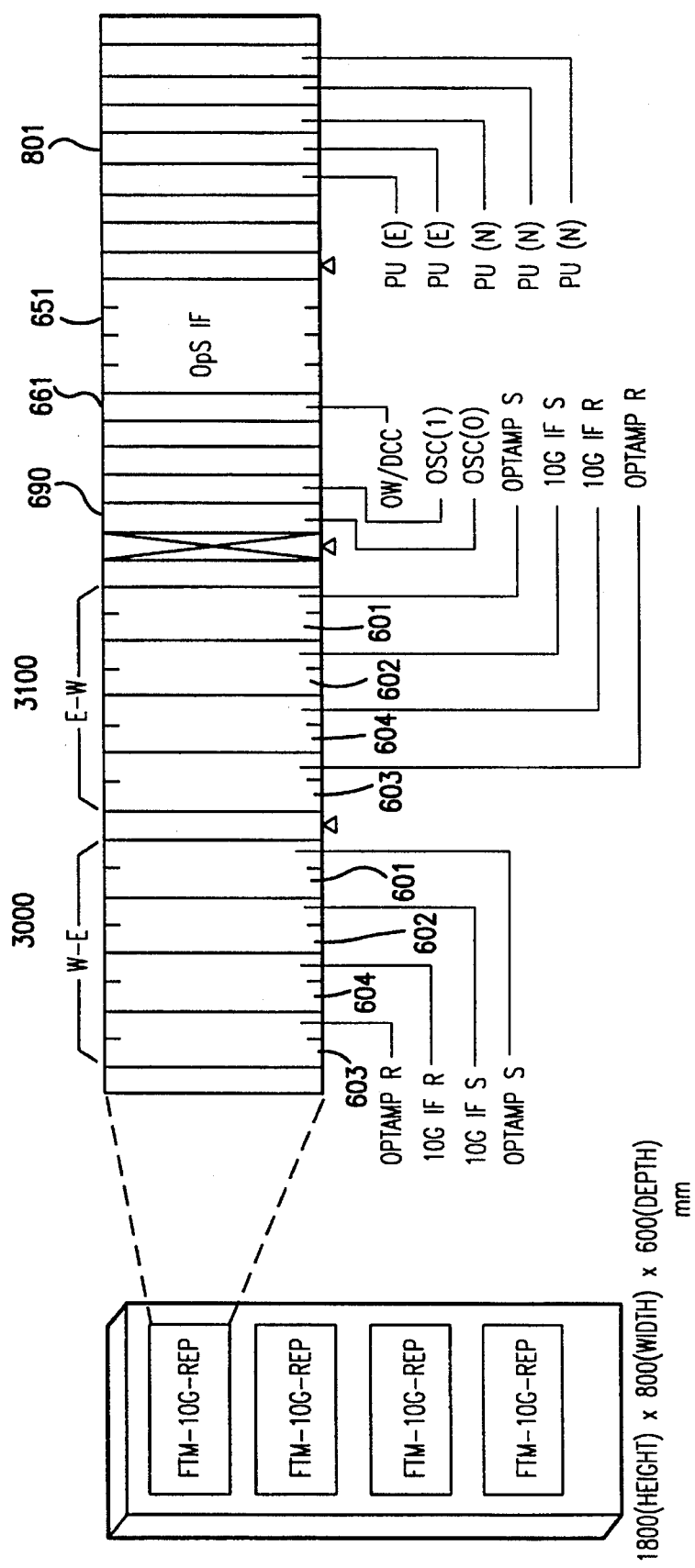

FIG. 44 is a front view of an implementation of the 3R-REP.

DETAILED DESCRIPTION

The following describes an embodiment according to the present invention for the optical transmission system by reference to the accompanying drawings.

1. General Description

First, this section outlines the optical transmission system of the embodiment.

FIG. 1 is a block diagram for the functional construction of the optical transmission system of the embodiment.

Figure 1A:
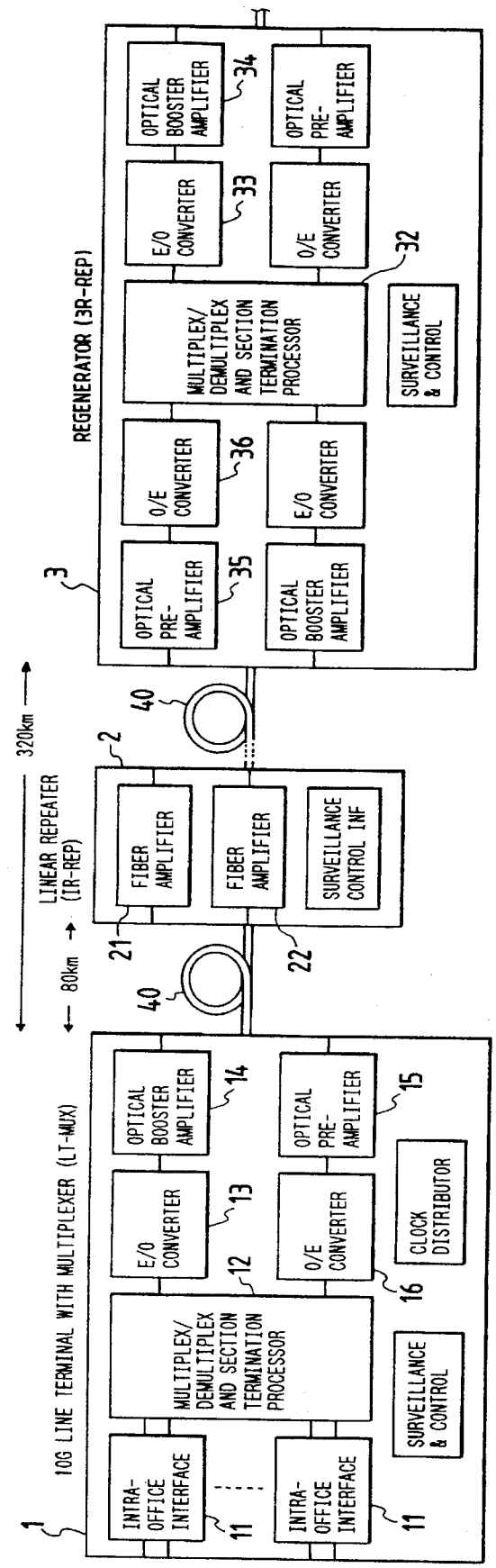

The optical transmission system, as shown in FIG. 1a, is an ultra-long distance transmission system for making optical transmission between line terminals with multiplexers (hereinafter referred to as the LT-MUX 1) or between the LT-MUX 1 and a regenerator (hereinafter referred to as the 3R-REP 3) with use of an optical amplifier repeater (hereinafter referred to as the 1R-REP 2). The system can send the data at 10 Gb/sec through an optical fiber 40 up to 320 km by the 3R-REP 3 at the longest intervals of 80 km by the 1R-REP 2.

The LT-MUX 1 makes a multiplex and section-termination-process (12) of the data received by an intra-office interface 11 provided therein, and converts them to an optical signal (13). An optical booster amplifier 14 magnifies the optical signal before feeding it into an optical transmission medium. On the contrary, the data received from the optical transmission medium is magnified by an optical pre-amplifier 15 before being converted to an electrical signal (16). The signal then is demultiplexed and section-termination-processed (12) before being distributed to the intra-office interfaces 11. The 1R-REP 2 repeats the optical signal in a way that any of optical fiber amplifiers 21 and 22 magnifies the optical signal received from the optical transmission medium before feeding it out. The 3R-REP 3 regenerates the data to repeat in a way that the data received from the optical transmission medium are magnified by an optical pre-amplifier 35 before being converted to electrical signal (36). The electrical signal then is demultiplexed and section-termination-processed (32) and is multiplexed and section-termination-processed (32) again. It further is converted to optical signal (33) and magnified by an optical booster amplifier 34 before being fed into the optical transmission medium.

The interface of any equipment with the optical transmission medium (hereinafter referred to as the inter-office interface) is equivalent to the CCITT recommended synchronous transport modulelevel N (STM-N) where N=64, and uses a scrambled binary NRZ (non-return to zero) as transmission line code. A spectrum broading is used to prevent a stimulated Brillouin scattering due to a higher power output.

The intra-office interface 11 of the LT-MUX 1 can contain a series of STM-1 (150 Mb/sec) by 64 or a series of STM-4

(600 Mb/sec) by 16. (Note that the series of STM-4 (600 Mb/sec) by 1 can be compatible with the series of STM-1 by 4).

The optical transmission system can be configured in another way so that instead of the 1R-REP 2 shown in FIG. 1a, the LT-MUXes 1 are directly connected together or the LT-MUX 1 is directly connected with the 3R-REP 3. In this case, the transmission distance is up to 120 km without repeater.

Figure 1B:
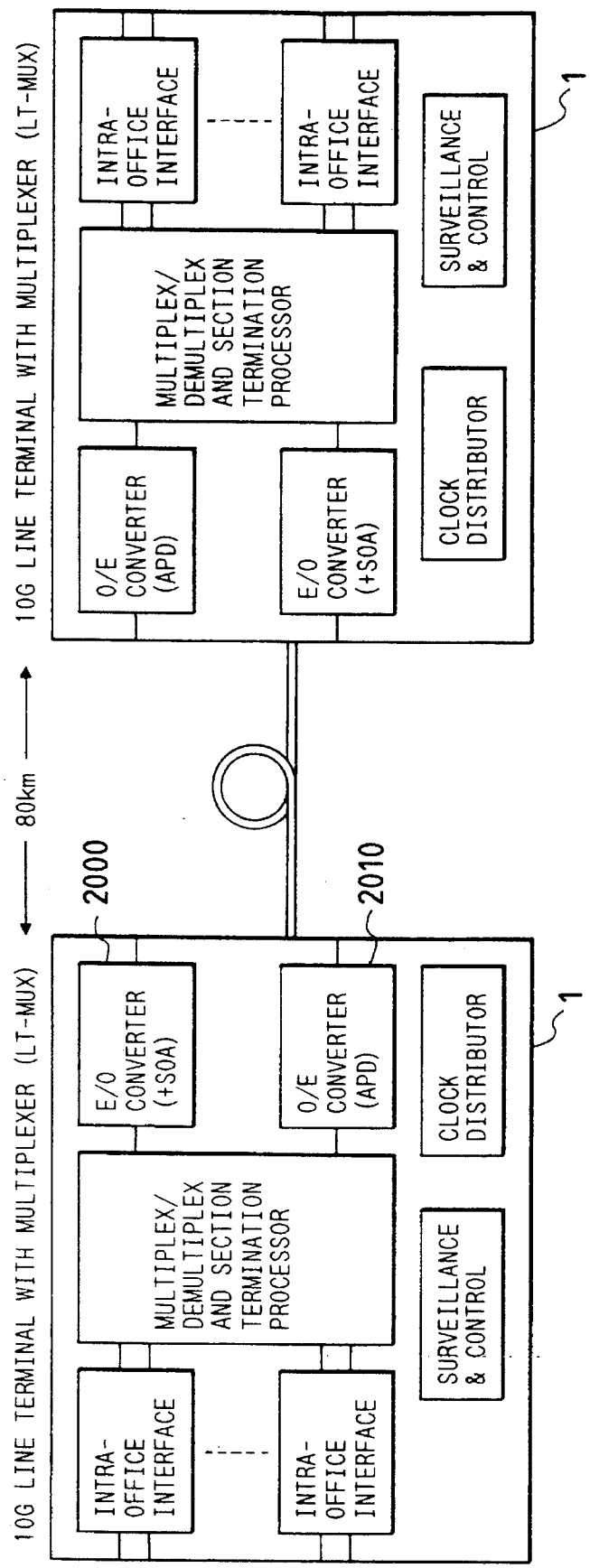

Also, the optical transmission system can be configured in still another way such as that shown in FIG. 1b, the 1R-REP 2, the optical booster amplifier 14, and the optical preamplifier 15 are omitted, but LT-MUXes 1 having an opto-electric converter 2010 and an electro-optic converter 2000 which are different in the characteristics from those of the LT-MUX 1 in FIG. 1a are directly connected together. In this case, the output level is around +6 dBm, and the transmission distance is up to 80 km without repeater.

The optical transmission system having the LT-MUX 1, the 3R-REP 3, the optical booster amplifier 14, and optical preamplifier 15 is called the long-distance system hereunder; and the optical transmission system having no optical booster amplifier 14 and optical preamplifier 15 in the LT-MUX 1 and 3R-REP 3 is called the short distance system hereunder.

2. Overall System Configuration

In turn, this section describes a network system having the optical transmission system of the embodiment.

Figure 2:
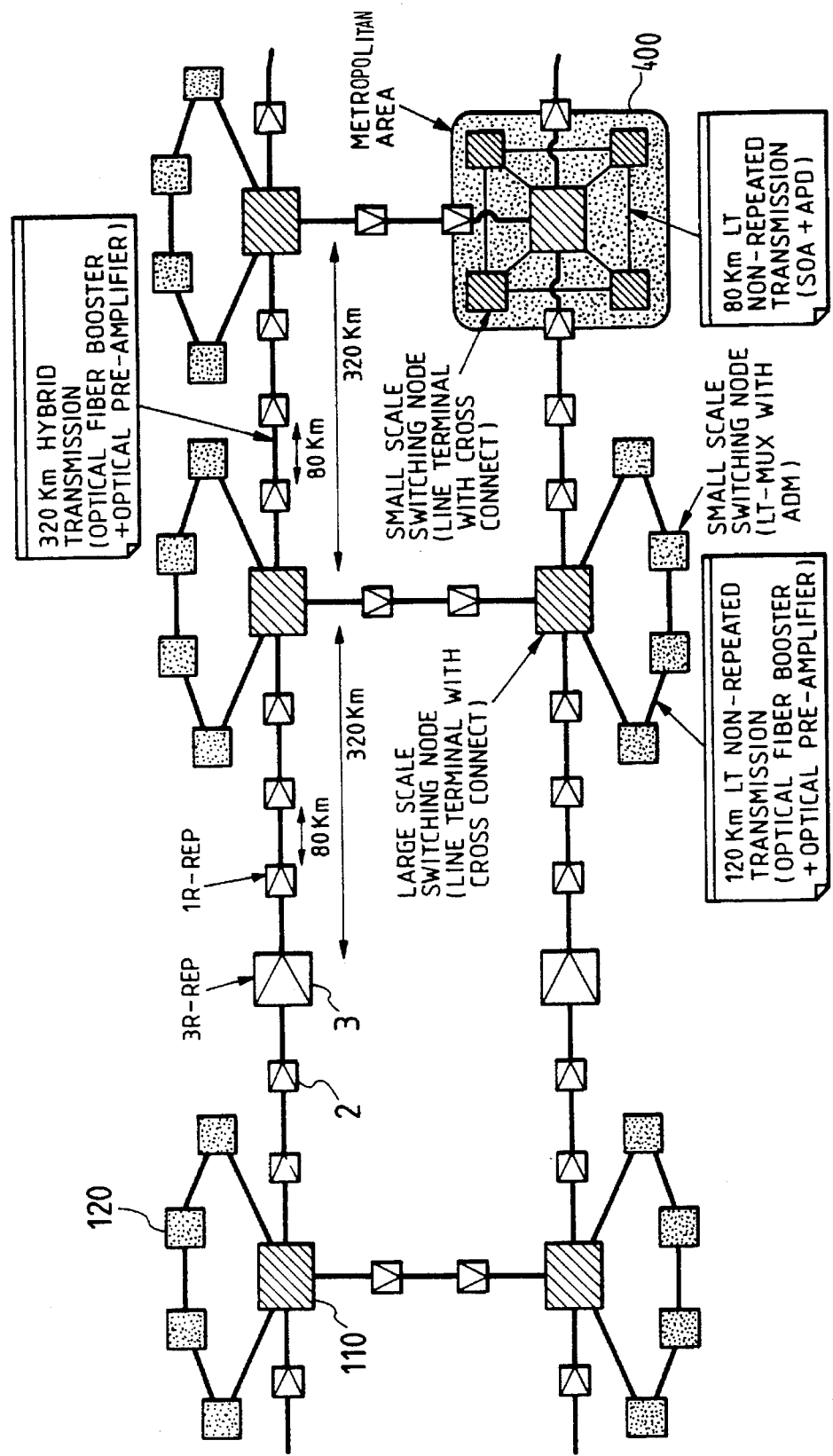
FIG. 2 is an overall configuration for a network system related to the embodiment of FIG. 1.

FIG. 2 is an overall configuration for a network system related to the embodiment.

In the figure are indicated a large scale switching node 110 having the LT-MUX 1 of the embodiment and a small scale switching node 120 having the LT-MUX 1 of the embodiment.

The large-scale switching nodes 110 in the network system related to the embodiment, as shown in the figure, are directly connected therebetween in a ladder-shaped structure with use of the 1R-REP 2 and the 3R-REP 3. The network system has routes diversed therein and the CCITT recommended VC-3/4 path protection switch in the meshed network, thereby increasing reliability of the network. The small-scale switching nodes 120 are ring-structured, and the small-scale switching nodes 120 and the large scale switching nodes 110 are also ring-structured. This does not only provide a multiplexing effect that allows efficient use of the large-capacity transmission medium, but also keeps two routes that can increase the reliability. In addition, a metropolitan area 130 has a multiplicity of rings for increasing the reliability in a relatively narrow, but large, traffic area extending in a flat wide area.

Figure 3:
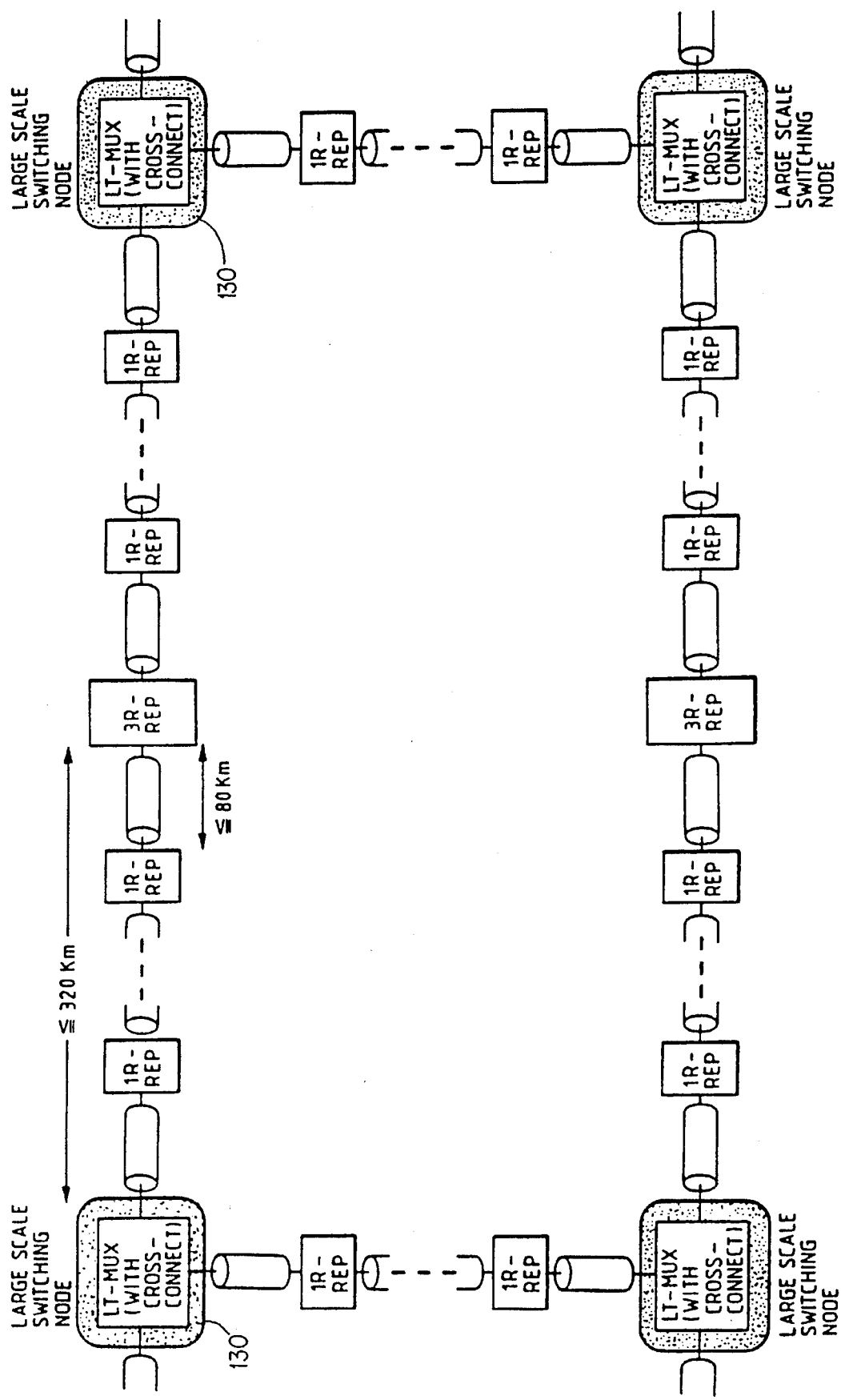
FIG. 3 is a configuration for a network among a large-scale switching nodes extracted from the network system of FIG. 2.

FIG. 3 is a configuration for a network among the large-scale switching nodes 110 extracted from the network system.

The large-scale switching nodes 110, as shown in the figure, are directly connected there among with use of the 1R-REPs 2 and the 3R-REPs 3 without switching through an intermediate node, thereby decreasing the line cost. A distance between the 1R-REPs 2 is designed up to 80 km, taking into account the S/N ratio, and the distance between one of the 3RREPs 3 and the node is up to 320 km in consideration of the nonlinear distortion of the designed optical fiber.

Figure 4:
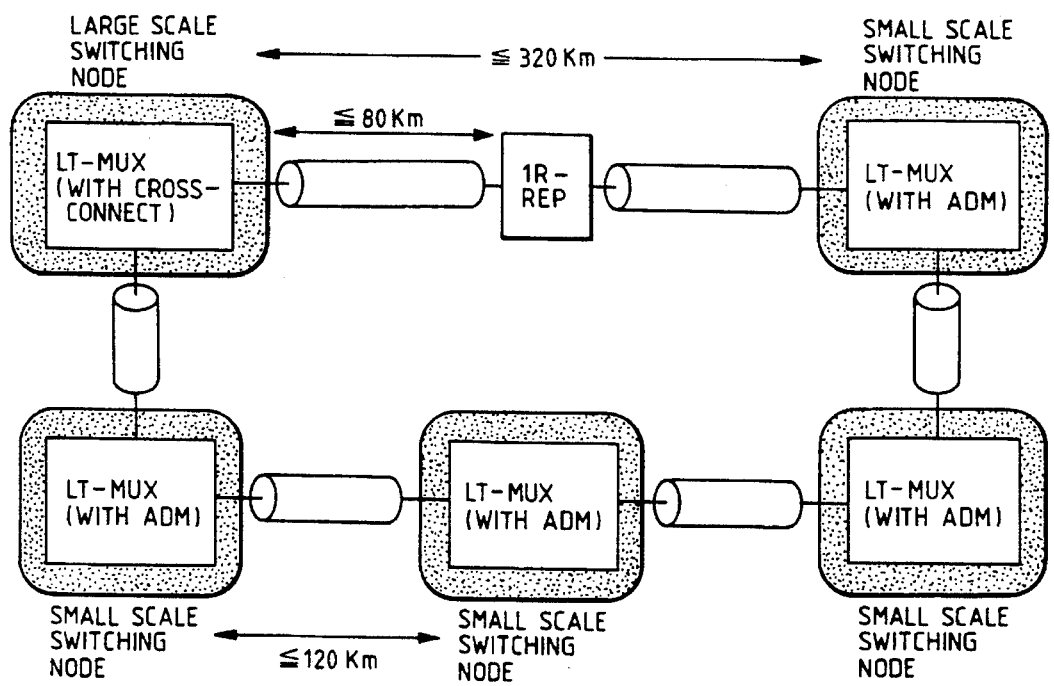
FIG. 4 is a configuration for a network among small-scale switching nodes and among small-scale switching nodes and the large scale switching node extracted from the network system.

FIG. 4 is a configuration for a network among the small-scale switching nodes 120 and among the small-scale switching nodes 120 and the large scale switching nodes 110 extracted from the network system.

If a distance between the small-scale switching nodes 120 is shorter than 120 km, as shown in the figure, no repeaters are used and instead direct connection is made between any two of the smallscale switching nodes 120. If the distance exceeds 120 km, the 1R-REP 2 is used to make the long distance system as mentioned previously. If the distance is shorter than 80 km, as will be described in detail later, the 10 Gb/sec transmitter is replaced by the one made up of a semiconductor optical amplifier and an APD (avalanche photodiode) to form a further economic short distance system (FIG. 1b).

Figure 5:
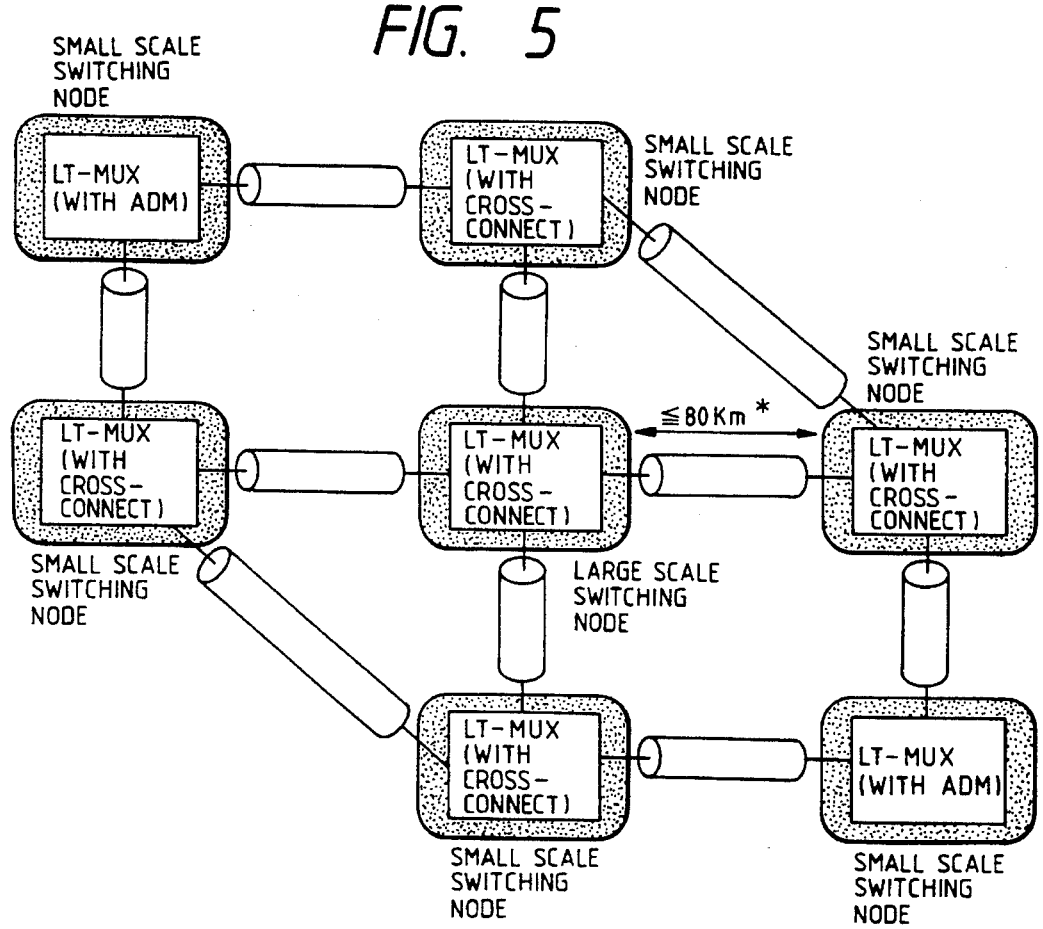
FIG. 5 is a configuration for a network for a metropolitan area extracted from the network system.

FIG. 5 is a configuration for a network for the metropolitan area extracted from the network system.

The metropolitan area, as shown in the figure, has a plurality of adjoining rings formed of the transmission media connecting the nodes in a meshed network, thereby accomplishing efficient multiplex operation and high reliability. It should be noted that there will be a greater number of the shorter node distances than 80 km. Then, as described above, the short distance system is made up of the semiconductor optical amplifier and the APD to form the network at low cost.

FIG. 6 is block diagrams for the functional construction of the node.

The large scale switching node 110, as shown in FIG. 6a, has two LT-MUXes 1 and a VC-3/4 cross-connection switch 111 for path switching and setting at the VC-3/4 level in the synchronous digital hierarchy (SDH). The two LT-MUXes 1 are connected by a high-speed interface which will be described later, but not any intra-office interface. The large scale switching node 110 also has the STM-1 interface and the STM-4 interface as the intra-office interfaces. These interfaces can connect a line repeater terminal 5000 for transmission between a 600 Mb/sec or 2.4 Gb/sec offices, a cross-connection equipment 5100 for terminating the intra-office interface 111, and an ATM cross-connection switch 5200. The ATM cross-connection switch 5200, if used, can accomplish lower cost and decrease cell delay as the 600 Mb/sec intra-office interface is used. Note that the large scale switching node 110 can be alternatively made up of the two LTMUXes 1 and a cross-connect equipment 111.

The small scale switching node 120 is the same as the large scale switching node 110 or as shown in FIG. 6b, has the LT-MUX 1 and a VC-3/4 add-drop multiplex (ADM) switch. The small scale switching node 120 also, like the large scale switching node 110, has the STM-1 interface and the STM-4 interface as the intra-office interfaces, which can connect the line repeater terminal 5000 for transmission between a 600 Mb/sec or 2.4 Gb/sec offices, the cross-connection equipment 5100 for terminating the intraoffice interface 11, and the ATM cross-connection switch 5200.

The intra-office interface 11 of the LT-MUX 1 is used for the STM-1 interface and the STM-4 interface for each node. Table 1 shows a hierarchy of the network system and terminals at the respective hierarchy level.

TABLE 1

| NO. | LEVEL | TERMINAL | OVERHEAD |
|---|---|---|---|
| 1 | VC-3/4 | VC-1/2 processors, and ATM unit | VC-3/4 POH |
| 2 | VC-3/4 path group (VC-3/4 PG) | VC-3/4 cross-connector (virtual ring branch - insertion point) | Z3 byte of representing VC-3/4 POH |
| 3 | STM-64 section | LT-MUX | MSOH |
| 4 | Regenerator | 3R-REP and LT-MUX | RSOH |

TABLE 1-continued

| NO. | LEVEL | TERMINAL | OVERHEAD |
|-----|-------|----------|----------|
| 5 | Linear repeater section | 1R-REP, 3R-REP, LT-MUX | Wavelength multiplexed management signal |

As shown in the table, the present embodiment defines the new VC3/4 path group to accomplish easy path switching upon failure of any transmission medium.

Figure 8:
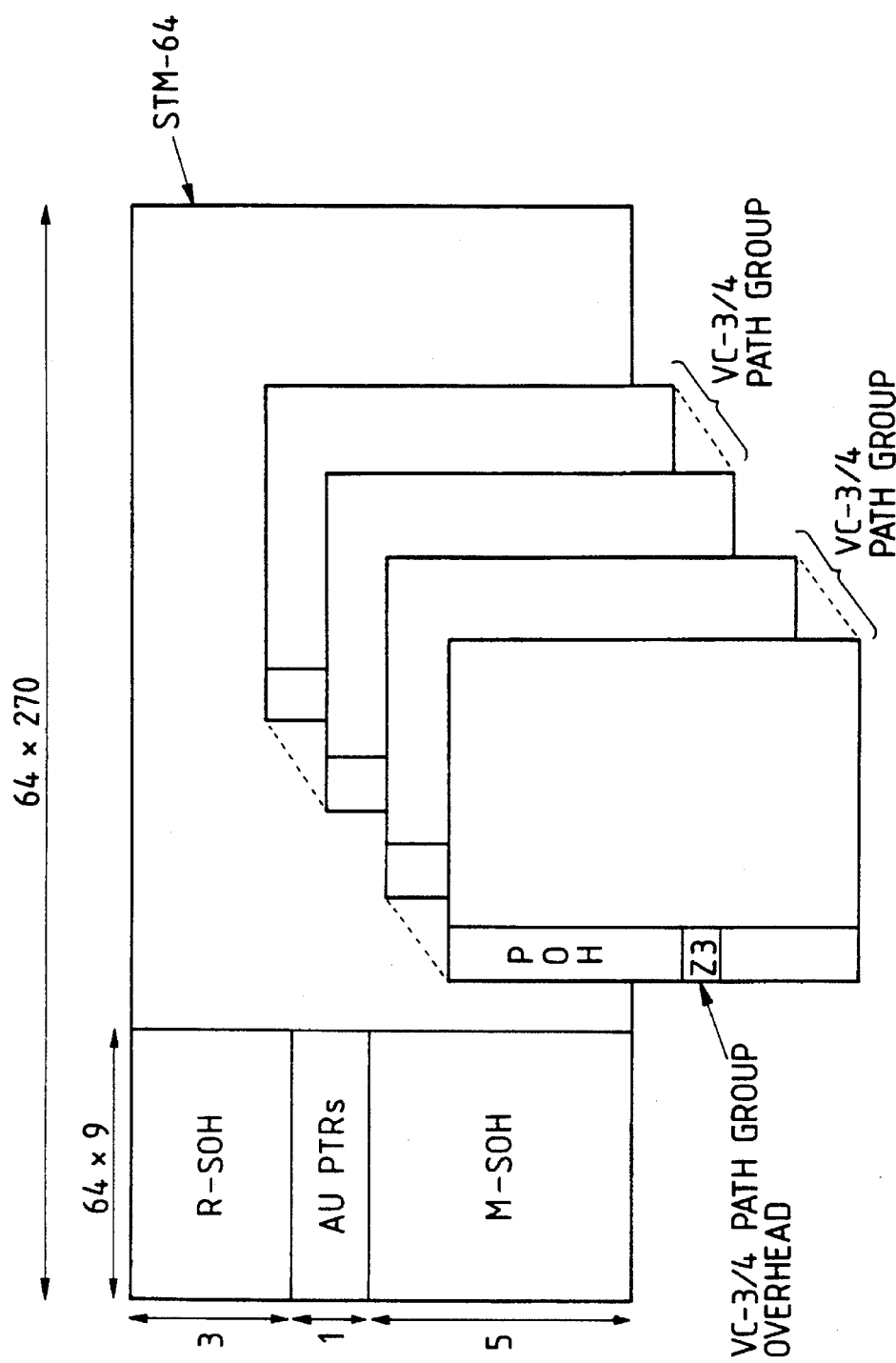
FIG. 8 is a frame construction for a multiplexing frame used in the network system.

FIG. 8 is a frame construction for an STM-64 which is an inter-office interface.

The overhead for the VC-3/4 path group, as shown in the figure, is the Z3 byte of the representing VC-3/4 POH forming the VC-3/4 path group.

The following describes the path switching with use of the path group at failure of any transmission medium.

Figure 9:
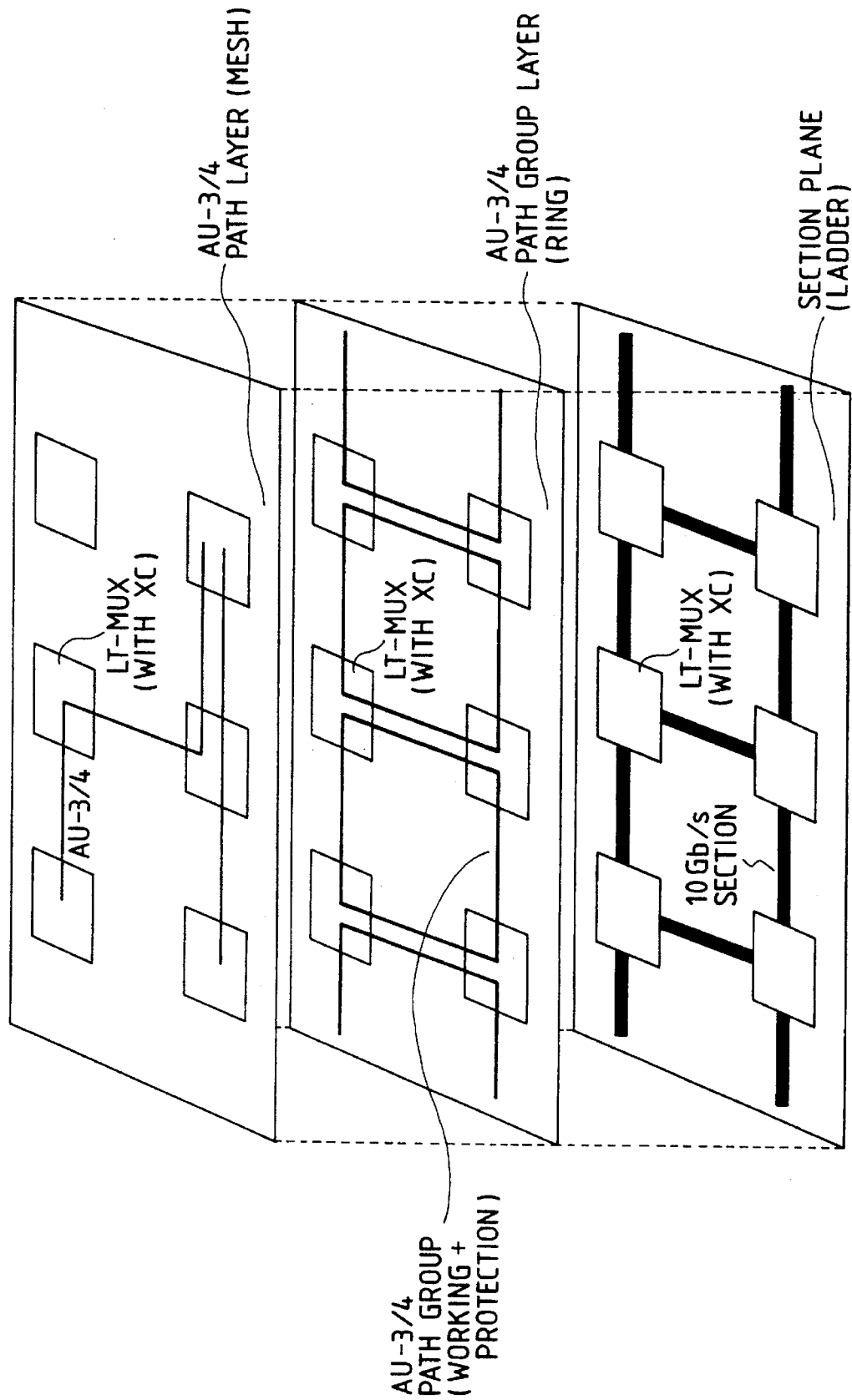
FIG. 9 is logical positions of path groups.

The term "path group" as used herein denotes a set of parts within a ring of the VC-3/4 path that a point of insertion into a virtual ring is equal to each other and a point of branch from the virtual ring is equal to each other. The term "virtual ring" as used herein denotes a ring extracted from the network as a part which can virtually form a ring-like path. It should be noted that as shown in FIG. 9, the path group is positioned between section plane and path layer in view of the network layer structure.

Figure 10:
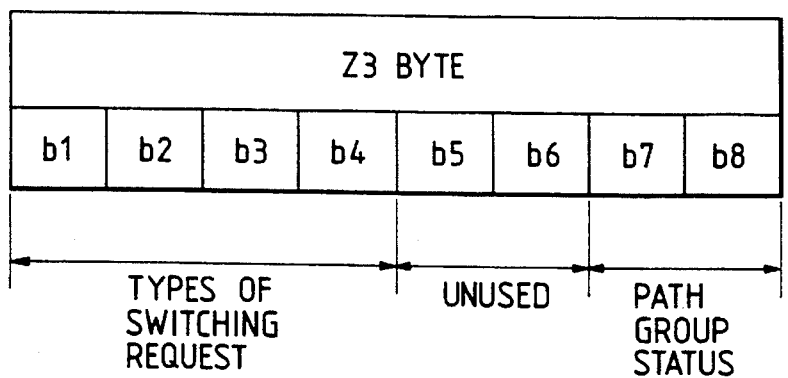
FIG. 10 is a bit allocation of overhead of the path groups.

The embodiment switches the path group when the path group is at failure. The path group is managed with use of the Z3 byte of the representing VC-3/4 path overhead within the path group. FIG. 10 is a bit allocation of the Z3 byte. The path group failure is detected by a path group alarm indication signal (PGAIS) defined in the Z3 byte.

Table 2 shows path switching features in the embodiment.

TABLE 2

| NO. | ITEM | DESCRIPTION |
|-----|------|-------------|
| 1 | Switching unit | VC-3/4 path group (set of VC-3/4 paths in same route within ring) |
| 2 | Switching network topology | Virtual ring (on VC-3/4 path mesh) |
| 3 | Protection form | 1 + 1 bidirectional switching (Working path group and protection group are turned reversely on ring.) |
| 4 | Switching control method | Autonomous switching to ground office in ring by APS control for path group |
| 5 | APS byte | b1 to b4 of Z3 byte path group representing VC-3/4 |
| 6 | APS protocol | Conform to 1 + 1 switching protocol of section APS |
| 7 | Switching trigger | Path group AIS reception at path group terminal point (Path group AIS bit in Z4 type = 1) |
| 8 | Switching equipment | VC-3/4 cross-connection switch (LT-MUX with XC and LT-MUX with ADM) |
| 9 | Switch control method | Switching ACM* meshed network in units of VC. |

*ACM = address control memory which is a memory for controlling switches in cross-connection unit and the like.

As shown in Table 2 above, the embodiment uses an alternative meshed network switching to increase reliability. Controlling the mesh switching in the embodiment is the autonomous switching in units of the VC-3/4 path group virtual ring, which conforms to the section APS recommended by CCITT.

Figure 11:
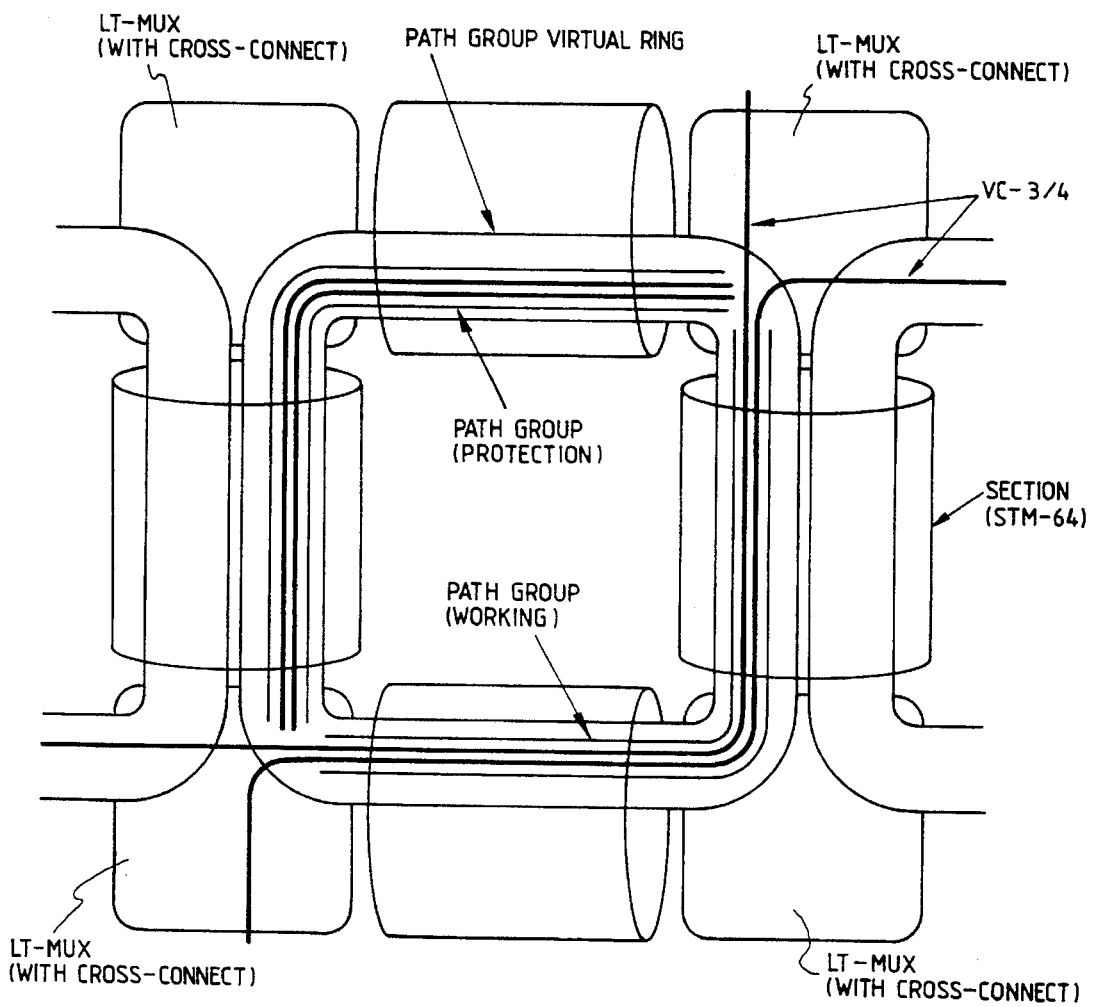
FIG. 11 is an example of setting the path group in a ring.

FIG. 11 is an example of setting the path group in the ring. The protection path group is extended in the direction reverse to the working one.

Figure 12:
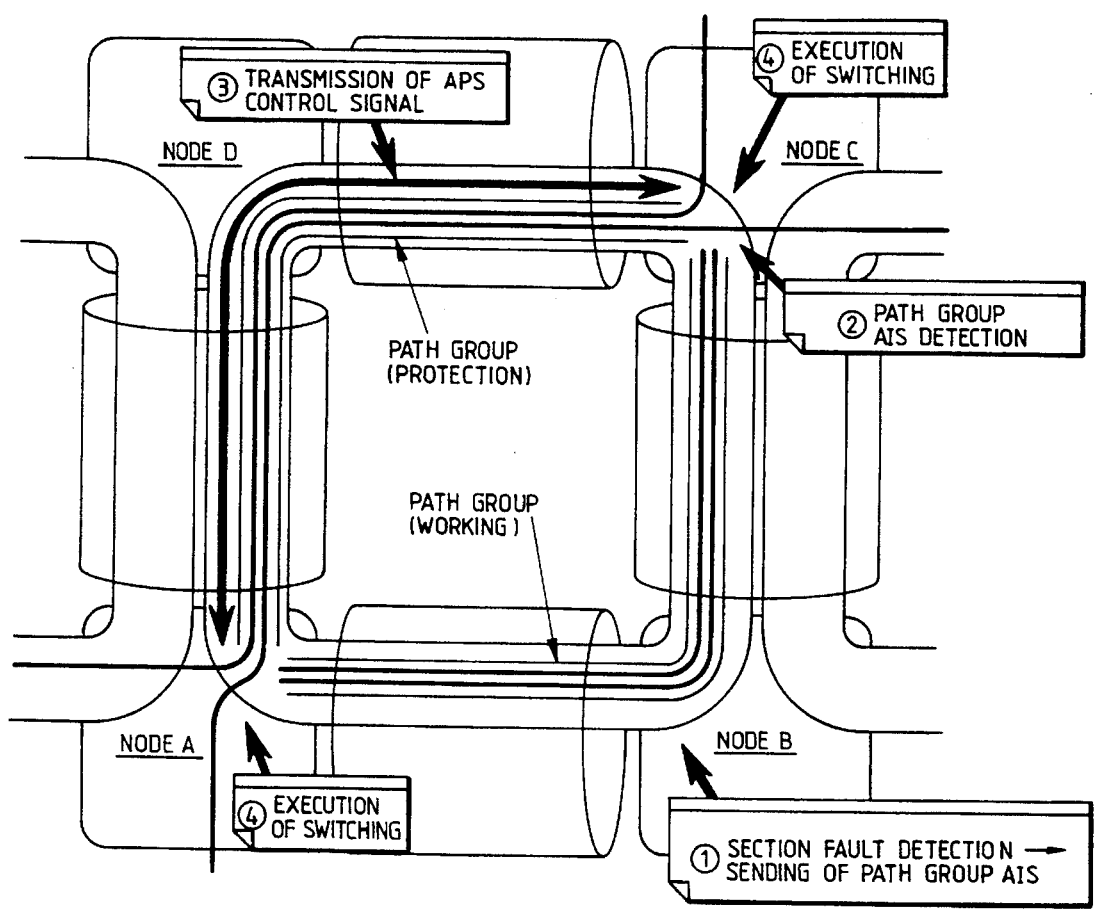
FIG. 12 shows path group switching procedures at failure.

FIG. 12 is path group switching procedures at failure.

Figure 13:
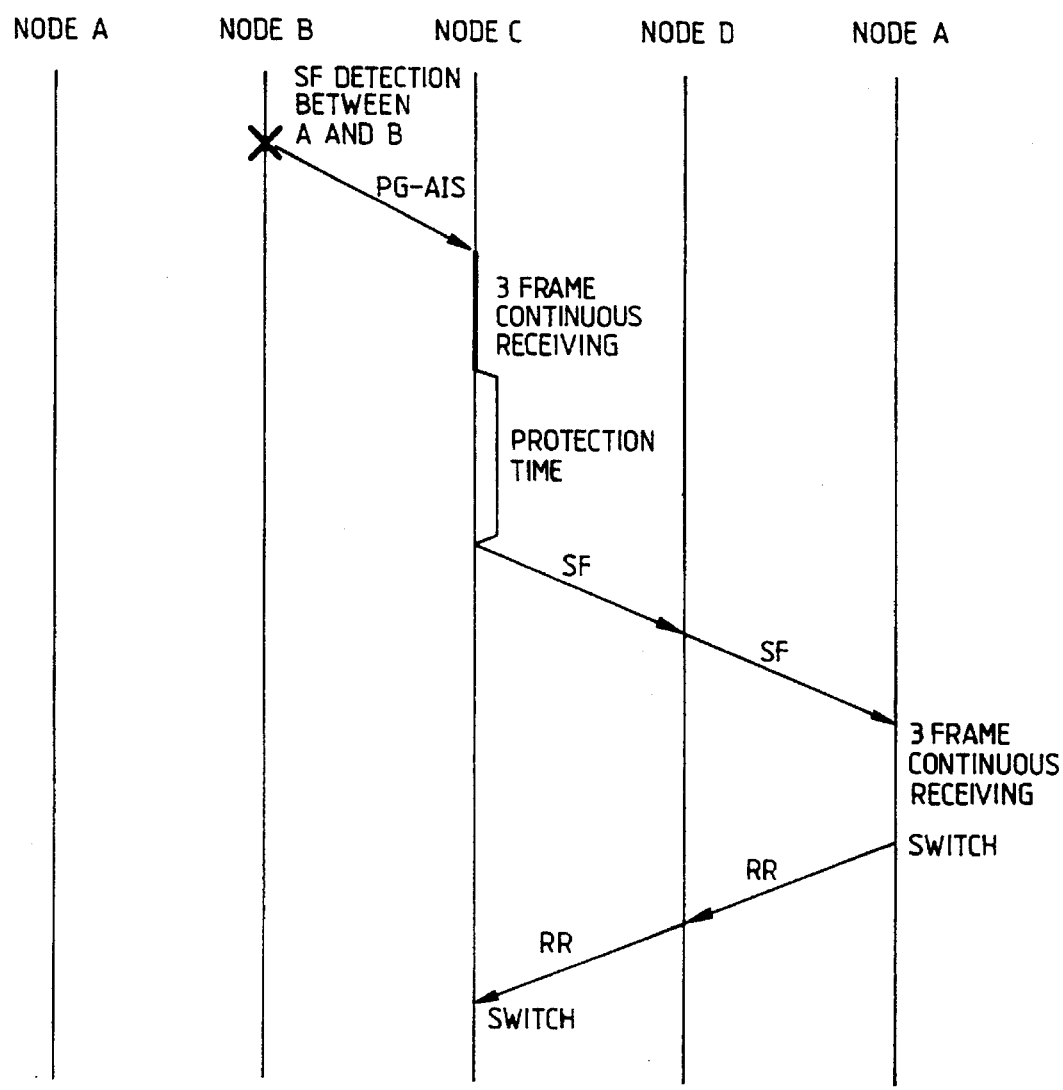
FIG. 13 shows a typical sequence of switching requests.

FIG. 13 is a typical sequence of switching requests. The switching sequence, as shown in FIG. 13, conforms to the usual 1+1 section APS. Finally, Table 3 shows priorities of the switching requests and coding of the Z3 byte, and Table 4 shows coding of the path group status.

TABLE 3

| PRIOR-ITY | TYPE OF SWITCHING REQUEST | DESCRIPTION | Z3 BYTE b1,b2,b3,b4 |
|-----------|---------------------------|-------------|---------------------|
| 1 | Lockout | Inhibit all switchings by any of following switching requests, with working state held. | — |
| 2 | Forced switching (FS) | Make switching if protection path group is normal. | 1 1 1 0 |
| 3 | Signal failure (SF) | Make switching if protection path group is normal after results of surveillance of working path group AIS and units are triggered for failure. Path group AIS is generated by LOS, LOF, and severed MER. | 1 1 0 0 |
| 4 | Manual switching | Make switching if protection path group is normal. | 1 0 0 0 |
| 5 | Wait to restore | Do not release from switched state during the waiting period even if the working path group is restored while the automatic switching SF or SD is made. | 0 1 1 0 |
| 6 | Exerciser | Test switching control system. | 0 1 0 0 |
| 7 | Reverse request | Respond operation of switching to requesting source after receiving request for forced switching or signal failure or wait to restore. | 0 0 1 0 |
| 8 | No bridge required | Inhibit all switchings by any of the following switching requests, with the working state held. | 0 0 0 0 |

TABLE 4

| Z3 BYTE b7, b8 | DESCRIPTION |
|----------------|-------------|
| 0 0 | Normal state |
| 1 1 | PG-AIS* |
| 1 0 | PG-FERF |

*PG-AIS = path group AIS.

3. Surveillance and Control System

This section describes a surveillance and control system for the network system related to the embodiment.

Figure 14:
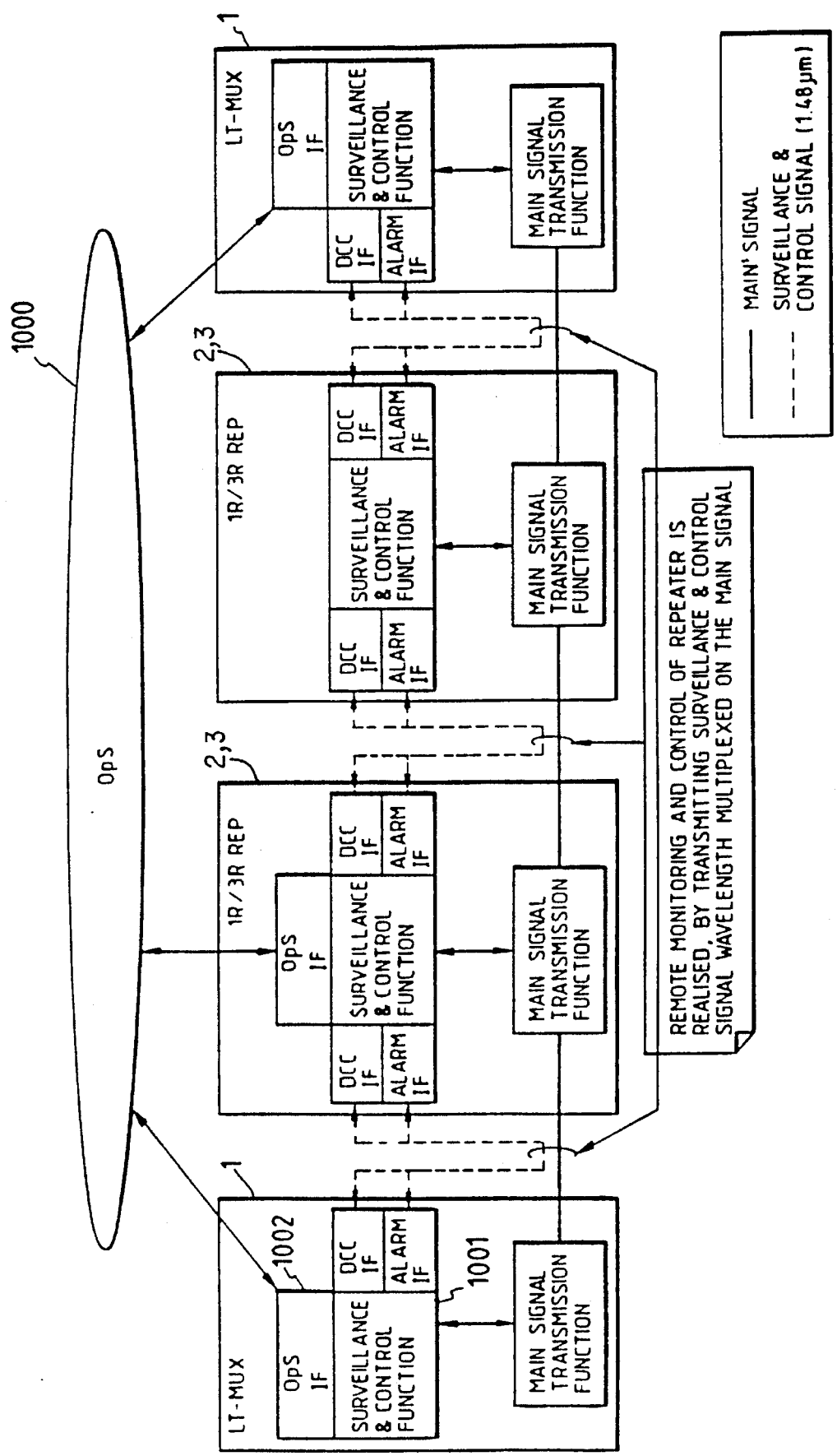
FIG. 14 is a block diagram for a configuration of the network system related to the embodiment.

FIG. 14 is a block diagram for a configuration of the network system related to the embodiment.

Each of the LT-MUXes and the IR/3R-REPs 2,3 has a surveillance and control function 1001 and an OpS-IF 1002 for connection with an OpS (operation system) 1000. The surveillance and control are made under control of the OpS 1000 which governs the surveillance and control of the system.

The embodiment makes a wavelength multiplex of a surveillance and control signal with a main signal on the STM-64 interface before transmitting the multiplexed signal to monitor and control the R/3R-REPs 2,3 having no OpS IF 1002 remotely. That is, the OpS 1000 gives a direction signal to the equipment having the OpS IF 1002 to make the equipment superimpose the direction signal onto the surveillance and control signal, or makes the 1R/3R-REP having no OpS IF 1002 transfer an alarm detected or generated by the 1R/3R-REP to the equipment having the OpS IF 1002. Alternatively, it can be made that the 1R/3R-REP should have the OpS IF 1002 to allow the OpS 1000 to monitor and control the 1R/3R-REP directly.

Figure 22:
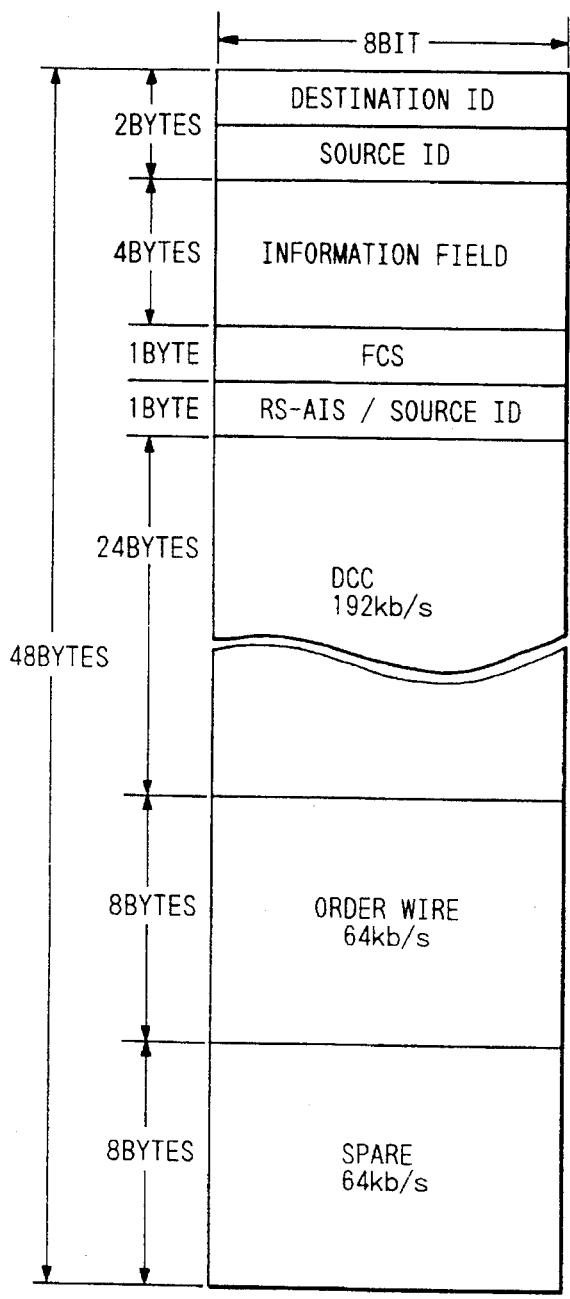
FIG. 22 is a format for a surveillance and control signal for use in the surveillance and control of the 1R-REP.

In turn, the surveillance and control signal of 384 kb/sec is transferred by a light of the same 1.48 μm wavelength as that of a pumping light source of the 1R-REP 2. The surveillance and control signal, as shown in FIG. 22, also has a 48 byte frame length for a 1 msec frame period, 24 bytes (192 kb/sec) of which are allocated to a DCC (data communication channel) for the remote control, 8 bytes (64 kb/sec) for an order wire, and 6 bytes (48 kb/sec) for the alarm transfer. The surveillance and control signal allows each of the 1R/2,3R-REPs 2 to inform the state and alarm. That is, each of the 1R/3R-REPs can generate its own monitoring information and repeat the surveillance and control signal generated by the preceding 1R/3R-REP as well. The state monitoring is made at intervals of 1 sec so that an access collision cannot happen even if the number of the 1R/3RREPs is around 100.

Also the surveillance and control signal has 1 byte allocated there to the 1R-REP section that has a feature equivalent to that of the usual AIS. The 1R/3R-REP having detected a fatal failure, such as loss of the main signal, transfers its own ID to the succeeding repeater using the one byte. This 1R/2,3R-REP 2 repeats the one byte to the LT-MUX 1. This allows informing of the 1R/3R-REP section AIS at intervals of 1 msec. If it is used, the 3R-REP converts it to an S-AIS (section alarm indication signal).

The features of the surveillance and control system are charted in Tables 5 and 6. Surveillance and control items are charted in Table 7.

TABLE 5

| ITEM | DESCRIPTION | NOTE |
|---|---|---|
| Surveillance and control equipment | (1) LT-MUX<br>Has OpS-IF and is started by direction by OpS.<br>(2) 1R-REP<br>Has RMT-IFs, such as DCC-IF and ALARM-IF, and is started by direction by surveillance and control | 1R/3R-REP can have OpS-IF. |

TABLE 5-continued

| ITEM | DESCRIPTION | NOTE |
|---|---|---|
| | signal.<br>(3) 3R-REP<br>Same as 1R-REP. | |
| Surveillance and control signal | (1) Physical characteristics<br>Frame length: 48 bytes.<br>Frame period: 1 msec.<br>Rate: 384 kb/sec.<br>Wavelength: 1.48 μm.<br>Line code: CMI. | |
| | (2) Generation method<br>Generation by LT-MUX and 1R/3R-REP.<br>(3) Transfer method<br>Is wavelength-multiplexed with the main signal before being transferred.<br>1R/3R-REP determines either repeat or reception with destination ID added on surveillance and control signal. For repeat, 1R/3R-REP stores it in the reception buffer before transmission.<br>(4) Access to 1R/3R-REP<br>Access can be made from either west or east. | Frame synchronization by CMI code rule violation.<br><br><br>To increase reliability. |
| Monitoring method | (1) Amount of information:<br>4 bytes of surveillance and control signal.<br>(2) Monitoring interval/alarm transfer interval: 1 sec. However, if fatal failure, such as loss of signal, is detected, 1R/3R-REP section AIS is transferred at intervals of 1 msec.<br>(3) Transference can be made to either west and east. | Equivalent to feature of SONET F1 byte. |

TABLE 6

| ITEM | DESCRIPTION | NOTE |
|---|---|---|
| Control method | (1) Surveillance and control signal has DCC area of 24 bytes (equivalent to 192 kb/sec) provided therein for setting surveillance and control items.<br>(2) Surveillance and control signal has order wire area of 8 bytes (equivalent to 64 kb/sec) provided therein. This allows maintenance communication.<br>(3) Access can be made from either west or east.<br>(4) Response is made after execution of instruction. | Setting can be made also from OpS if necessary. |

TABLE 7

| | LT-MUX ← 3R-REP | 1R-REP → LT-MUX | |
| --- | --- | --- | --- |
| | Monitoring items | Monitoring items | Monitoring items |
| 1R section monitoring items | Optical fiber disconnection (LOS) Loss of main signal (Preceding REP failure) Loss of surveillance and control signal (Preceding REP failure) Surveillance and control signal LOF (CMI) Surveillance and control signal FCS error | Optical fiber disconnection Loss of main signal (Preceding REP failure) Loss of surveillance and control signal (Preceding REP failure) Surveillance and control signal LOF (CMI) Surveillance and control signal FCS error | Optical fiber disconnection (LOS) Loss of main signal (Preceding REP failure) Loss of surveillance and control signal (Preceding REP failure) Surveillance and control signal LOF (CMI) Surveillance and control signal FCS error |
| 3R section monitoring items | Main signal LOF Error rate degradation (B1) F1 byte process S-AIS detection, generation, and transfer | | Main signal LOF Error rate degradation (B1) F1 byte process S-AIS detection, generation, and transfer |
| Others | Equipment failure Input, intermediate, and output signal levels LD temperatures LD biases Gains | Equipment failure Input, intermediate, and output signal levels LD temperatures LD biases Gains | Other SDH features Equipment failure Input, intermediate, and output signal levels LD temperatures LD biases Gains |
| | Control items Year and date setting Output halt or release Soft strap setting and reading related to SDH Example: B1 error rate-degradation threshold value | Control items Year and date setting Output halt or release | Control items Year and date setting Output halt or release Soft strap setting and reading related to SDH Example: B1 error rate-degradation threshold value |
| | Order wire of 64 kb/sec DCC of 192 kb/sec | Order wire of 64 kb/sec DCC of 192 kb/sec | Order wire of 64 kb/sec DCC of 192 kb/sec |

Figure 7:
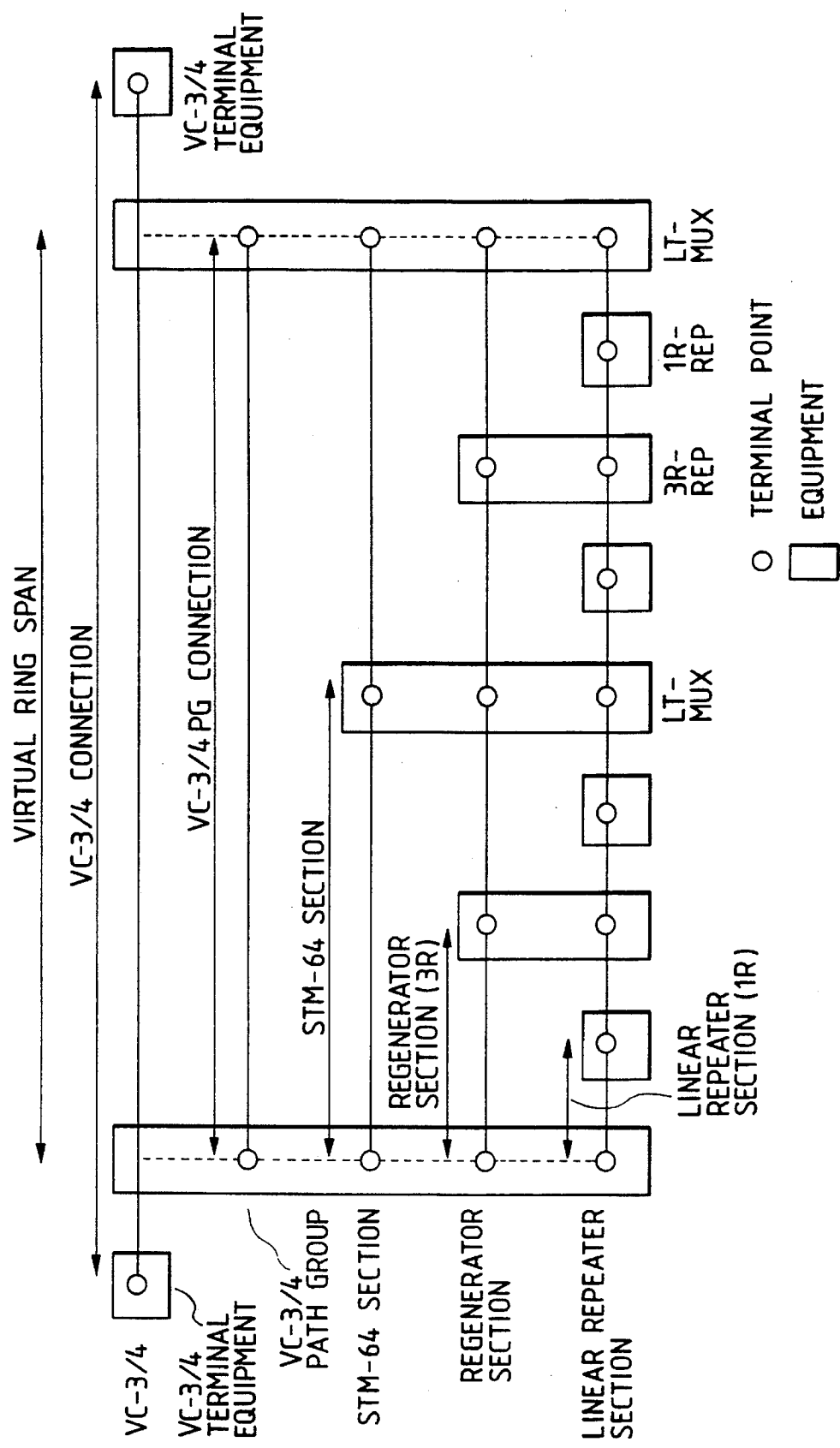
FIG. 7 is a hierarchical construction of a network system.

As shown in FIG. 7, if any of the monitoring items is at failure, the equipment transfers the alarm. The alarm detection and transfer are made for the four layers, including the 1R section layer, the 3R section layer, the LT section layer, and the path layer.

The 1R section layer deals with any of the alarms detected by the 1R-REP 2. The alarm is transferred by the surveillance and control signal. The 1R section layer processes the following items.

(a) Optical fiber disconnection: The main signal input and the surveillance and control signal input are disconnected by an optical fiber disconnection.

(b) Loss of main signal: The main signal input is lost by a preceding 1R/3R-REP stage failure.

(c) Loss of surveillance and control signal: The main signal input is lost by a preceding 1R/3R-REP stage failure.

(d) Surveillance and control signal LOF (loss of frame): The frame synchronization surveillance and control signal is lost.

(e) Surveillance and control signal FCS (frame check sequence) error: A code error is detected by checking the FCS of the surveillance and control signal.

(f) 1R section failure REP identification: The 1R-REP having detected a fatal failure writes its own ID into a predetermined byte provided in the surveillance and control signal before generating the surveillance and control signal. This accomplishes the feature of F1 byte for the SDH recommended by the CCITT.

The 3R section layer performs processes about an RSOH (regenerator section overhead) of the STM frame.

(a) Main signal LOF: Loss of frame of the main signal is detected with A1 and A2 bytes.

(b) Error rate degradation: MER and ERR MON are generated with use of B1 byte.

(c) F1 byte process: If it detects a fatal failure, the 3R-REP writes its own ID into the F1 byte of the sending STM frame. Also, if it receives the surveillance and control signal indicating that the preceding the 1R-REP is at failure, the 3RREP writes the ID in a predetermined byte into the F1 byte of the sending STM frame.

(d) S-AIS detection, generation, and transfer: S-AIS process is made.

The LT section layer performs processes about an MSOH (multiplex section overhead) of the STM frame.

The path layer performs processes about a VC-3/4 POH (path overhead) of the STM frame.

In turn, the alarm of the 1R section is sent to the LT-MUX through 1R-REP and 3R-REP by the surveillance and control signal.

Figure 15:
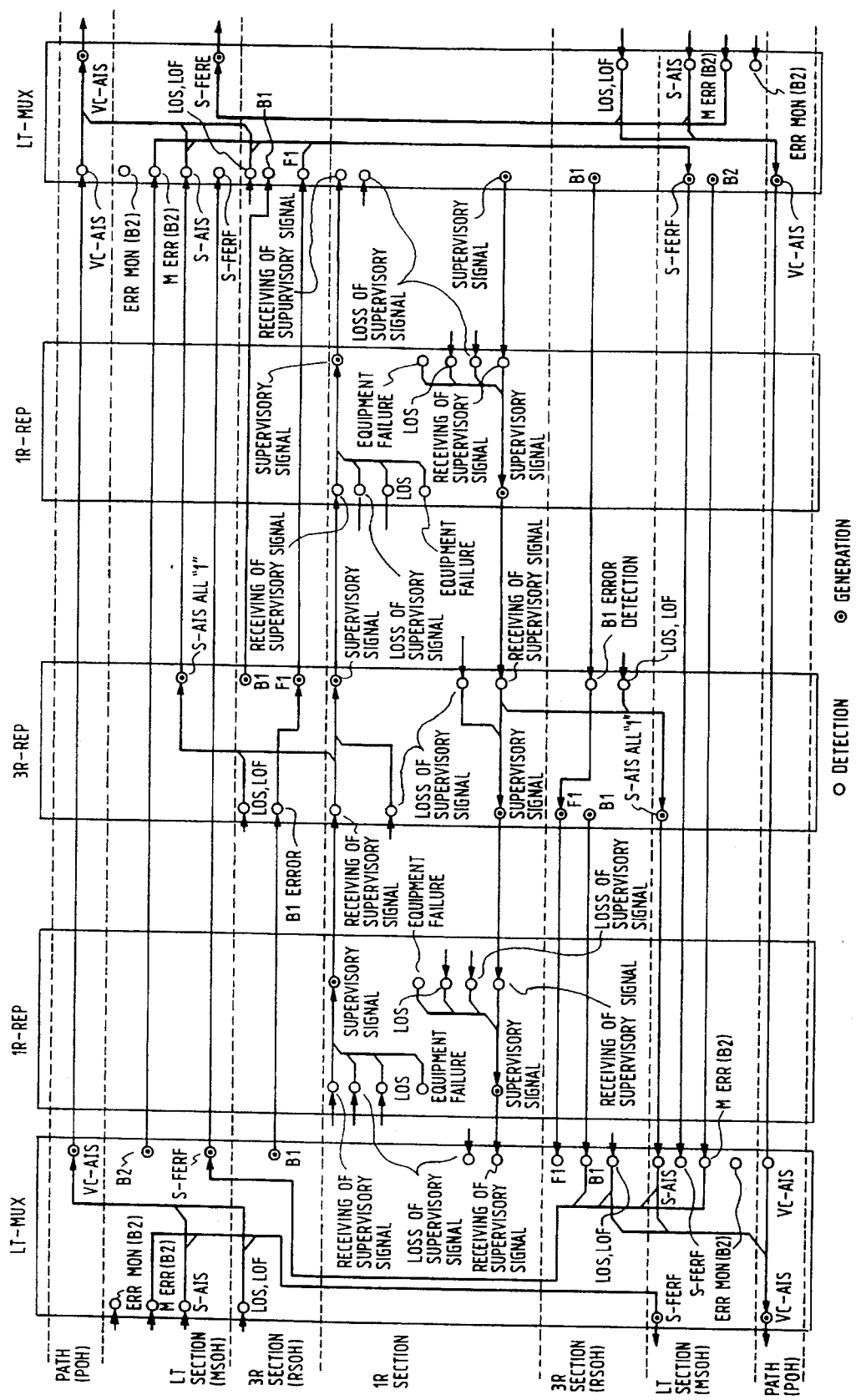
FIG. 15 is a sequence diagram for transfer of alarms in the network system.

For any of the fatal failures, such as loss of the main signal, if the alarm is transferred through the 3R-REP, then the 3R-REP converts it to S-AIS. FIG. 15 is a sequence diagram for transfer of the alarm in the network system.

4. Optical Transmission System

This section describes an optical transmission method for the optical transmission system related to the embodiment.

Figure 16:
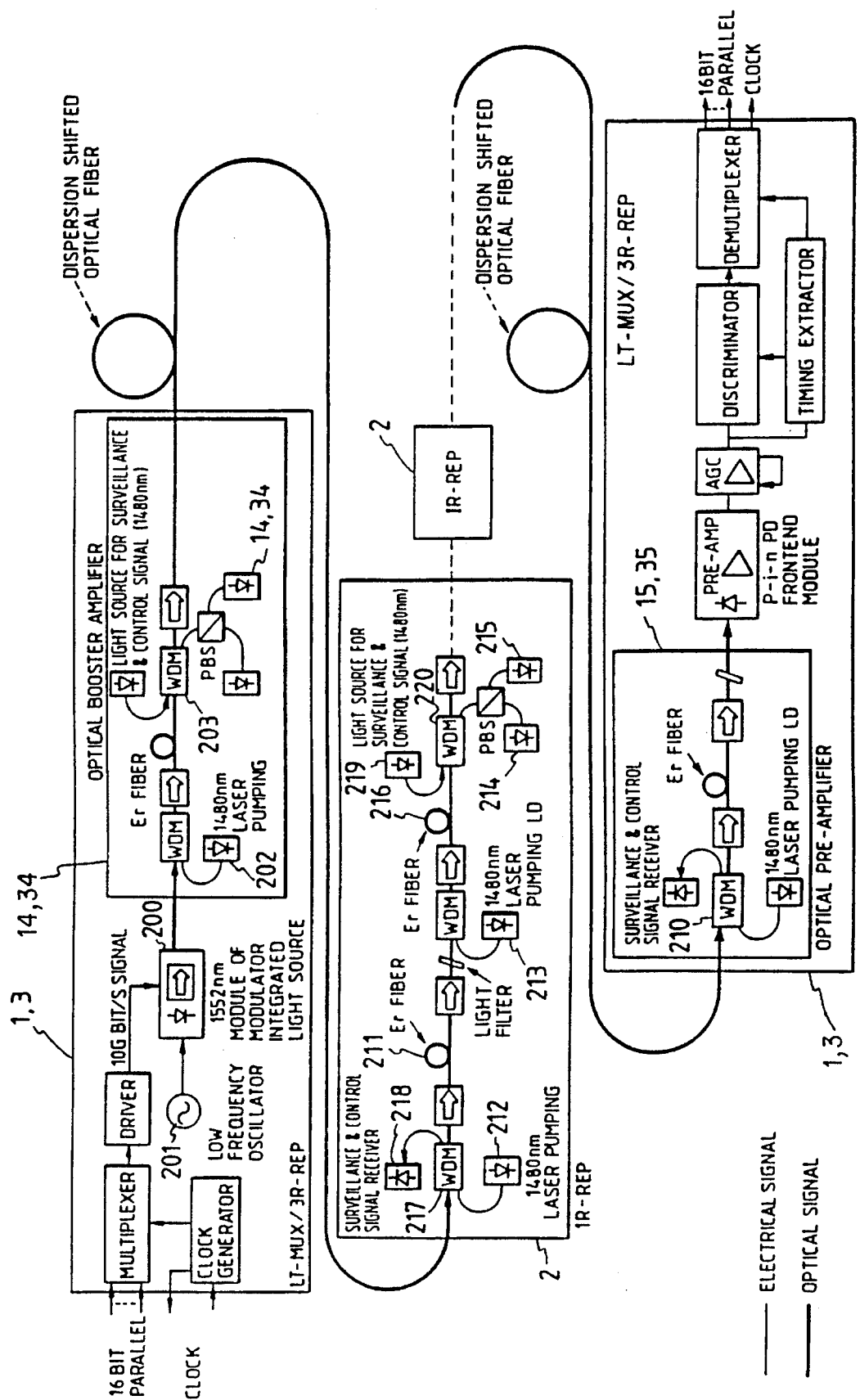
FIG. 16 is a block diagram for the optical transmission system for a long distance system.

FIG. 16 is a block diagram for the optical transmission system for the long distance system.

As shown in the figure, the embodiment includes a modulator integrated light source module 200 of 1552 nm wavelength having little chirping as a sending light source for the LT-MUX 1 and the 3RREP 3. To suppress an SBS (stimulated Brilloiun scattering) caused in the optical fiber, the embodiment uses the spectrum broading that a signal of a low-frequency oscillator 201 is applied to a laser section of the modulator integrated light source module 200 to make a light frequency modulation. Optical booster amplifiers 14 and 34 use a bidirection pumping method for which a pumping light source of 1480 nm wavelength is used. The transmission power and chirping quantities of a modulator are optimized to accomplish the longest regeneration distance of 320 km.

To transmit the supervisory signal, a supervision light source 202 of 1480 nm wavelength range provided in the optical booster amplifier is used. The supervisory signal is wavelength multiplexed with the main signal before being transmitted downstream. To prevent output of the light booster from decreasing, a WDM (wave division multiplex) coupler 203 for wavelength multiplex of the surveillance and control signal with the main signal is made to also serve as WDM coupler for laser pumping.

A forward pumping optical pre-amplifier 15,35 having a pumping source of 1480 nm range accomplishes highly sensitive reception.

On the other hand, to receive the supervisory signal, a WDM coupler 210 for pumping Erbium-doped fiber is used to detect the supervisory signal, which is received by an exclusive receiver. This minimizes degradation of the NF (noise figure). With the use of the light booster amplifiers 14, 34 and light preamplifiers 15, 35, the distance between the LT-MUX 1 and the 3R-REP 3 can be made 120 km if they are directly connected together.

The 1R-REP 2 has two Erbium-doped fibers 211 and 216 and pumping light sources of 1480 nm wavelength range used therein. The former laser pumping stage 212 pumps forward, and the latter three laser pumping stages 213,214, and 215 pump bidirectionally. This accomplishes both lower NF and higher output power. For reception of the supervisory signal by the 1R-REP 2, a WDM coupler 217 for pumping the first Erbium-doped fiber 211 stage is used to detect the supervisory signal for an exclusive receiver 218. This minimizes degradation of the NF below 0.2 dB to accomplish an optimum reception of the supervisory signal.

For transmission of the supervisory signal by the 1R-REP 2, a light source 219 of 1480 nm wavelength range for the supervisory signal is used to wavelength-multiplex with the main signal before being transmitted to a downstream. Wavelength multiplexing of the supervisory signal with the main signal is made by using a WDM coupler 220 which also serves to pump the latter Erbium-doped fiber 216.

To prevent output of the light booster from decreasing, the WDM (wave division multiplex) coupler 203 for wavelength multiplex of the surveillance and control signal with the main signal is made to also serve as the WDM coupler for laser pumping. In such a way as described above, with the surveillance and control signal demultiplexed and multiplexed at the input and the output of the 1R-REP 2 respectively, an inter-office cable connected to the equipment can be used to inform a failure to the downstream even if the failure is the input signal disconnection or in the transmission medium within the 1R-REP 2.

Figure 17:
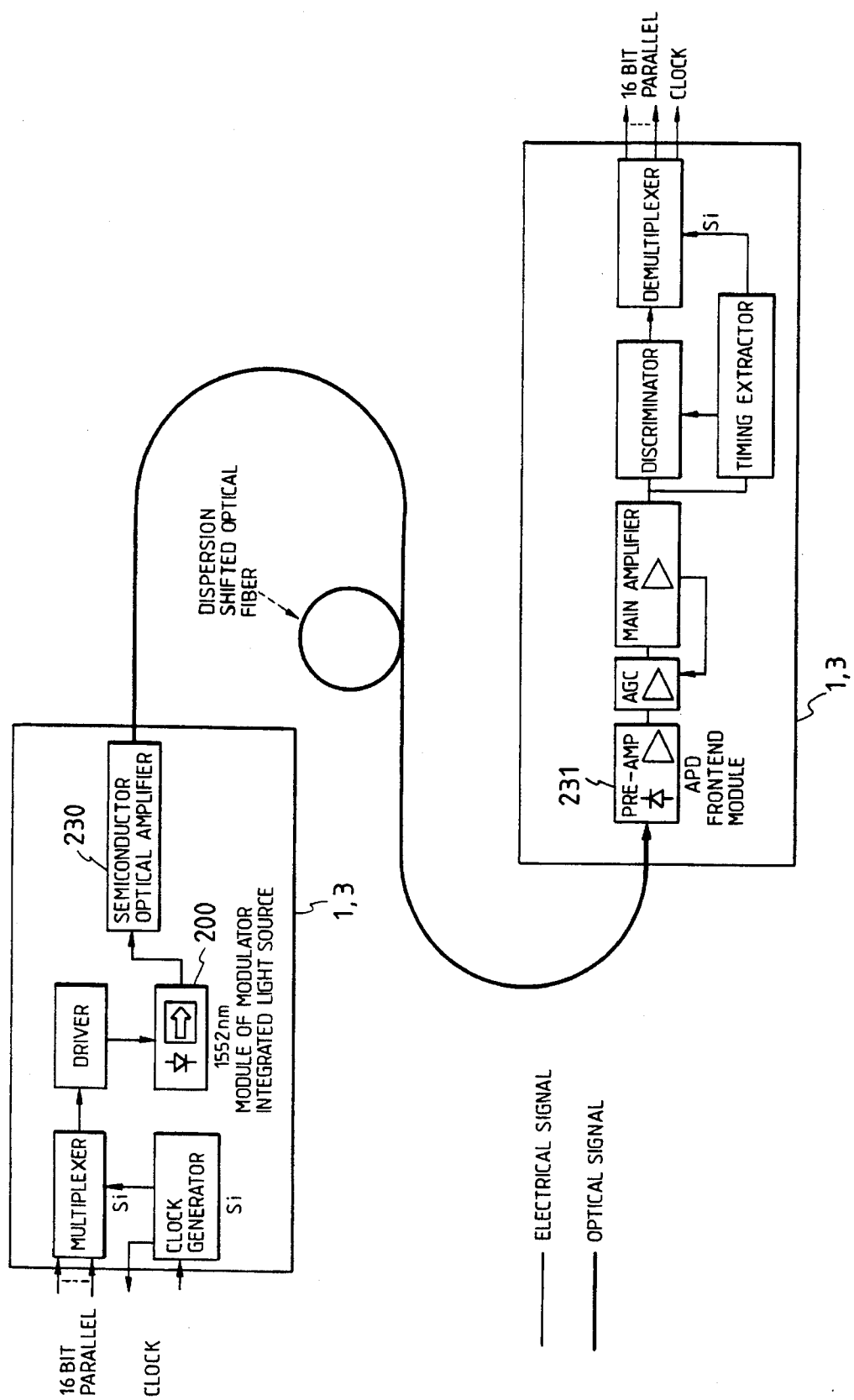
FIG. 17 is a block diagram for the optical transmission system for a short distance system.

FIG. 17 is a block diagram for the optical transmission system for a short distance system.

The short distance system, as shown in the figure, like the long distance system, uses a modulator integrated light source module 200 of 1552 nm wavelength for a transmitting light source. The short distance system is different from the long distance system in that a transmitter of the short distance system uses a semiconductor light amplifier 230 as an optical booster to make the transmitter small, and a receiver uses an optical receiver 231 of small size and low power consumption having a superlattice APD of low noise and wide frequency response.

If it has a high optical power input thereto, the optical fiber has an SBS caused, resulting in degradation of the transmission characteristics. For the CW light, the SBS is caused with the optical fiber input power higher than+6 dBm. In modulation, the SBS is caused by blight-line spectra contained in the signal light. It is generated at a light power level higher than the one for the CW light.

To suppress the SBS, the embodiment uses a way that the generated laser light is modulated with a low frequency signal to broaden the light spectra equivalently. The suppression of the SBS by broadening the light spectra is described in an article entitled "Suppression of Stimulated Brilloiun scattering and Brilloiun Crosstalk by Frequency Sweeping Spread-Spectrum Scheme," Journal Optical Communications, Vol. 12, No. 3, pp. 82–85 (1991), A. Hirose, Y. Takushima, and T. Okoshi.

Figure 18:
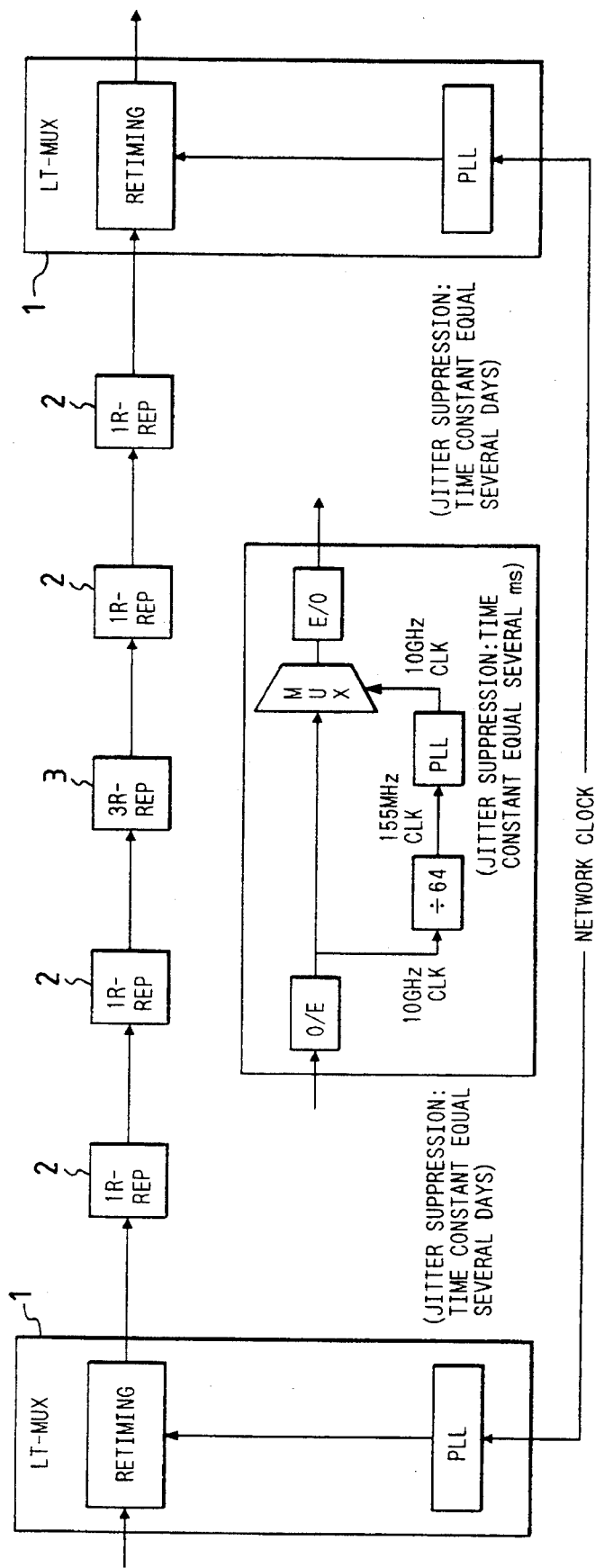
FIG. 18 is a block diagram for a clock transit system for the optical transmission system.

FIG. 18 is a block diagram for a clock transit system for the optical transmission system.

A clock for process of section overhead of transit signals in the LT-MUX 1 and 3R-REP 3, as shown in the figure, is an extracted clock smoothed by a PLL. The PLL has a time constant which is set in an order of msec that can almost completely suppress random jitters superimposed through the transmission circuit and line. A low-speed wander of the transmission clock is transferred by a pointer justification feature of the section overhead. With these, the 3R-REP 3 can make the repeat without accumulation of the jitters, so that it is free of the jitter accumulation due to continuation of an identical code.

Figure 19:
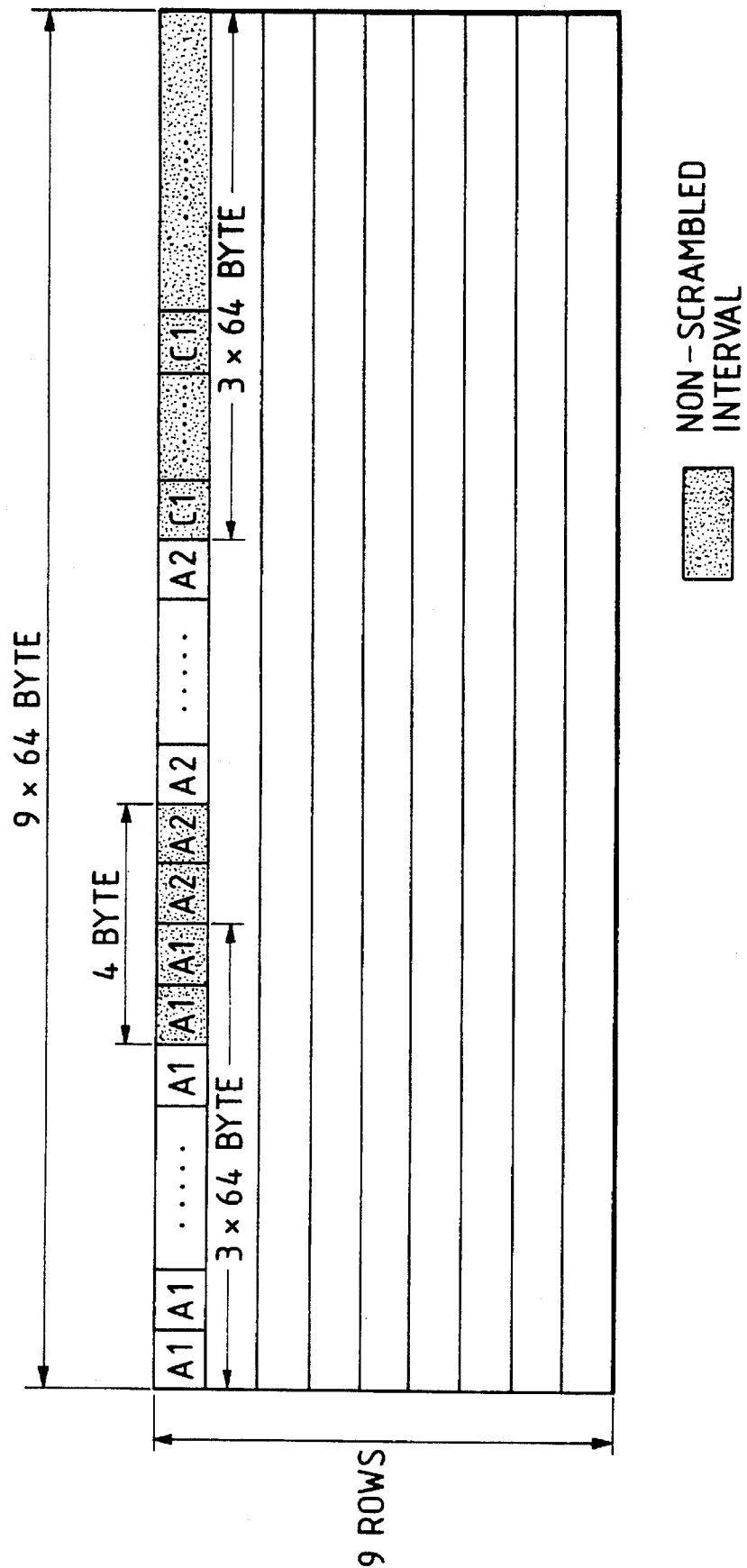
FIG. 19 is bytes to be scrambled of an overhead in a STM-64 section.

In transmission of the SDH section overhead, all the section overhead bytes except parts of the first line are scrambled. (FIG. 19 shows the parts of the first line, including 4 bytes containing the last 2 A1 bytes and first 2 A2 bytes, 64 C1 bytes, and succeeding 2×64 fixed bytes.) This prevents repetition of a fixed pattern as much as hundreds of bytes, reduces a pattern jitter, and averages output of a timing filter. If a 4-byte synchronous pattern is used, a frame synchronization protection is longer than 10 years in average misframe interval for five consecutive forward protection, and is lower than 1% in misframe probability and rehunting probability for two consecutive backward protection.

5. Description of 1R-REP

This section describes the 1R-REP 2.

Figure 20:
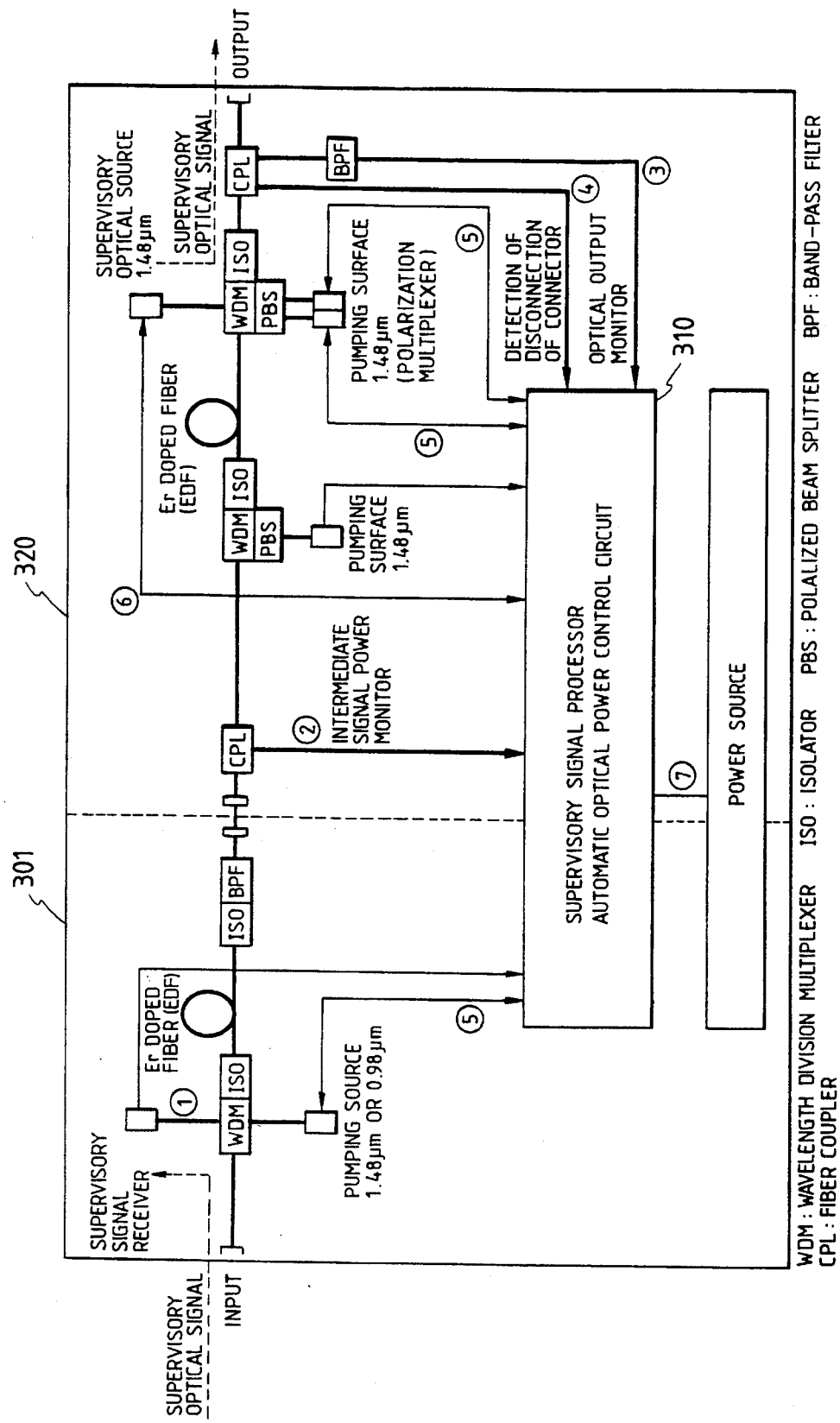
FIG. 20 is a block diagram for the 1R-REP.

FIG. 20 is a block diagram for the 1R-REP. Table 8 charts major features of the 1R-REP 2.

TABLE 8

| ITEM | | DESCRIPTION |
|---|---|---|
| Main signal interface | Signal wavelength | 1.552 μm ±0.001 μm |
| | Mean light output | +10 to +12 dBm |
| | Input light level | −18 to 0 dBm |
| | Noise figure | Lower than 7 dB |
| | Pumping method | Bidirectional pumping of Erbium-doped fiber, with 1.48 μm pumping lasers. |
| Surveillance and control method | | Transference of surveillance and control signal by 1.48 μm wavelength multiplex. Implementation of surveillance and control section in main signal unit. |
| Physical implementation method | | 300 mm high × 3 shelves per bay (1800 × 795 × 600 mm) |
| Cooling method | | Natural convection, with convection guiding plate of 100 mm high. |
| Accommodation of systems | | Two systems per shelf (one system contains both east and west systems) |
| Environmental conditions | | Temperature: 10 to 40° C. Humidity: 20 to 80% |
| Input power condition | | −42 to −53 V |

As shown in FIG. 20, the 1R-REP optical transmission system consists of two amplifier stages, including an optical preamplifier 301 for magnification with a low noise and an optical booster amplifier 320 for high power magnification. An output of the optical preamplifier 301 is connected to an input of the optical booster amplifier 320. This accomplishes a low noise, high power output characteristic in a wide dynamic range.

Description of the preamplifiers is ignored here as it was already made previously by reference to FIG. 16.

The 1R-REP 2 can monitor light outputs and intermediate signal powers and detect opening of the outputs so that it can control and monitor a gain of each optical amplifier stage. As described previously, the 1R-REP 2 also can receive and transmit the surveillance and control signal of 1.48 μm wavelength. The monitor and control and processing of the surveillance and control signal are made by a supervisory signal processor/automatic power control circuit 310.

Figure 21:
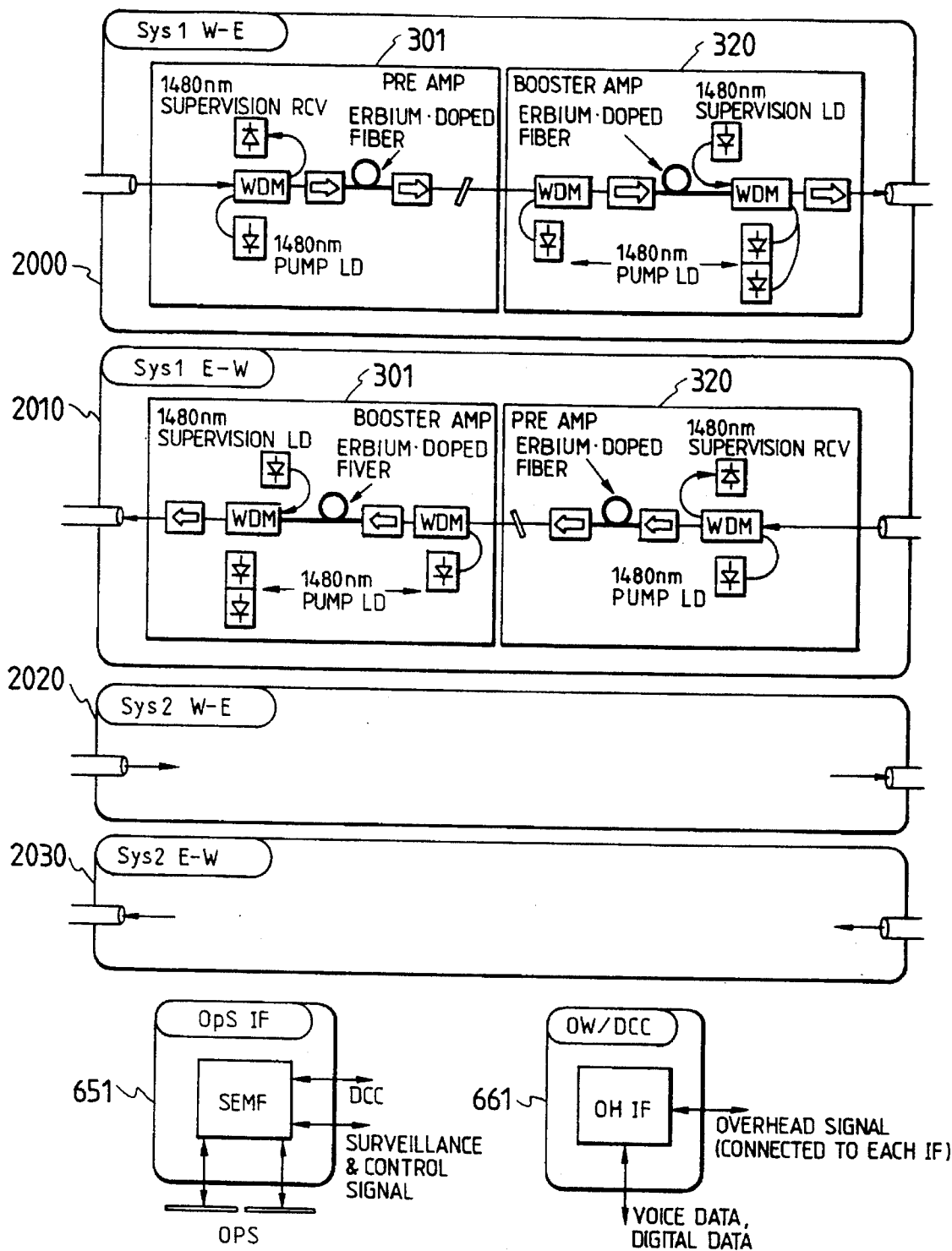
FIG. 21 is a block diagram for a board construction of the 1RREP.

FIG. 21 is a block diagram for a package construction of the 1R-REP 2. The main signal system of the 1R-REP 2, as shown in the figure, comprises two packages, including a pre-amplifier package having the low-noise optical pre-amplifier 301 and a booster amplifier package having the high-power optical booster amplifier 320. As will be described later, a single bay having a plurality of shelves, each of which has two systems and the OpS IF as a common section.

The ground 1R-REP 2, like the LT-MUX 1 and the 3R-REP 3, has features of preventive maintenance, failure identification, and workability increase.

These features facilitate troubleshooting for each 1R repeater section. As for the 1R repeater section overhead providing a feature of a surveillance and control communication channel between offices having the 1R-REP 2, as described previously, it uses the surveillance and control light of 1.48 μm wavelength.

The following describes monitor of the 1R repeater section and process of the 1.48 μm surveillance and control signal in detail. It should be noted that the surveillance and control made by the 1R-REP 2 are similarly made by the LT-MUX 1 and the forward pumping optical pre-amplifier 35 and the optical booster amplifier 34 of the 3R-REP 3.

Table 9 lists surveillance and control items of the 1R-REP 2.

TABLE 9

| Surveillance | Alarm | Signal failure | Optical fiber disconnection |
|---|---|---|---|
| | | | Main signal (Preceding REP failure) |
| | | | Loss of surveillance and control signal (Preceding REP failure) |
| | | | Surveillance and control signal LOF (CMI) |
| | | | Surveillance and control signal FCS (frame check sequence) error |
| | | Equipment failure | Output open |
| | | | Main signal transmit failure |
| | | | Surveillance and control signal transmit failure |
| | | | Optical amplifier equipment failure |
| | | | Surveillance and control equipment failure |
| | | | Power source system failure |
| | Monitor | Input signal level | |
| | | Intermediate signal level | |
| | | Output signal level | |
| | | Pumping LD temperature | |
| | | Pumping LD bias | |
| | | Surveillance and control LD temperature | |
| | | Surveillance and control LD bias | |
| | | Gain | |
| Control | Year and date setting and reading | | |
| | Output halt and release | | |
| | Failure section determination | | |

As shown in FIG. 9, the 1R-REP 2 provides the following processes with use of surveillance lights and control signals marked with an encircled number in FIG. 20.

Number ① in FIG. 20 denotes a surveillance light signal which is taken by a PF-WDM out of the input light having been composed of the main signal light of 1552 nm wavelength and the surveillance and control light signal of 1480 nm wavelength. The surveillance light signal is 3R-processed and converted to an electrical signal by a supervisory signal receiver. The surveillance light signal is used by the automatic power control circuit surveillance signal processor 310 to detect the supervisory signal input disconnection.

Number ② in FIG. 20 denotes a monitor light branched from a light output of the low-noise amplifier section by a CPL. The monitor light is used by the automatic power control circuit surveillance signal processor 310 to control the gain, to monitor the input state, and to monitor the intermediate power.

Number ③ in FIG. 20 denotes another monitor light branched from a light output of the high-power output amplifier section by another CPL. This monitor light is taken out through a BPF. The monitor light is used by the automatic power control circuit surveillance signal processor 310 to control the gain and to monitor the output state.

Number ④ in FIG. 20 denotes still another monitor light branched through the CPL from a light reflected from the output end. This monitor light is used by the automatic power control circuit surveillance signal processor 310 to detect opening of the output.

Number ⑤ in FIG. 20 denotes control signals used by the automatic power control circuit surveillance signal processor 310 for stabilization-control of the output of the pumping source and to monitor LD states.

Number ⑥ in FIG. 20 denotes the surveillance and control signal sent from the automatic power control circuit surveillance signal processor 310. The surveillance and control signal is converted to an optical signal by the surveillance and control light source of 1480 μm wavelength. The optical signal is composed with the light output of the high-power output amplifier by the BB-WDM. The surveillance and control signal is used to monitor the surveillance light source LD state and to detect the supervisory signal transmit failure.

It is needed for the 1R-REP 2 that depending on the surveillance results and the like of the surveillance items, as described above, identification should be made for the transmission line alarms as to loss of the main signal, transmit failure of the main signal, loss of the supervisory signal, the input fiber disconnection, and the like. Such failure points can be identified by a judgement logic comprehended of the surveillance items ①, ②, and ③. Also, the 1R-REP 2 can detect the equipment failures of the optical amplifier repeater section for preventive maintenance of equipment. Further, the 1R-REP 2 has external control features of output shutdown for safe work.

Furthermore, the 1R-REP 2, as described above, can not only send the surveillance and control information to the downstream equipment depending on the surveillance results of the surveillance and control items, but can also repeat to transfer to the downstream equipment the surveillance and control information received from the upstream equipment.

Still furthermore, the embodiment does not only inform any of the failures of the 1R-REP 2 to the downstream, but also facilitates judgement of a failure point in each of the 1R repeater sections and also maintains on the inter-office fiber the surveillance and control communication channel between the office having the 1RREP 2. To do these, the surveillance and control signal light is terminated once for each 1R-REP 2 before being repeated to the downstream through automatic power control circuit surveillance signal processor 310 to transfer. This has the advantage that the surveillance information can be transferred by a single wavelength even if the number of repeaters is increased.

In turn, if the wavelength used for the supervisory signal is out of the range of the optical amplifier, this will not cause saturation in the optical amplifier, and thus will not affect the main signal. For this reason, the light of 1.48 μm is used as described above. This light provides minimal transmission line fiber loss of the main signal waveform, and allows using a WDM (wave division multiplex) coupler to compose and divide the pumping light in common.

The CMI code is used to send the surveillance and control signal. With the CMI code used, a dc component and zero continuation can be suppressed. Also, a frame synchronizing circuit can be made up of relatively few components by a frame synchronization method of code violation.

FIG. 22 is a format for the surveillance and control signal for use in the surveillance and control of the 1R-REP 2.

The embodiment accomplishes the feature of remote control in a way shown in FIG. 22. The surveillance and control signal used is of a 48 byte-long frame for period of 1 msec at a rate of 384 kb/sec, and the DCC of 192 kb/sec is maintained within the surveillance and control signal. The frame has 1 byte for information of severe failures every period of 1 msec. This accomplishes the feature equivalent to the F1 byte of the SDH.

6. Description of LT-MUX

This section describes the LT-MUX 1 in detail.

Figure 23:
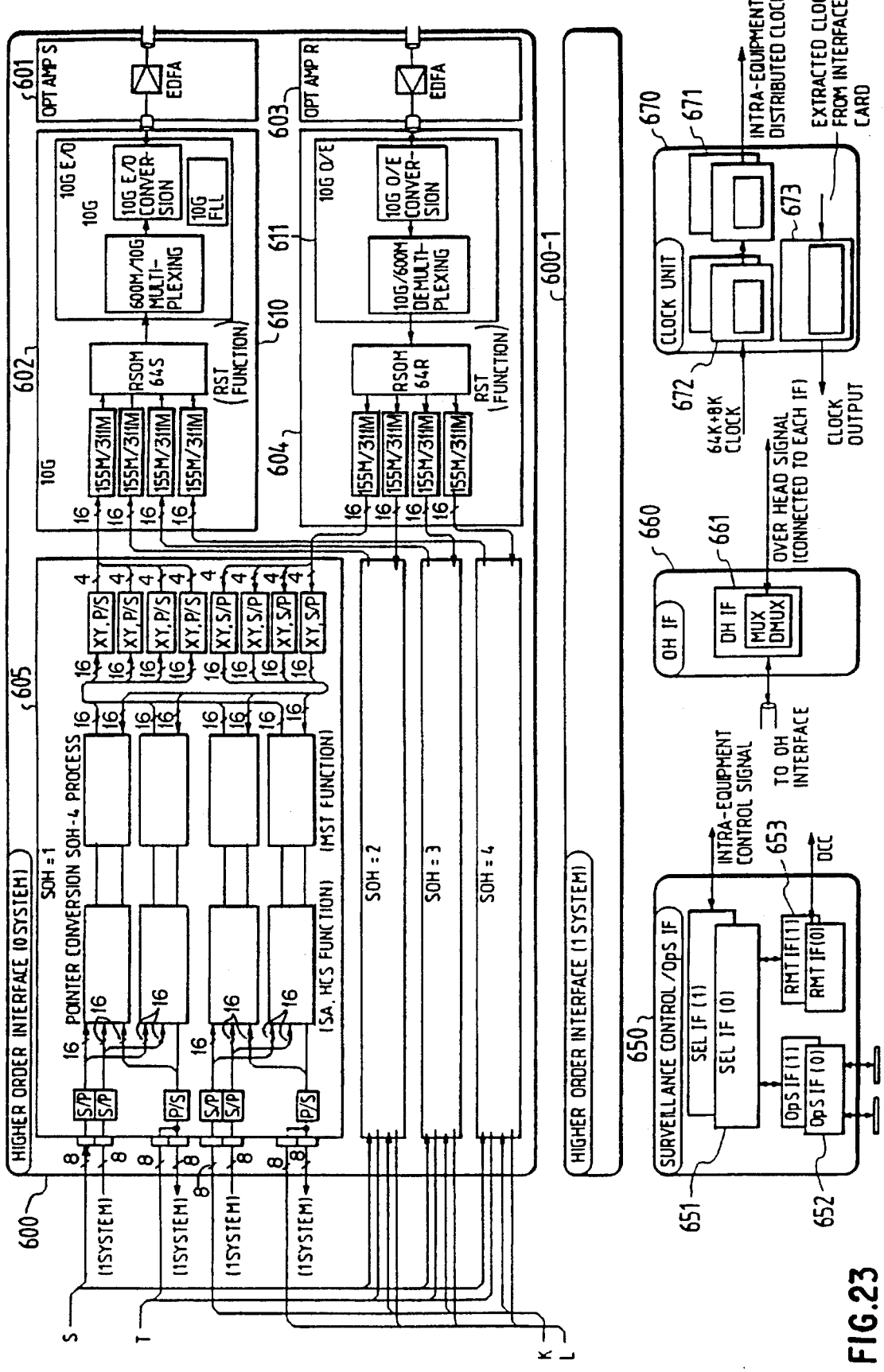
FIG. 23 is a block diagram for an inter-office transmission line interface of the LT-MUX.
Figure 24:
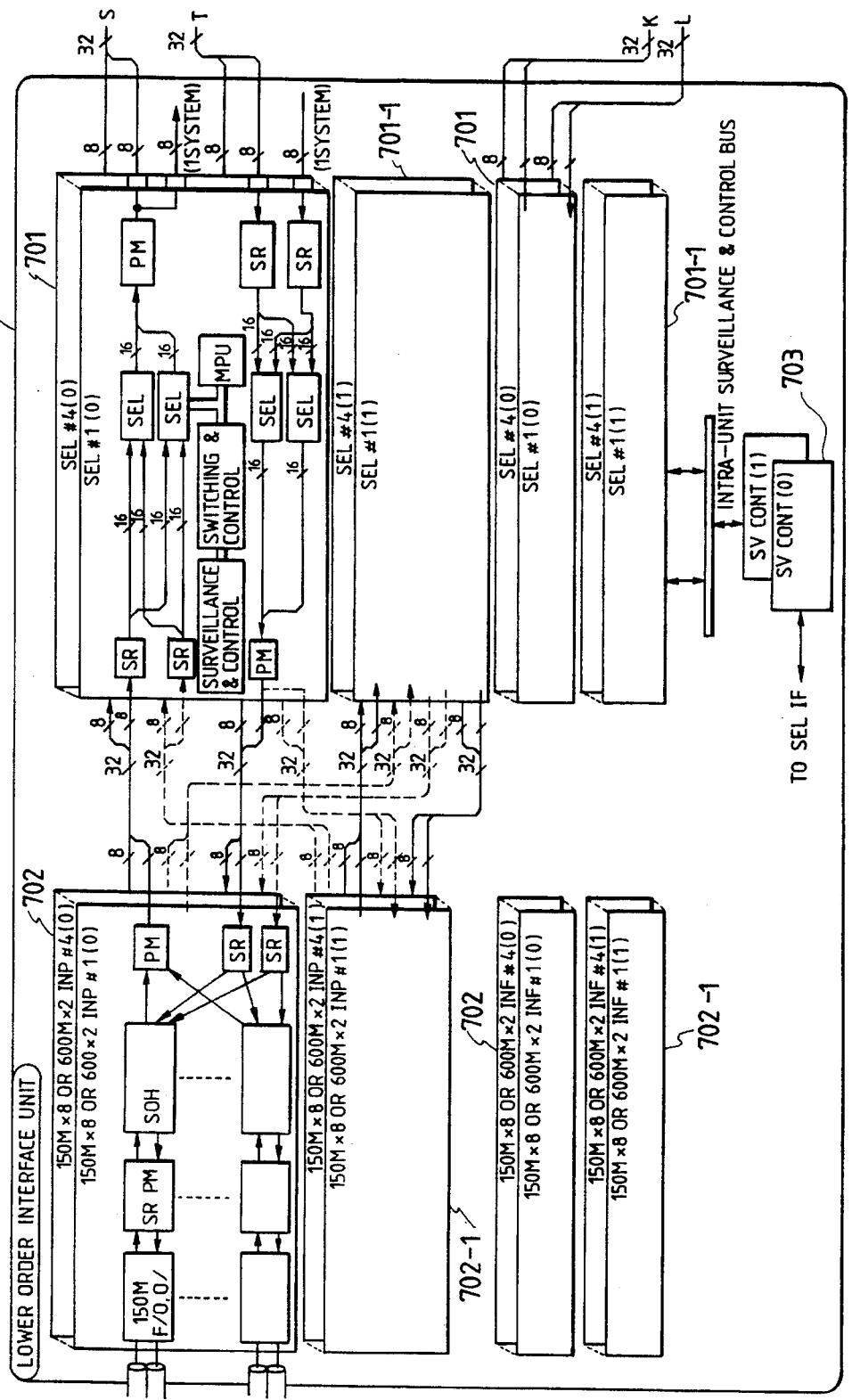
FIG. 24 is a block diagram for the intra-office transmission line interface of the LT-MUX.

FIGS. 23 and 24 are block diagrams for hardware constructions of the long distance system related to the embodiment. Table 10 charts major features of the LT-MUX 1. As for differences of the hardware construction of the LT-MUX 1 for use in the short distance system from those of the long distance system, they will be described below as necessary.

TABLE 10

| ITEM | | DESCRIPTION | |
|---|---|---|---|
| | | FOR LONG-DISTANCE SYSTEM | FOR SHORT-DISTANCE SYSTEM |
| Intra-office interface | Transmission rate | 155.52 Mb/sec (STM-1) × 64 series or 622.08 Mb/sec (STM-4) × 16 series. | |
| | Transmission line code | Scrambled binary NRZ. | |
| | Error rate | Lower than $10^{-11}$ | |
| | Light source wavelength | 1.31 μm +0.05 μm to −0.04 μm (STM-1); 1.31 μm +0.05 μm to −0.05 μm (STM-4) | |
| | Average light output | −17 to −11 dBm (STM-1); −15 to −8 dBm (STM-4) | |
| | Maximum detectable power | Higher than −8 dBm | |
| | Minimum detectable power | Lower than −24 dBm (STM-1); Lower than −23 dBm (STM-4) | |
| | Redundancy configuration | 1 + 1 dual | |
| Inter-office interface | Transmission rate | 9953.28 Mb/sec (equivalent to STM-64) | |
| | Transmission line code | Scrambled binary NRZ (non-return to zero) | |
| | Error rate | Lower than $10^{-11}$ | |
| | Light source wavelength | 1.552 ±0.001 μm, with chirping parameter α being 1.0 ±0.2 | |
| | Average light output | +10 to +12 dBm Direct LT connection: +15 to +16 dBm | +5.6 to +6.6 dBm |
| | Maximum detectable power | Higher than −7 dBm | Higher than −10 dBm |
| | Minimum detectable power | Lower than −27 dBm | Lower than −23 dBm |
| | Redundancy configuration | Mesh switching using virtual ring at VC-3/4 level | |
| Surveillance and control method | | Surveillance control by OpS interface. 1R-REP surveillance and control by 1.48 μm wavelength multiplex. | |
| Physical implementation method | | 300 mm high with 4 shelves (1800 × 795 × 600 mm) | |
| Cooling method | | Push-pull type forced air cooling, with large fan. | |
| Accommodation of systems | | Two systems per rack. | |
| Environmental conditions | | Temperature: 10 to 40° C. Humidity: 20 to 80% | |
| Input power condition | | −42 to −53 V | |

FIG. 23 is for the inter-office transmission line of the LT-MUX 1. FIG. 24 is for the intra-office transmission line of the LTMUX 1. The LT-MUX 1, as shown in the figures, comprises a high-speed IF shelf 600, a low-speed IF shelf

700, a supervisory control/OpS 650, an OH IF 660, and a clock section 670.

The high-speed IF shelf 600 comprises an OPTAMP S 601 having features as the optical booster amplifier 14 of the transmitting system, an OPTAMP R 603 having features as the optical pre-amplifier 15 of the receiving system, a 10G IF R 604, a 10G IF S 604, and a plurality of SOH 605 boards. The lowspeed IF shelf 700 comprises a plurality of SELs 701, and a plurality of intra-office IF 702 packages. The high-speed IF shelf 600 and the low-speed IF shelf 700 are connected together by an intra-equipment interface of 155 Mb/sec rate.

The embodiment has a high-speed interface 600-1, an SEL 701-1, and an intra-office interface 702-1 to have a redundancy feature of 1+1 section switching type. These blocks are not needed if the section switching is not made.

Tables 11 and 12 chart the features of the LT-MUX 1.

TABLE 11

| ITEM | BLOCK NAME | FEATURE | NOTE |
|---|---|---|---|
| 1 | 10G IF-S OPTAMP-S | (1) Optical booster amplification<br>(2) 1R repeater surveillance and control signal light transmission<br>(3) STM-64 signal E/O conversion<br>(4) 10 GHz PLL<br>(5) STM-64 RSOH transmission<br>(6) Physical rate conversion of 155 Mb/sec to 10 Gb/sec | |
| 2 | 10G IF-R OPTAMP-R | (1) Optical preamplification<br>(2) 1R repeater surveillance and control signal light reception<br>(3) STM-64 signal D/E conversion and clock extraction<br>(4) STM-64 RSOH termination<br>(5) Physical rate conversion of 10 Mb/sec to 155 Gb/sec | |
| 3 | SOH | (1) STM-64 MSOH process<br>(2) Pointer conversion of AU-3, AU-4, and AU-4-4c<br>(3) POH monitor of VC-3, VC-4, and VC-4-4c and line test | |
| 4 | SEL | (1) System 0/system 1 selection of STM-1/STM-4 intra-office transmission line<br>(2) System 0/system 1 phase matching of VC-3, VC-4, and VC-4-4c (hitless switching)<br>(3) APS protocol control for intra-office transmission line switching | |
| 5 | Intra-IF | STM-1 or STM-4 intra-office transmission line termination<br>(1) E/O and O/E conversions<br>(2) SOH process<br>(3) Pointer conversion of AU-3, AU-4, and AU-4-4c<br>(4) POH monitor of VC-3, VC-4, and VC-4-4c and line test<br>Number of accommodated lines is STM-1 × 8 or STM-4 × 2 per board. | |
| 6 | SVCONT (LTF) | (1) Information collection in low-speed IF shelf, operation of performance surveillance information, and event made of alarm data<br>*Intra-office section<br>*AU pathbus<br>*Surveillance in equipment<br>(2) Alarm priority processing | |

TABLE 11-continued

| ITEM | BLOCK NAME | FEATURE | NOTE |
|---|---|---|---|
| | | and failure determination<br>(3) Distribution and status reading of control information in shelf<br>*Software strap of intra-office section<br>*AU line test<br>*Selected status of redundancy system | |

TABLE 12

| ITEM | BLOCK NAME | FEATURE | NOTE |
|---|---|---|---|
| 7 | SVCONT (HIF) | (1) 10G high-speed transmission IF, surveillance information collection of submarine repeater, operation of performance surveillance information, and event made of alarm data<br>*1R repeater section<br>*Multiplex section<br>*AU path<br>*Surveillance in equipment<br>(2) Alarm priority processing and failure determination<br>(3) Distribution and status reading of 10G high-speed transmission line IF and repeater control information<br>*Software strap<br>*AU line continuity check<br>*Control and status reading of repeater | |
| 8 | SEMF | (1) OpS message conversion<br>(2) Time management and history processing<br>(3) Emergency start-up of backup memory<br>(4) Switching control of clock section and SVCONT<br>(5) Processing of common system alarm | |
| 9 | OpS IF | (1) OpS message communication processing | |
| 10 | RMT IF | (1) Remote surveillance and control communication by DCC of multiplex section overhead (MSOH) | |
| 11 | CREC | (1) B/U conversion of 64 kHz + 8 kHz clock | |
| 12 | CDIS | (1) Clock generation (PLL) and distribution in equipment | |
| 13 | CSEND | (1) Transmission of extracted clock | |
| 14 | OH IF | (1) Input/output of overhead signal outside equipment<br>(2) OAM processing by overhead signal | |

Figure 25:
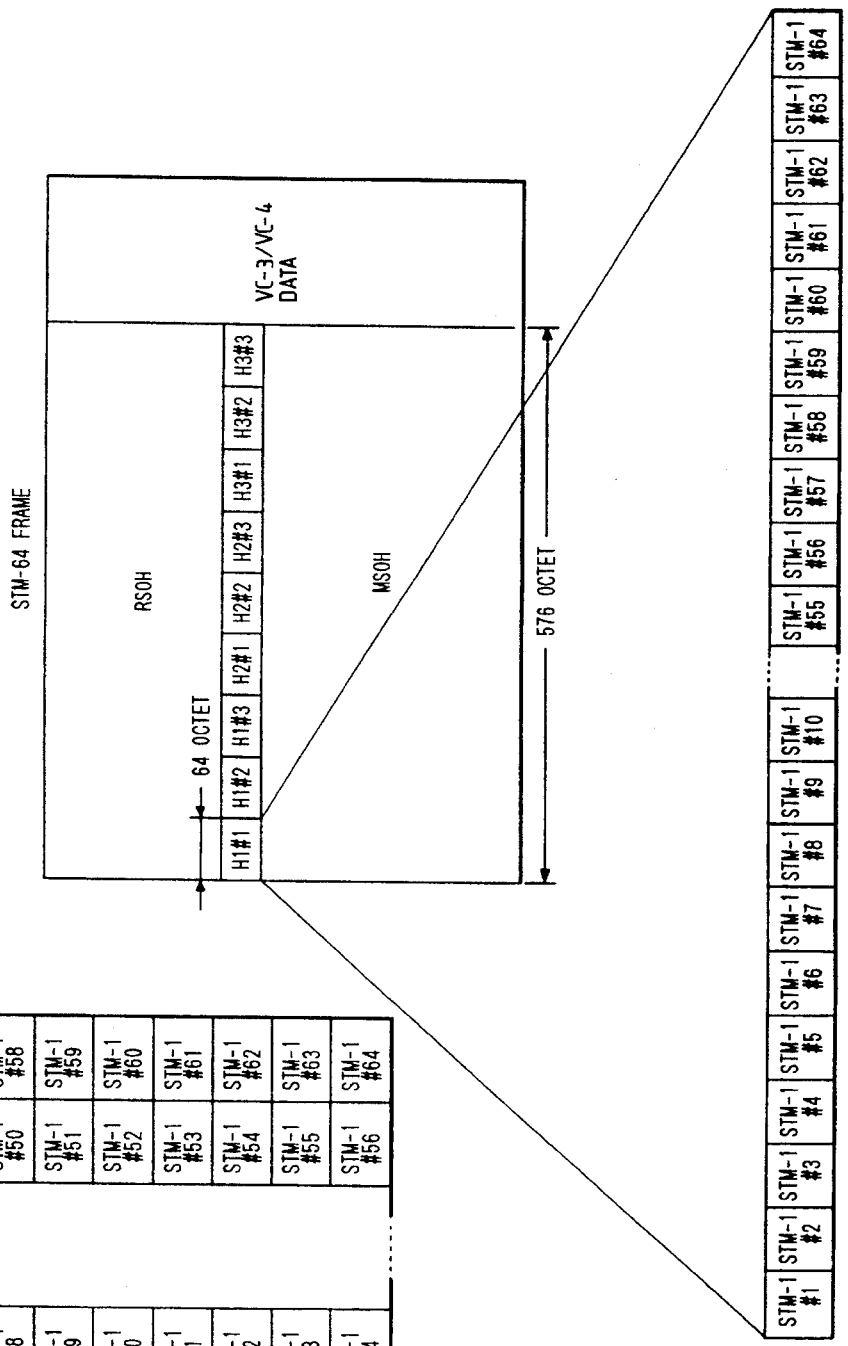
FIG. 25 is a relationship of multiplex and demultiplex between a STM-64 frame and a STM-1×64 supported by the LT-MUX.

FIG. 25 is a relationship of multiplex and demultiplex between the STM-64 frame and the STM-1×64 supported by the LT-MUX.

A 10G E/O 610 of a 10G IF S 602 and an OPTAMP S 601 form the transmitter of the LT-MUX 1, and a 10G O/E 611 of a 10G IF R 604 and an OPTAMP R 603 form the receiver of the LT-MUX 1.

The following describes the transmitter and the receiver mentioned above.

Figure 26:
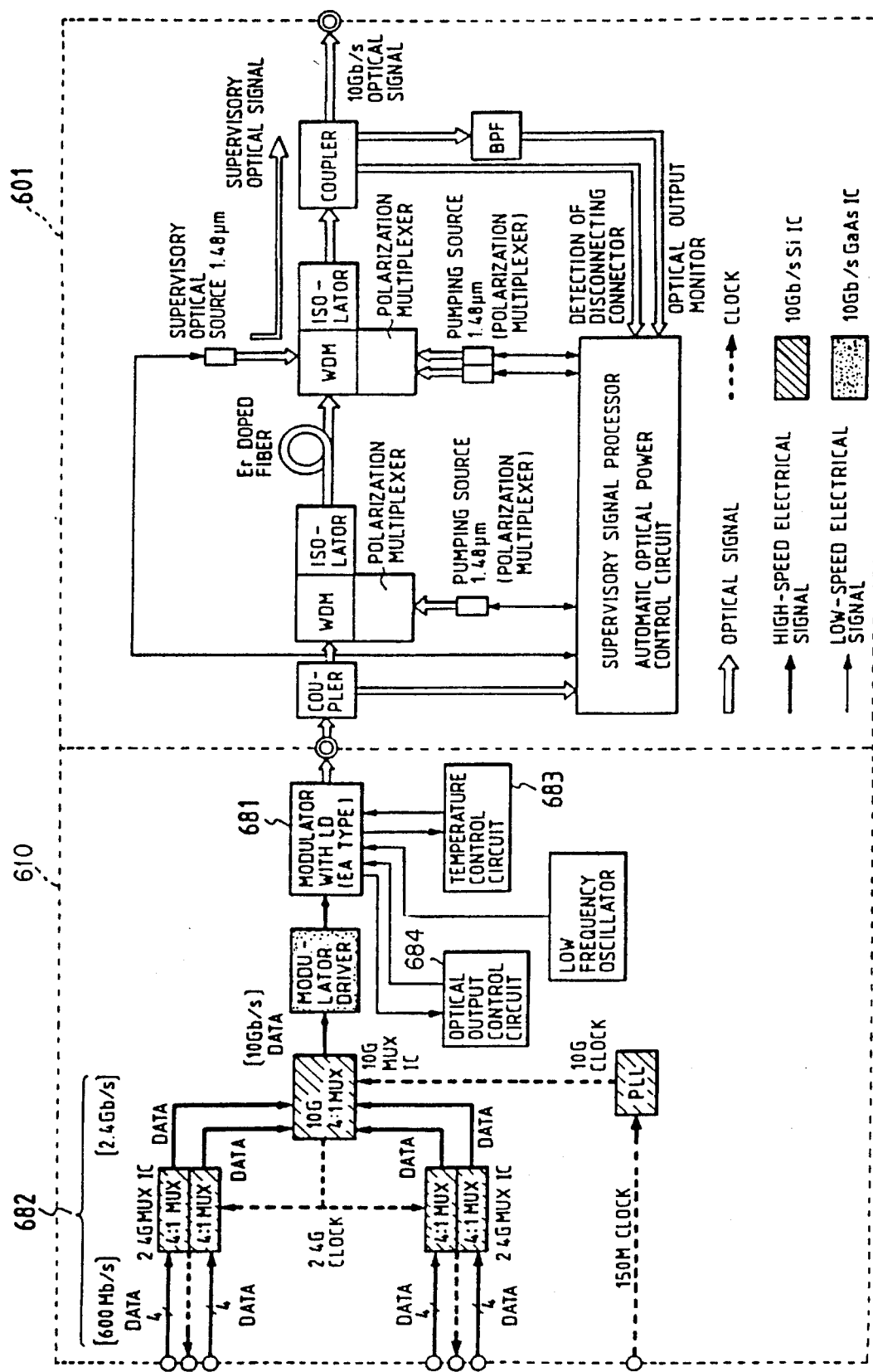
FIG. 26 is a block diagram for a transmitter of the LT-MUX forming the long distance system.

FIG. 26 is a block diagram for the transmitter of the LT-MUX 1 forming the long distance system.

The transmitter, as described previously, comprises the 10G E/O S 610 having the high-speed multiplex circuit 682 for converting a 622 Mb/sec, 16-parallel signal to 9.95 Gb/sec signal in a way of a 16-bit multiplex (STM-64) and the electro-optic converter 681 and the OPTAMP S 601 which is an optical amplifier.

As shown in the figure, the embodiment uses an external modulation of electric field absorption type for electro-optic conversion. The OPTAMP S 601 is formed of an optical fiber amplifier. The optical fiber amplifier is separately implemented in its respective package in view of its occupying area and consumption power. The transmitter further has a temperature control circuit 683 and an optical output control circuit 684 so that the long-distance transmission can be made even if environmental conditions around the electro-optic converter 681 and the OPTAMP S 601 change. Description of the transmission operation is ignored as it was already made by reference to FIG. 16.

Figure 27:
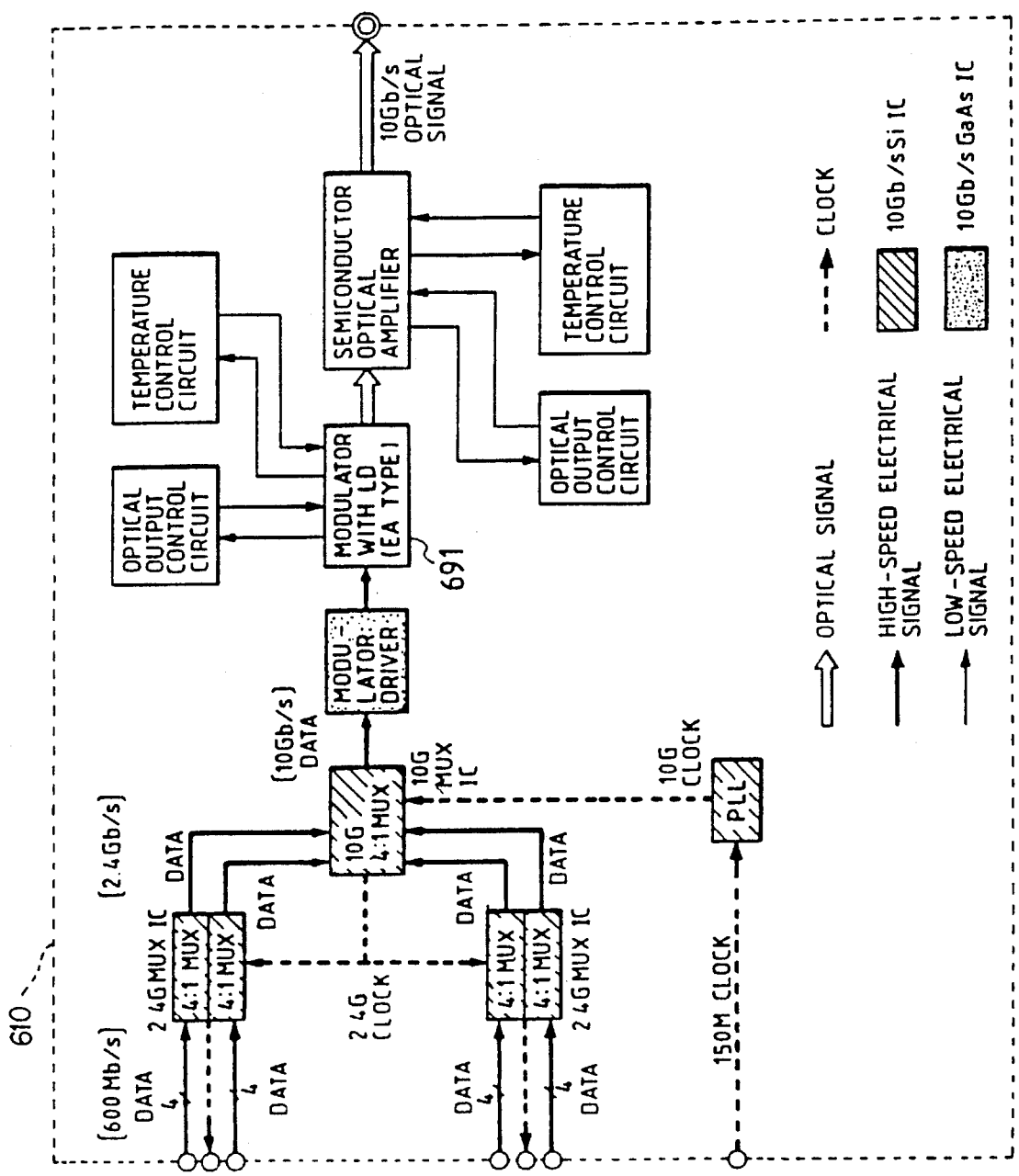
FIG. 27 is a block diagram for the transmitter of the LT-MUX forming the short distance system.

FIG. 27 is a block diagram for the transmitter of the LT-MUX 1 forming the short distance system.

The transmitter of the LT-MUX 1 forming the short distance system, as described in the figure, has no OPTAMP S 601. The 10G IF S 602, unlike that of the long distance system, uses a semiconductor optical amplifier of preferably smaller size and lower power consumption for optical amplification in the 80-km transmission. The semiconductor optical amplifier can be made to occupy as narrow an area as the modulator with LD, and can be implemented in the 10G IF S 602 shelf. The embodiment, as shown in the figure, uses a modulator of an electric field absorption type for the external modulator. The electric field absorption type modulator is integrated to a module of small size as electric field absorption type device are structurally practical to integrate with the laser diode for the light source.

Figure 28:
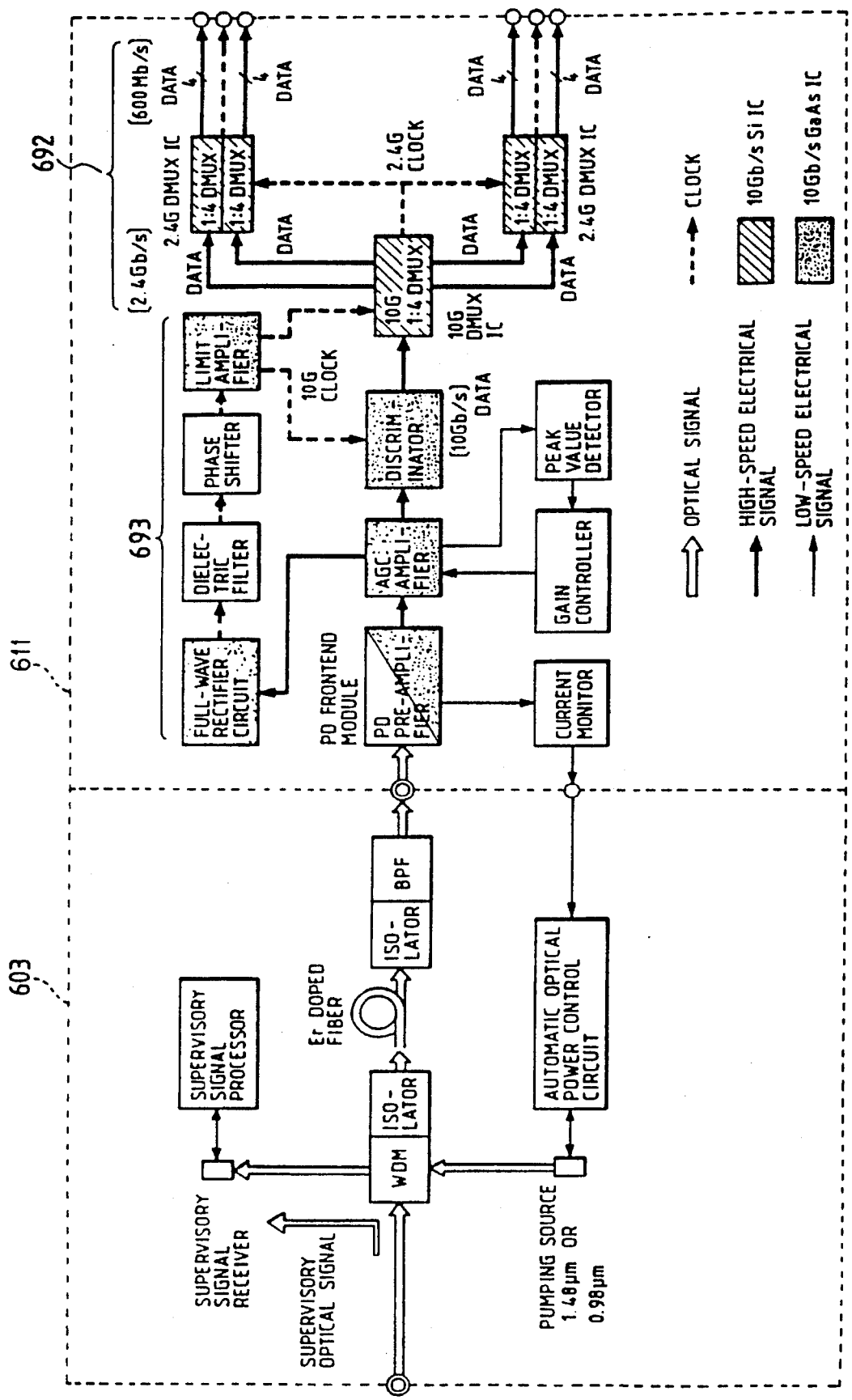
FIG. 28 is a block diagram for a receiver of the LT-MUX forming the long distance system.

FIG. 28 is a block diagram for the receiver of the LT-MUX 1 forming the long distance system.

The receiver comprises the OPTAMP R 603 which is an optical amplifier and the 10G O/E 611 having an optoelectric converter 693 and a high-speed demultiplex circuit 692. The OPTAMP R 630, as shown in the figure, is made up of an optical fiber amplifier having an optical preamplifier feature, and is separately implemented in its respective board. The opto-electric converter 693 is made up of a front module, an amplifier, a timing extractor, and an discriminator circuit. The highspeed demultiplex circuit 692 converts the 9.95 Gb/sec signal to 622 Mb/sec in a way of parallel demultiplex. Description of the reception operation is ignored as it was already made by reference to FIG. 16.

Figure 29:
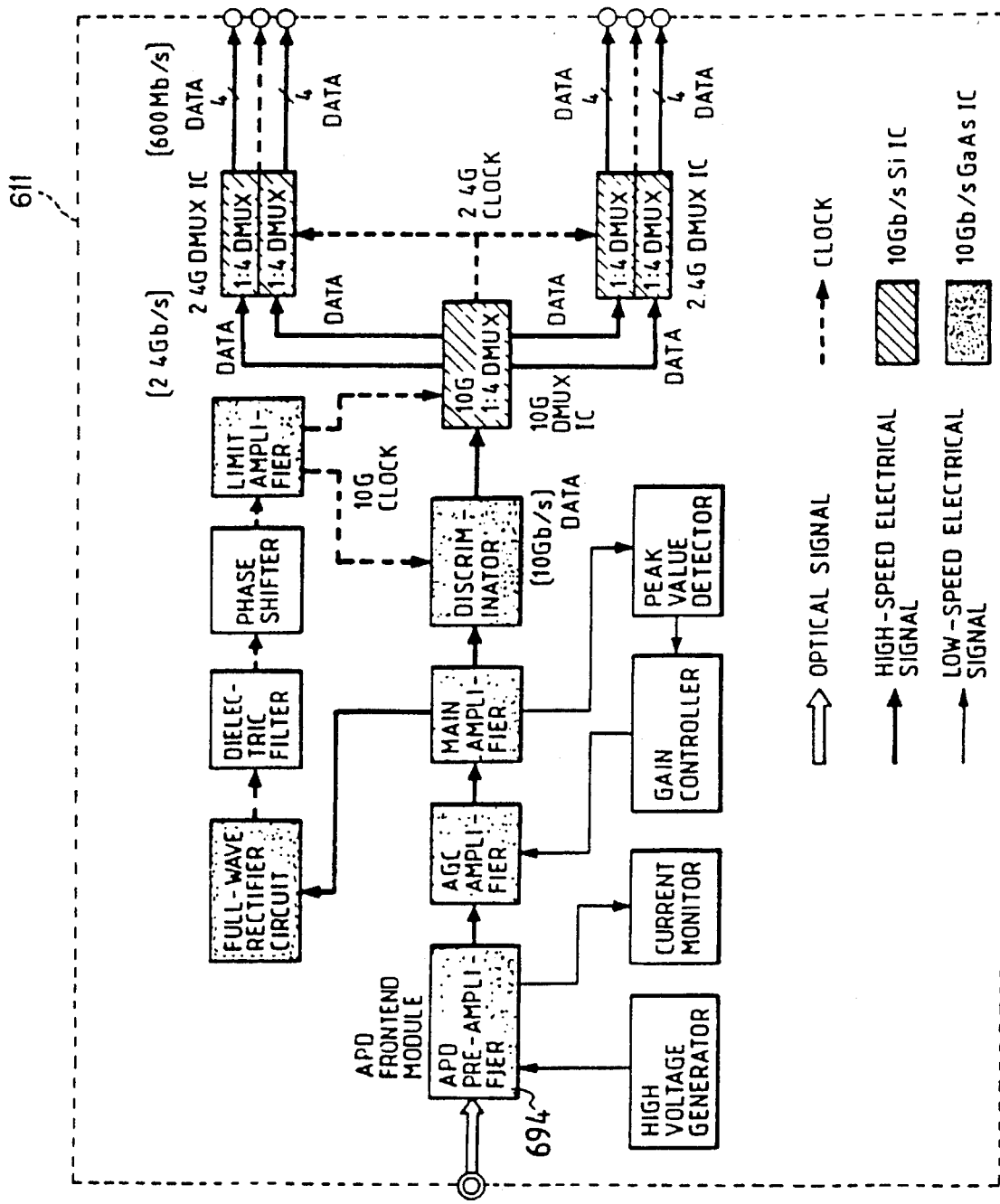
FIG. 29 is a block diagram for the receiver of the LT-MUX forming the short distance system.

FIG. 29 is a block diagram for the receiver of the LT-MUX 1 forming the short distance system.

The short distance system is different from the long distance system in that the short distance system has no OPTAMP R 603 and uses an APD 694 for opto-electric conversion. As the APD 694 is capable of higher sensitive reception than P1n-PD, the short distance system needs no optical amplifier, thus resulting in a smaller system.

Figure 30:
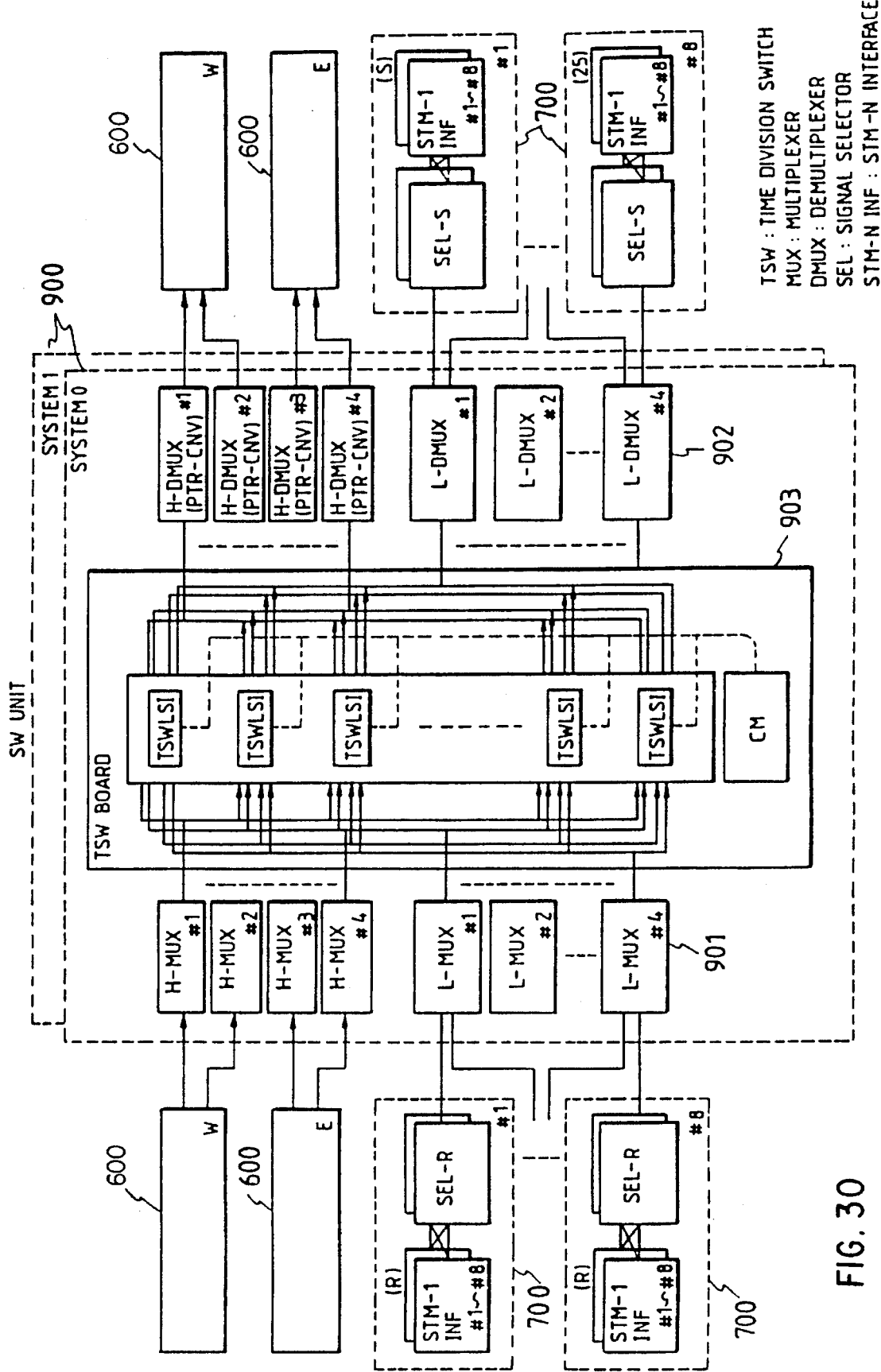
FIG. 30 is a block diagram for a node having LT-MUXes and an ADM switch used.

In turn, if the LT-MUX 1 and the ADM switch are combined to form the small scale switching node 120 as in FIG. 6, the high-speed IF shelf, the low-speed IF shelf 700, and a 40G switch shelf are combined as shown in FIG. 30. The 40G switch shelf comprises multiplexing circuits 901 for multiplexing the input signals to feed to time-division switches 903, the time-division switches 903, and demultiplexing circuits 902 for demultiplexing the signals from the time-division switches 903. An interface of the multiplexing circuits 901 and the demultiplexing circuit 902 is the intraequipment interface.

In turn, the signal from the transmission line is processed by the high-speed IF shelf 600 before being directly input to the switch without the low-speed IF shelf 700. The signal to be dropped into the office, is connected to the low-speed IF shelf 700. As for the signal to be passed to the another node, it is connected to the high-speed IF shelf 700 before being fed out to another node. That is, the signal from the transmission line is not converted as to interface by the lowspeed interface before being connected to the switch, as usual.

But, the high-speed IF shelf 600 is directly connected with the switch. This can make the equipment smaller.

If the small scale switching node 120 or the large scale switching node 110 is constructed to have the cross-connection switch feature, the 40G switch in FIG. 30 is replaced by a multi-stage switch configured of a plurality of 40G switch shelves.

As described above, the embodiment can appropriately combine the high-speed IF shelves 600, the low-speed IF shelves 700, and the 40G switch shelves 900 in the building block way. This allows accomplishment of a desired equipment with use of the common shelves in a minimized construction. Also, the embodiment allows accomplishment of the 3R-REP 3 by combination of the boards of the high-speed IF shelf 600 as will be described later.

The following describes the surveillance and control system for the LT-MUX 1.

Figure 31:
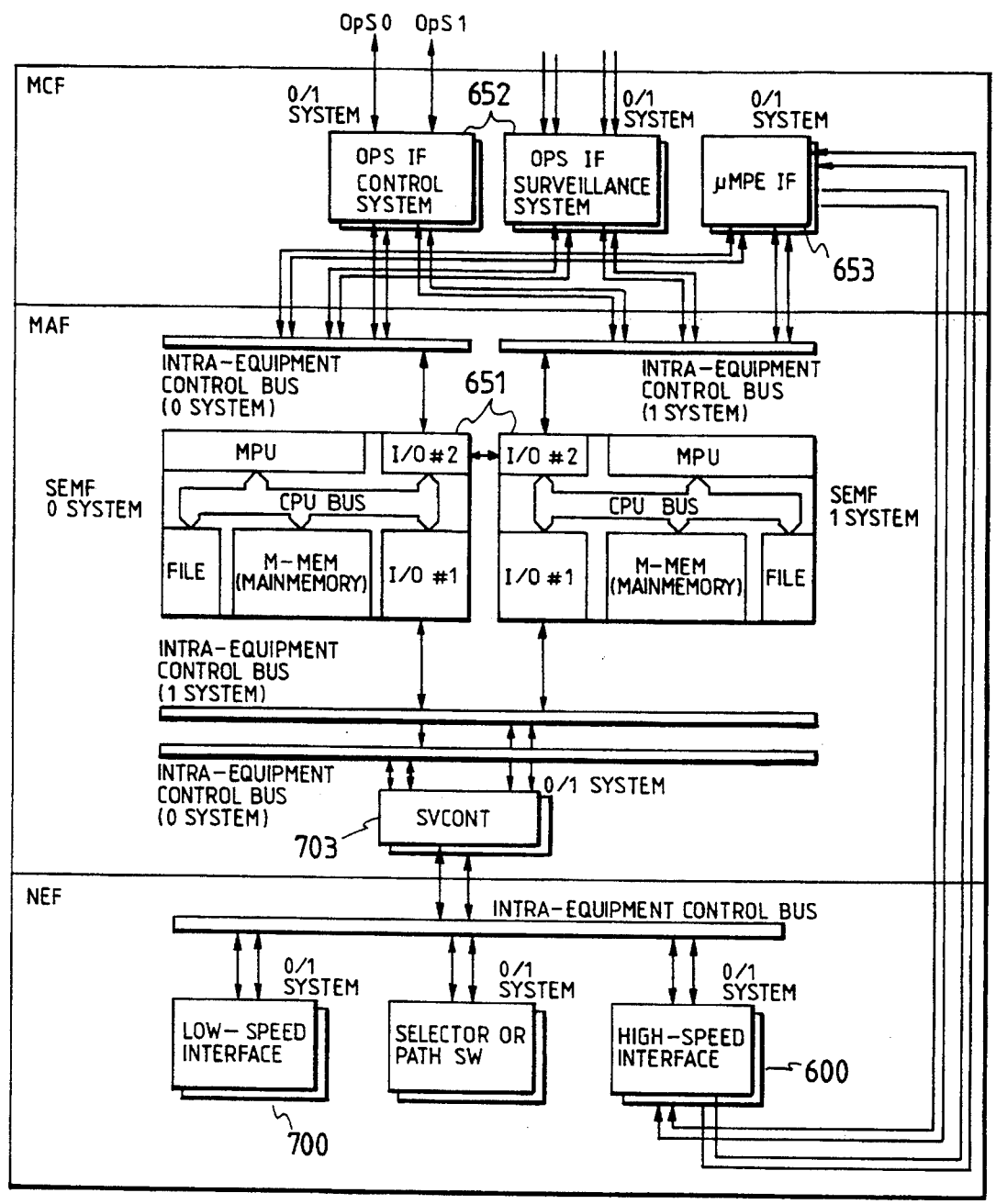
FIG. 31 is a block diagram for extracted parts serving to the surveillance and control system for the LT-MUX.

FIG. 31 is a block diagram for extracted parts serving as the surveillance and control system for the LT-MUX 1.

FIG. 32 lists features of the functional blocks. Tables 13, 14, 15, and 16 chart features of the surveillance and control system.

In FIGS. 31 and 32, the SVCONT 703 is installed for each low-speed IF shelf. The SEMF 651, the OpS IF 652, and RMT IF 653 are equipped in the common a shelf as will be described later.

TABLE 13

| FEATURE | DESCRIPTION | NOTE |
| --- | --- | --- |
| 1 Path setting | (1) Switch control memory is updated to set path according to the control message from the operation system outside equipment.<br>(2) Path setting units include:<br>  a. Units of VC-3<br>  b. Units of VC-4<br>  c. Units of VC-4c<br>    (600M at max)<br>(3) This feature is an option for implementation of crossconnection feature | Control system |
| 2 Software strap | (1) Control register of each section in equipment is updated to set operation mode (software strap) according to control message from operation system outside equipment.<br>(2) Major software strap features include:<br>  a. Transference approval or inhibition of transmission line system alarm<br>  b. Threshold of error rate degradation<br>  c. Protection time of switching control | Control system<br>NOTE 1:<br>Upon use of section protection feature |

TABLE 13-continued

| FEATURE | DESCRIPTION | NOTE |
|---|---|---|
| 3 Path test | (NOTE 1)<br>(1) Test access point is set to confirm continuity and set quality in units of path according to the control message from the operation system outside equipment.<br>(2) Path testing units include:<br>   a. Units of VC-3<br>   b. Units of VC-4<br>(3) Test pattern conforms to CCITT Recommendation 0.151 | Control system |
| 4 Redundancy system switching in equipment | (1) The operation system switches over functional components of equipment having redundancy form according to the control message from the operation system outside equipment. (Forced switching)<br>(2) As results of equipment diagnosis, the operation system switches over to the protection side from function component of equipment judged at failure. (Autonomous switching)<br>(3) Operation modes of redundancy system include:<br>   a. Automatic mode, allowing autonomous switching<br>   b. Forced selection mode<br>   c. Lock-out mode | Control system Surveillance system |

TABLE 14

| FEATURE | DESCRIPTION | NOTE |
|---|---|---|
| 5 Configuration management | (1) Implementation states of functional components of equipment are monitored, and the database for configuration management in the control system is automatically updated as needed.<br>(2) When the implemented functional component does not logically match with the physical implementation position, then an alarm is issued.<br>(3) Management units for functional components of equipment include:<br>   a. Board<br>   b. Board group<br>   c. Shelf | Surveillance system |
| 6 Alarm transference | (1) Transmission line system alarms are collected from line termination feature blocks and path connection feature blocks to detect generation and restoration of alarms before transmission line system alarms are made into an event.<br>(2) On basis of diagnosis results of equipment failure, equipment alarms are made into an event.<br>(3) Contents of these alarms made into a event are converted to messages before being informed to external surveying operation system. | Surveillance system |
| 7 Performance management | (1) Performance information, such as a bit error, are collected from line termination feature blocks and path connection feature blocks to calculate and generate performance management information for transmission lines and paths.<br>(2) The performance management information includes:<br>   a. CV (code violation)<br>   b. ES (errored second)<br>   c. SES (severely errored second)<br>(3) Types of registers for history management includes:<br>   a. 1-sec register<br>   b. 15-min register<br>   c. 1-day register | Surveillance system |

TABLE 15

| FEATURE | DESCRIPTION | NOTE |
|---|---|---|
| 7 Equipment diagnosis | (1) Failure surveillance information is collected from functional components of equipment, and a specific functional component having a hardware failure generated is identified on the basis of the failure judgement map provided in the surveillance and control system.<br>(2) Specific functional component having a hardware failure generated is logically disconnected, and the operation system switches over from the functional component of redundancy configuration to the protection side.<br>(3) Equipment information is sent out to inform existence of a functional component having a failure generated. | Surveillance system |
| 9 Section switching control | (1) If a section failure happens, section switching is controlled on the basis of MSP protocol.<br>(2) Switching system includes the following manners:<br>   a. 1 + 1 (without switch-back)<br>   b. Bi-directional switching<br>(3) Switching is caused by include:<br>   a. SF switching (LOS, LOF, S-AIS, and hardware failure)<br>   b. SD switching (MER)<br>   c. Forced switching (OpS command)<br>(4) This feature is optional. | Control system Surveillance system MPS: Multiplan Section Protection |
| 10 Path switching control | (1) If a path failure is detected with generation of a failure in the ring meshed network, section switching is controlled on the basis of MSP protocol. | Control system Surveillance PGP = Path |

TABLE 15-continued

| FEATURE | DESCRIPTION | NOTE |
|---|---|---|
| | (2) Switching system includes the following manners:<br>  a. 1 + 1 (with switch-back)<br>  b. Bilateral switching<br>(3) Switching is aused by include:<br>  a. SF switching (LOP, P-AIS, and hardware failure)<br>  b. SD switching (MER)<br>  c. Forced switching (OpS command)<br>(4) This feature is optional for implementation of cross-connection feature. | Group Protection |

TABLE 16

| FEATURE | DESCRIPTION | NOTE |
|---|---|---|
| 11 History management | (1) Variety of events generated as to transmission line received signals and equipment statuses are recorded and managed as history information.<br>(2) History information to be managed includes:<br>  a. Redundancy system switching history<br>  b. Signal performance history<br>  c. APS information changing history | Control system Surveillance system |
| 12 Backup information management | (1) If the operation state in equipment is changed, then the changed state is automatically recorded in nonvolatile memory as the latest information.<br>(2) Information to be recorded includes:<br>  a. Operation information of redundancy system<br>  b. Information of software strap<br>  c. Path setting information (NOTE 1)<br>(3) The following processes are made with the control message from the control operation system<br>  a. Update of backup information<br>  b. Comparison with statuses in equipment<br>  c. Initialization of backup information | Control system NOTE 1: With use of cross-connection feature |
| 13 Emergency start-up | (1) If it is powered on, equipment is autonomously started up for operation on basis of backup information. | Control system |
| 14 Communication control | (1) Control is made on communication with the operation system outside equipment.<br>(2) Communication is of a message form and has a protocol system on basis of the Q interface of CCITT Recommendations.<br>(3) Two independent communication links are | Control system Surveillance system |

TABLE 16-continued

| FEATURE | DESCRIPTION | NOTE |
|---|---|---|
| | provided, including the control system and surveillance system. | |
| 15 OpS message conversion | (1) Control information of message received from operation system is converted to the command form specific to equipment.<br>(2) Control information and surveillance information of the command form specific to equipment are converted to information of message form before being sent to the operation system. | Control system Surveillance system |

FIG. 33 is a block diagram for the redundancy configuration of the transmitting system in the LT-MUX 1. FIG. 34 is a block diagram for the redundancy configuration of the receiving system in the LT-MUX 1.

In general, operations including AU pointer conversion are nonhitlessly switched. To make this hitless, a hitless switching process is needed. In the embodiment, in view of the balance of the features provided in the whole equipment, the AU pointer 10 conversion process is provided in the intra-office interface and the high-speed interface unit. In the SEL 701 between these is provided a hitless switching process feature section which will be described later. As shown in the figures, simplex sections are optical booster amplifier 601, 10G IF-S 602 and the SOH 605 in the operation form without the 1+1 section switching in the 10 Gb/sec transmission line.

As the intra-office interface is an interface to be connected with an existing intra-office equipment, the redundance configuration follows the manner of the existing equipment. That is, the redundance configuration is made of the 1+1 section switching type of system 0/system 1 without switch-back. The board for the intra-office interface accommodates a plurality of highways. Auto-switching at failure is made in units of transmission line. The intra-office interface board, therefore, has working highways and waiting highways mixed therein. For this reason, for interface package maintenance, a hitless forced switching is needed which will be described later.

The SEL 701, as shown in FIGS. 23 and 24, is arranged so that it can be added or removed depending on the situation of transmission line accommodation. The SEL 701, therefore, is arranged so that it can be automatically switched in units of package in the 1+1 way. Note that if the hitless forced switching which will be described later is made for the SEL 701, this is hitlessly made by the hitless switching process section.

Now, the following describes the hitless switching process.

FIG. 35 is a block diagram for construction of the hitless switching process feature section for transmission line. Table 17 lists features of functional blocks of the hitless switching process feature section.

TABLE 17

| NO. | ITEM | FEATURES |
|---|---|---|
| 1 | AU pointer | AU pointer byte and AU stuff operation are |

TABLE 17-continued

| NO. | ITEM | FEATURES |
|---|---|---|
|   | termination | read. It is instantaneously taken in without protection of consecutive coincidence three times. |
| 2 | 2 × 2 SEL | Selector for passing delayed system through, but storing preceding system into VC buffer. |
| 3 | VC buffer | FIFO memory for delaying preceding VC-3, VC-4, and VC-4-4c data. Adjustable distance difference is 4 km. |
| 4 | VC buffer writing control | Writing address counter for VC buffer. Only VC-3, VC-4, and VC-4-4c data of input signal are written according to detection of AU stuff. |
| 5 | VC buffer reading control | VC buffer is read in line to AU stuff of the delayed system. If delay insertion is needed to increase in phase synchronizing pull-in course, positive stuff is added. If it is needed to decrease, negative stuff is added. |
| 6 | Delay insertion calculation | Delay insertion of FIFO is calculated through calculation of the writing address minus reading address. |
| 7 | Phase difference detection | Transmission delay difference is detected by comparison of AU pointer values. |
| 8 | Delay insertion control | Result of delay insertion calculation is compared with result of phase difference detection. If it is necessary to increase delay insertion, positive stuff is added on VC buffer reading side. If it is necessary to decrease delay insertion, negative stuff is added on the VC buffer reading side. 2 × 2 SEL is controlled depending on the direction of the delay difference generation. |
| 9 | Pointer calculation | New pointer value is calculated by comparison of the VC input phase of the VC buffer with output frame phase. |
| 10 | Pointer insertion | New pointer value is written in VC buffer output signal. Following specific patterns are written in predetermined positions.<br>(1) On generation of stuff: Inversion of bits 1 and 0.<br>(2) On jump of pointer: Sending of NDF pattern.<br>(3) On AU-4 or AU-4-4c: CI (concatenation indicator).<br>(4) On sending of P-AIS: All 1 of all bytes. |

As depicted in Table 17, the hitless switching process feature section makes the received data, including VC-3, VC-4, and VC-4-c data, of the system having less transmission delay of systems 0 and 1 delay in FIFO memory (VC buffer) as necessary. This makes contents of the output signals of both systems coincide. Detection of the transmission difference is made by comparison of the pointer values. Adjustment of the delay insertion of the FIFO is made with stuff operation of the AU pointer so gradually that the signal of the working system will not be bit while the phase synchronizing pull-in is made in maintaining the protection system. In writing into the VC buffer, the AU pointer is terminal once before only the VC-3, VC-4, and VC-4-c data are written in the VC buffer. In reading from the VC buffer, on the other hand, reading is made along with the operation of the AU stuff in line with that of the AU stuff in the delayed line. In a phase synchronized state, thus, the system 0 can be made to coincide with the system 1 perfectly not only in the phases of the output VC signals, but also the timings of the AU stuffs. This means that the hitless switching can be made securely even if the frequency of the AU stuff is higher.

The VC buffer is a kind of AU pointer converting circuit. At the time of output, a new AU pointer value is calculated before being inserted into the AU. The calculation principles are the same as those of the usual pointer converting circuit.

As the adjustable transmission delay difference is 4 km, the process cannot only be applied to the intra-office transmission line, but also to a short or intermediate inter-office transmission line. Thus, in the SEL, the hitless switching process feature section is constructed so that it cannot be used for switching the intra-office interface, but also for switching the 10 Gb/sec transmission line interface.

7. Description of 3R-REP

FIG. 36 is a block diagram for a construction of the 3R-REP 3. Table 18 lists features of functional blocks of the 3R-REP 3.

TABLE 18

| ITEM | | DESCRIPTION |
|---|---|---|
| Main signal interface | Transmission rate | 9953.28 Mb/sec (equivalent to STM-64) |
|   | Transmission line code | Scrambled binary NRZ (non-return to zero) |
|   | Error rate | Lower than $10^{-11}$/repeater. |
|   | Light source wavelength | 1.552 μm ±0.001 μm |
|   | Average light output | +10 to +12 dBm |
|   | Maximum detectable power | Higher than −7 dBm |
|   | Minimum detectable power | Lower than −27 dBm |
| Surveillance and control method | | Surveillance and control signal transference by 1.48 μm wavelength multiplexed signal. Implementation of surveillance control section in main signal unit. |
| Physical implementation method | | 300 mm high with 4 shelves per frame (1800 × 795 × 600 mm). |
| Cooling method | | Push-pull type forced air cooled type, with large fan. |
| Accommodation of systems | | One system per shelf, with one bidirectional system of west and east. |
| Environmental conditions | | Temperature: 10 to 40° C. Humidity: 20 to 80%. |
| Input power condition | | −42 to −53 V |

The 3R-REP 3 makes regeneration through its optical preamplification, O/E conversion, E/O conversion, and optical booster amplification. The 3R-REP 3 also makes the surveillance, alarm transference, and remote maintenance for the 1R repeater section and the 3R repeater section with use of the 1.48 μm surveillance and control light and the RSOH (regenerator section overhead). The boards used in the main signal system are all the same as those of the LT-MUX 1.

8. Implementation of the 1R-REP, LT-MUX, and 3R-REP

The following describes implementation of the 1R-REP 2, LT-MUX 1, and 3R-REP 3.

First, implementation of the 1R-REP 2 is described below.

FIG. 37 is a front view for an implementation of the 1R-REP 2.

A rack of the embodiment, as shown in the figure, has three shelves each of which contains two 1R-REP 2 systems, or six 1RREP 2 systems in total. Each system comprises two subsystems: the repeaters 301 and 320. For an unattended office which needs remote monitor and control, these are implemented in the same shelf as the system to which the OpS IF 651 and the like serve. Note that a power source board 810 is for the optical preamplifier 301 and the optical booster amplifier 320. FIG. 38 shows structures of the optical pre-amplifier 301 and optical booster amplifier 320 forming a single 1R-REP 2 system. The optical pre-amplifier 301 and the optical booster amplifier 320, as shown in FIG. 37, occupy two-fold and four-fold widths in reference to a standard board width respectively, or six-fold width in total. They are naturally air-cooled. Note that a TEC drive circuit in FIG. 38 is a circuit added to the pumping light source to control a temperature adjustment for thermoelectron cooling devices.

Implementation of the LT-MUX 1 is described below.

FIG. 39 is a front view for an implementation of the LT-MUX 1.

The construction shown is for accomplishing the transmission line 1+1 redundancy system switching. The functional boards of the high-speed IF unit 600 and the low-speed IF unit 700, as shown in the figure, are all doubled as in a working system 0 and a waiting system 1. FIG. 40 is a front view for an implementation of two systems of the LT-MUX 1 in a single rack without the redundancy configuration.

The 10G IF R 604 package and the 10G IF S 602 board, as shown in the figure, are of two-fold wide as these have many components. Similarly, the OPTAMP R 603 board and the OPTAMP S 601 board are of two-fold wide. FIG. 41 is a front view for an implementation of the LT-MUX 1 for constructing the small scale switching node 120 with the 40G switch unit built in as shown in FIG. 6b.

In this case, as shown in the figure, are implemented two highspeed interface units 600, a duplexed 40G switch unit 900, and a duplexed low-speed IF unit 700. The 40G switch unit 900, as shown in FIG. 42, is three-dimensionally constructed in view of the flow of its signals. That is, a plurality of boards MUX/DMUX containing a plurality of multiplex/demultiplex circuits 901 and 902 and a time-division switch (TSW) 903, are three-dimensionally connected together with use of a subpanel for a time switch unit. This construction can be made small.

Implementing the 40G switch into the shelf is made in a way that the TSW 903 is put in front, the 40G switch unit 900 is put into the shelf, and the MUX/DMUX board 901/902 is connected with other units on the rear side of the shelf. FIG. 43a is a front view for an implementation of the LT-MUX 1 for constructing the large scale switching node 110 with a multi-stage switch meshed network of a plurality of the 40G switch units built therein.

In this case, as shown in the figure, a plurality of racks have the 40G switch units, the high-speed IF units 600, and the lowspeed IF units 700 built therein so that the high-speed IF units 600, and the low-speed IF units 700 can be connected with the switch multi-stage network.

Finally, FIG. 44 is a front view for an implementation of the 3RREP 3.

As shown in the figure, a single rack has four shelves each of which contains a main signal board, including OPTAMP R 603, 10G IF R 604, 10G IF S 602, and OPTAMP S 601 packages, and a common section, such as an OpS IF 651. This construction allows a single shelf to complete all the features of a single equipment. It is possible to easily increase or remove the equipment in shelf units as needed.

As described so far, the present invention can flexibly build up the optical transmission system depending on capacities and function required.

What is claimed is:

1. In an optical transmission equipment, including a shelf with a first circuit board slot for accommodating a first device which is an electric-to-optic converter circuit board for converting an electric signal to a transmission light, with a second circuit board slot for accommodating a second device which is an optic-to-electric converter circuit board for converting received light to an electric signal, with at least a third circuit board slot for accommodating at least one of a third device and a fourth device, said third device being a booster optical amplifier circuit board for amplifying transmitting light produced by said first device, and said fourth device being a pre-optical amplifier circuit board for amplifying said received light before providing it to said second device, an optical transmission method comprising the steps inserting at least one of said first device and said second device to the corresponding circuit board slot;

transmitting said transmission light when said first device is inserted, and the transmission distance is shorter than a predetermined length;

receiving said received light when said second device is inserted and the received light transmitted a shorter distance than a predetermined length;

inserting said third device to said third circuit board slot, when transmitting said transmission light a distance longer than said predetermined length, and inserting said fourth device to said third circuit board slot when said received light is transmitted a distance longer than said predetermined length.

2. An optical transmission equipment, comprising:

a shelf with,
 a first circuit boars slot or accommodating a first device which is an electric-to-optic converter circuit board for converting an electric signal to a transmission light,
 a second circuit board slot for accommodating a second device which is an optic-to-electric converter circuit board for converting received light to an electric signal,
 a third circuit board slot for accommodating at least one of a third device and a fourth device, said third device being a booster optical amplifier circuit board for amplifying said transmission light from said first device and said fourth device being a per-optical amplifier circuit board for amplifying said received light before providing it to said second device;

means for operating at least one of said first device and said second device being inserted to the corresponding circuit board slot;

means for transmitting said transmission light when said first device is inserted, and the transmission distance is shorter than a predetermined length;

means for receiving said received light when said second device is inserted and the received light is transmitted a distance shorter than a predetermined length;

means for operating said third device being inserted to said third circuit board slot, when transmitting said transmission light a distance longer than said predetermined length; and, means for operating said fourth device being inserted to said third circuit board slot, when said received light is transmitted a distance longer than said predetermined length.

3. An optical transmission equipment according to claim 2, wherein said first device includes said third device as a semiconductor amplifier implemented in said first device.

4. An optical transmission equipment according to claim 2, wherein said second device includes said fourth device as an APD implemented in said second device.

5. An optical transmission equipment according to claim 2, wherein said first device includes said third device as a semiconductor amplifier implemented in said first device, and said second device includes said fourth device as an APD implemented in said second device.

* * * * *

UNITED STATES PATENT AND TRADEMARK OFFICE
CERTIFICATE OF CORRECTION

PATENT NO. : 5,555,477
DATED : 10 September 1996
INVENTOR(S) : Keiji TOMOOKA et al.

It is certified that error appears in the above-indentified patent and that said Letters Patent is hereby corrected as shown below:

IN THE ABSTRACT, line 2: Change "to" to --over--.
                            line 5: Change "to" to --over--.
                            line 11: Change "an" to --and--.

| Column | Line | |
|---|---|---|
| 1 | 12 | Before "the use" insert --with--. |
| 2 | 8 | After "therein" insert --;--. |
| 2 | 19 | After "therein" insert --;--. |
| 2 | 38 | After "capable of" delete "10". |
| 2 | 51 | Before "BRIEF" start new paragraph. |
| 2 | 60 | Change "nodes" to --node--. |
| 3 | 27 | Change "1RREP" to --1R-REP--. |

UNITED STATES PATENT AND TRADEMARK OFFICE
CERTIFICATE OF CORRECTION

PATENT NO. : 5,555,477
DATED : 10 September 1996
INVENTOR(S) : Keiji TOMOOKA et al.

It is certified that error appears in the above-indentified patent and that said Letters Patent is hereby corrected as shown below:

| Column | Line | |
|---|---|---|
| 3 | 49 | After "serving" change "to" to --as--. |
| 3 | 64 | Change "a" to --an--. |
| 4 | 39 | Change "On the contrary" to --On the other hand--. |
| 5 | 44 | After "This" delete "does". |
| 5 | 45 | Change "provide" to --provides--. |
| 5 | 50 | Change "in" to --over--. |
| 6 | 10 | Change "economic" to --economical--. |
| 6 | 15 | After "formed" change "of" to --by--. |
| 6 | 37 | Change "111" to --11--. |
| 7 | 22 | After "path" insert --such--. |
| 7 | 23 | Delete "is equal to each other". |
| 7 | 24 | Change "is equal" to --are equal--. |

UNITED STATES PATENT AND TRADEMARK OFFICE
CERTIFICATE OF CORRECTION

PATENT NO. : 5,555,477
DATED : 10 September 1996
INVENTOR(S) : Keiji TOMOOKA et al.

It is certified that error appears in the above-indentified patent and that said Letters Patent is hereby corrected as shown below:

| Column | Line | |
|---|---|---|
| 8 | 64 | Change "IR/3R-REPs" to --1R/3R-REPs--. |
| 9 | 6 | Change "R/3R-REPs" to --1R/3R-REPs--. |
| 9 | 25 | Change "1R/2,3R-REPs 2" to --1R/3R-REPs 2,3--. |
| 9 | 31 | Change "1R/3RREPs" to --1R3R-REPs--. |
| 9 | 38 | Change "1R/2,3R-REPs 2" to --1R/3R-REPs 2,3--. |
| 12 | 67 | After "preceding" delete "the". |
| 13 | 25 | Change "3RREP 3" to --3R-REP 3--. |
| 13 | 27 | Before "that" insert --so--. |
| 17 | 42 | Change "1RREP 2" to --1R-REP 2-- |
| 18 | 66 | Change "LTMUX 1" to --LT-MUX 1--. |

UNITED STATES PATENT AND TRADEMARK OFFICE
CERTIFICATE OF CORRECTION

PATENT NO. : 5,555,477
DATED : 10 September 1996
INVENTOR(S) : Keiji TOMOOKA et al.

It is certified that error appears in the above-indentified patent and that said Letters Patent is hereby corrected as shown below:

| Column | Line | |
|---|---|---|
| 19 | 7 | Change "IF R 604" to --IF S 602--; change "IF S 604" to --IF R 604--. |
| 21 | 32 | Change "device" to --devices--. |
| 21 | 43 | After "and" change "an" to --a--. |
| 21 | 54 | Change "higher" to --more--. |
| 22 | 23 | Change "minimized" to --minimal--. |
| 22 | 66 | After "switching control" insert --(NOTE 1)--. |
| 23 | 65 | Change "a event" to --an event--. |
| 24 | 65 | After "lance" insert --system--. |
| 25 | 9 | Change "aused" to --caused--. |
| 26 | 27 | After "pointer" delete "10". |

UNITED STATES PATENT AND TRADEMARK OFFICE
CERTIFICATE OF CORRECTION

PATENT NO. : 5,555,477
DATED : 10 September 1996
INVENTOR(S) : Keiji TOMOOKA et al.

It is certified that error appears in the above-indentified patent and that said Letters Patent is hereby corrected as shown below:

| Column | Line | |
|---|---|---|
| 27 | 52 | Change "bit" to --hit--. |
| 28 | 2 | Change "cannot only be applied" to --can be applied not only--. |
| 28 | 5 | Change "cannot" to --can--. |
| 28 | 6 | After "used" insert --not only--. |
| 28 | 60 | Change "1RREP 2" to --1R-REP 2--. |
| 29 | 5 | Change "are naturally" to --are, of course,--. |
| 29 | 7 | Change "tbermoelectron" to --thermoelectron--. |
| 29 | 21 | Change "wide" to --width--. |
| 29 | 23 | Change "wide" to --width--; before "FIG. 41" start new paragraph. |

UNITED STATES PATENT AND TRADEMARK OFFICE
CERTIFICATE OF CORRECTION

PATENT NO. : 5,555,477
DATED : 10 September 1996
INVENTOR(S) : Keiji TOMOOKA et al.

It is certified that error appears in the above-indentified patent and that said Letters Patent is hereby corrected as shown below:

| Column | Line | |
|---|---|---|
| 29 | 40 | Before "FIG. 43a" start new paragraph. |
| 29 | 50 | Change "3RREP 3" to --3R-REP 3--. |
| 29 | 60 | Change "function" to --functions--. |
| 30 | 8 | After "steps" insert --of:--. |
| 30 | 25 | Change "boars" to --board--; change "or" to --for--. |
| 30 | 35 | Change "per-optical" to --optical--. |
| 30 | 36 | Change "amplifier" to --pre-amplifier--. |

Signed and Sealed this

Seventeenth Day of June, 1997

Attest:

BRUCE LEHMAN

Attesting Officer

Commissioner of Patents and Trademarks